US 6,565,470 B2

(12) United States Patent
Ohkubo

(10) Patent No.: US 6,565,470 B2
(45) Date of Patent: May 20, 2003

(54) AUTOMATIC TRANSMISSION APPARATUS

(75) Inventor: Masahiro Ohkubo, Kyoto (JP)

(73) Assignee: Exedy Corporation, Neyagawa (JP)

( * ) Notice: Subject to any disclaimer, the term of this patent is extended or adjusted under 35 U.S.C. 154(b) by 2 days.

(21) Appl. No.: 09/771,630

(22) Filed: Jan. 30, 2001

(65) Prior Publication Data
US 2001/0012810 A1 Aug. 9, 2001

(30) Foreign Application Priority Data

Feb. 9, 2000 (JP) ........................................ 2000-031741

(51) Int. Cl.$^7$ ................................................. F16H 3/66
(52) U.S. Cl. .......................... 475/66; 475/280; 475/302
(58) Field of Search ............................ 475/59, 66, 71, 475/269, 271, 280, 288, 302

(56) References Cited

U.S. PATENT DOCUMENTS

| 3,433,096 A | | 3/1969 | Tuck et al. | |
|---|---|---|---|---|
| 4,509,389 A | | 4/1985 | Vahratian et al. | |
| 5,013,289 A | * | 5/1991 | Van Maanen | 475/218 |
| 5,039,305 A | | 8/1991 | Pierce | |
| 5,106,352 A | | 4/1992 | Lepelletier | |
| 5,167,592 A | * | 12/1992 | Sakamoto | 475/275 |
| 5,267,913 A | * | 12/1993 | Beim et al. | 475/218 |
| 5,267,916 A | * | 12/1993 | Beim et al. | 475/285 |
| 5,593,359 A | * | 1/1997 | Justice et al. | 475/280 |
| 5,919,111 A | * | 7/1999 | Park | 475/269 |

FOREIGN PATENT DOCUMENTS

| DE | 3604393 A | | 8/1986 |
|---|---|---|---|
| DE | 19729617 C | | 6/1999 |
| EP | 0617212 A | | 9/1994 |
| JP | 55-063041 A | | 5/1980 |
| JP | 61-124747 A | | 6/1986 |
| JP | 63-83449 A | | 4/1988 |
| JP | 06221392 A | * | 8/1994 |

* cited by examiner

Primary Examiner—Ankur Parekh
(74) Attorney, Agent, or Firm—Shinjyu Global IP Counselors, LLP

(57) ABSTRACT

An apparatus is provided to expand the direct drive region of the torque converter in a five or six-speed automatic transmission apparatus for front wheel drive to greatly improve the power performance and fuel economy thereof. The apparatus has a first shaft 10, a second shaft 31, planetary gear trains 11 and 12 disposed on second shaft 31, counter gears pairs X, Y, three clutches, and two brakes. The pair of counter gears have different gear ratios and serve to couple the first shaft with each of the structural elements of the planetary gear trains. The clutches and brakes selectively couple two elements to control the power transmission path. The pair of counter gears X is connected to the first structural element of the planetary gear trains via the first clutch and the pair of counter gears Y is connected to either the first and second structural elements or the second and fourth structural elements of the planetary gear trains via the second or third clutch. The two brakes are connected to either the second and fourth structural elements or the first and second structural elements of the planetary gear trains. The third structural element serves as the output.

8 Claims, 51 Drawing Sheets

| Speed level | Coupling elements | Gear ratio | $\rho 1=0.45$ $\alpha X=1.9$ | $\rho 2=0.35$ $\alpha Y=1.2$ |
|---|---|---|---|---|
| 1st | CA1, BD | $(1+\rho 1)(1+\rho 2)\alpha X$ | | 3.72 |
| 2nd | CA2, BD | $(1+\rho 1)(1+\rho 2)\alpha Y$ | | 2.35 |
| 3rd | CB1, BD | $(1+\rho 2)\alpha Y$ | | 1.62 |
| 4th | CB1, CA2 | $\alpha Y$ | | 1.2 |
| 5th | CB1, CA1 | $\rho 1(1+\rho 2)\alpha X\alpha Y / \{(\rho 1+\rho 1\rho 2+\rho 2)\alpha X-\rho 2\alpha Y\}$ | | 0.99 |
| Rev 1 | CA1, BB | $\rho 1(1+\rho 2)\alpha X/\rho 2$ | | 3.3 |
| Rev 2 | CA2, BB | $\rho 1(1+\rho 2)\alpha Y/\rho 2$ | | 2.08 |

$\alpha X=ZX2/ZX1$ $\rho 1=ZS1/ZR1$ $\alpha Y=ZY2/ZY1$ $\rho 2=ZS2/ZR2$ $\alpha Z=ZZ2/ZZ1$

Fig. 11

| Speed level | Coupling elements | Gear ratio | $\rho_1=0.6$ $\rho_2=0.38$ |
|---|---|---|---|
| | | | $\alpha X=1.85$ $\alpha Y=1.2$ |
| 1st | CA1, BD | $(\rho_1+\rho_1\rho_2+\rho_2)\alpha X/\rho_1$ | 3.72 |
| 2nd | CA2, BD | $(\rho_1+\rho_1\rho_2+\rho_2)\alpha Y/\rho_1$ | 2.42 |
| 3rd | CB1, BD | $(1+\rho_2)\alpha Y$ | 1.66 |
| 4th | CB1, CA2 | $\alpha Y$ | 1.2 |
| 5th | CB1, CA1 | $\alpha X \alpha Y / \{(1+\rho_1)\alpha X - \rho_1 \alpha Y\}$ | 0.99 |
| Rev 1 | CA1, BB | $\alpha X/\rho_1$ | 3.08 |
| Rev 2 | CA2, BB | $\alpha Y/\rho_1$ | 2 |

$\alpha X = ZX2/ZX1$ $\rho_1 = ZS1/ZR1$ $\alpha Y = ZY2/ZY1$ $\rho_2 = ZS2/ZR2$ $\alpha Z = ZZ2/ZZ1$

Fig. 14

| Speed level | Coupling elements | Gear ratio | $\rho1=\rho2=0.5$ $\alpha X=1$ $\alpha2=1.2$ |
|---|---|---|---|
| 1st | CA1, BD | $(1+\rho1)\alpha X/(1-\rho1\rho2)$ | 4 |
| 2nd | CA2, BD | $(1+\rho1)\alpha Y/(1-\rho1\rho2)$ | 2.4 |
| 3rd | CB1, BD | $\alpha Y/(1-\rho1\rho2)$ | 1.6 |
| 4th | CB1, CA2 | $\alpha Y$ | 1.2 |
| 5th | CB1, CA1 | $\alpha X\alpha Y/\{(1+\rho2)\alpha X-\rho2\alpha Y\}$ | 1 |
| Rev 1 | CA1, BB | $\alpha X/\rho2$ | 4 |
| Rev 2 | CA2, BB | $\alpha Y/\rho2$ | 2.4 |

$\alpha X=ZX2/ZX1$ $\rho1=ZS1/ZR1$ $\alpha Y=ZY2/ZY1$ $\rho2=ZS2/ZR2$ $\alpha Z=ZZ2/ZZ1$

Fig. 17

| Speed level | Coupling elements | Gear ratio | $\rho 1=0.55$ $\alpha X=2$ | $\rho 2=0.3$ $\alpha Y=1.2$ |
|---|---|---|---|---|
| 1st | CA1, BD | $(\rho 1+\rho 2)\alpha X/\rho 1(1-\rho 2)$ | | 4.41 |
| 2nd | CA2, BD | $(\rho 1+\rho 2)\alpha Y/\rho 1(1-\rho 2)$ | | 2.65 |
| 3rd | CB1, BD | $\alpha Y/(1-\rho 2)$ | | 1.71 |
| 4th | CB1, CA2 | $\alpha Y$ | | 1.2 |
| 5th | CB1, CA1 | $\alpha X\alpha Y/\{(1+\rho 1)\alpha X-\rho 1\alpha Y\}$ | | 0.98 |
| Rev 1 | CA1, BB | $\alpha X/\rho 1$ | | 3.64 |
| Rev 2 | CA2, BB | $\alpha Y/\rho 1$ | | 2.18 |

$\rho 1 = ZS1/ZR1$ $\rho 2 = ZS2/ZR2$ $\alpha X = ZX2/ZX1$ $\alpha Y = ZY2/ZY1$ $\alpha Z = ZZ2/ZZ1$

Fig. 20

| Speed level | Coupling elements | Gear ratio | $\rho 1=0.4$ $\alpha X=2$ | $\rho 2=0.35$ $\alpha Y=1.2$ |
|---|---|---|---|---|
| 1st | CA1, BD | $(\rho 1+\rho 2)\alpha X/\rho 2$ | | 4.29 |
| 2nd | CA2, BD | $(\rho 1+\rho 2)\alpha Y/\rho 2$ | | 2.57 |
| 3rd | CB1, BD | $(1+\rho 1)\alpha Y$ | | 1.68 |
| 4th | CB1, CA2 | $\alpha Y$ | | 1.2 |
| 5th | CB1, CA1 | $(1-\rho 2)\alpha X \alpha Y/(\alpha X-\rho 2 \alpha Y)$ | | 0.99 |
| Rev 1 | CA1, BB | $(1-\rho 2)\alpha X/\rho 2$ | | 3.71 |
| Rev 2 | CA2, BB | $(1-\rho 2)\alpha Y/\rho 2$ | | 2.23 |

$\alpha X=ZX2/ZX1$ $\alpha Y=ZY2/ZY1$ $\alpha Z=ZZ2/ZZ1$ $\rho 1=ZS1/ZR1$ $\rho 2=ZS2/ZR2$

Fig. 23

| Speed level | Coupling elements | Gear ratio $\rho1=0.45 \quad \rho2=0.35$ $\alpha X=2.1\,\alpha Y=1.3\,\alpha Z=1.25$ | |
|---|---|---|---|
| 1st | CA1, BD | $(1+\rho1)(1+\rho2)\alpha x$ | 4.11 |
| 2nd | CA2, BD | $(1+\rho1)(1+\rho2)\alpha Y$ | 2.54 |
| 3rd | CB1, BD | $(1+\rho2)\alpha z$ | 1.69 |
| 4th | CB1, CA2 | $\rho1(1+\rho2)\alpha Y\alpha z/\{(\rho1+\rho1\rho2+\rho2)\alpha Y-\rho2\alpha Z\}$ | 1.22 |
| 5th | CB1, CA1 | $\rho1(1+\rho2)\alpha X\alpha z/\{(\rho1+\rho1\rho2+\rho2)\alpha X-\rho2\alpha Z\}$ | 1.01 |
| Rev 1 | CA1, BB | $\rho1(1+\rho2)\alpha X/\rho2$ | 3.65 |
| Rev 2 | CA2, BB | $\rho1(1+\rho2)\alpha Y/\rho2$ | 2.26 |

$\alpha X=ZX2/ZX1 \qquad \rho1=ZS1/ZR1$ $\alpha Y=ZY2/ZY1 \qquad \rho2=ZS2/ZR2$ $\alpha Z=ZZ2/ZZ1$

Fig. 28

| Speed level | Coupling elements | Gear ratio | $\rho 1=0.5 \quad \rho 2=0.4$ $\alpha X=2 \quad \alpha Y=1.1$ |
|---|---|---|---|
| 1st | CD1, BB | $(1+\rho 2)\alpha Y/\rho 2$ | 3.85 |
| 2nd | CD1, BA | $(1+\rho 1)(1+\rho 2)\alpha Y/(\rho 1+\rho 1\rho 2+\rho 2)$ | 2.1 |
| 3rd | CD1, CA1 | $(1+\rho 1)(1+\rho 2)\alpha X\alpha Y/\{(\rho 1+\rho 1\rho 2+\rho 2)\alpha X+\alpha Y\}$ | 1.4 |
| 4th | CD1, CB1 | $\alpha Y$ | 1.1 |
| 5th | CA1, CB1 | $\rho 1(1+\rho 2)\alpha X\alpha Y/\{(\rho 1+\rho 1\rho 2+\rho 2)\alpha X-\rho 2\alpha Y\}$ | 0.87 |
| 6th | BA, CB1 | $\rho 1(1+\rho 2)\alpha Y/(\rho 1+\rho 1\rho 2+\rho 2)$ | 0.7 |
| Rev | CA1, BB | $\rho 1(1+\rho 2)\alpha X/\rho 2$ | 3.5 |

$\alpha X=ZX2/ZX1$ $\alpha Y=ZY2/ZY1$ $\alpha Z=ZZ2/ZZ1$ $\rho 1=ZS1/ZR1$ $\rho 2=ZS2/ZR2$

Fig. 33

| Speed level | Coupling elements | Gear ratio | $\rho1=0.65$ $\rho2=0.4$<br>$\alpha X=2.1$ $\alpha Y=1.1$ |
|---|---|---|---|
| 1st | CD1, BB | $(1+\rho2)\alpha Y/\rho2$ | 3.85 |
| 2nd | CD1, BA | $(\rho1+\rho1\rho2+\rho2)\alpha Y/\rho2(1+\rho1)$ | 2.13 |
| 3rd | CD1, CA1 | $(\rho1+\rho1\rho2+\rho2)\alpha X\alpha Y/\{(1+\rho1)\rho2\alpha X+\rho1\alpha Y\}$ | 1.44 |
| 4th | CD1, CB1 | $\alpha Y$ | 1.1 |
| 5th | CA1, CB1 | $\alpha X\alpha Y/\{(1+\rho1)\alpha X-\rho1\alpha Y\}$ | 0.84 |
| 6th | BA, CB1 | $\alpha Y/(1+\rho1)$ | 0.67 |
| Rev | CA1, BB | $\alpha X/\rho1$ | 3.23 |

$\rho1=ZS1/ZR1$ $\rho2=ZS2/ZR2$ $\alpha X=ZX2/ZX1$ $\alpha Y=ZY2/ZY1$ $\alpha Z=ZZ2/ZZ1$

Fig. 36

| Speed level | Coupling elements | Gear ratio | $\rho1=0.45$ $\alpha X=2$ / $\rho2=0.65$ $\alpha Y=1.1$ |
|---|---|---|---|
| 1st | CD1, BB | $\alpha Y/\rho1\rho2$ | 3.76 |
| 2nd | CD1, BA | $(1+\rho1)\alpha Y/\rho1(1+\rho2)$ | 2.15 |
| 3rd | CD1, CA1 | $(1+\rho1)\alpha X\alpha Y/\{\rho1(1+\rho2)\alpha X+(1-\rho1\rho2)\alpha Y\}$ | 1.41 |
| 4th | CD1, CB1 | $\alpha Y$ | 1.1 |
| 5th | CA1, CB1 | $\alpha X\alpha Y/\{(\alpha X-\alpha Y)\rho2+\alpha X\}$ | 0.85 |
| 6th | BA, CB1 | $\alpha Y/(1+\rho2)$ | 0.67 |
| Rev | CA1, BB | $\alpha X/\rho2$ | 3.08 |

$\alpha X=ZX2/ZX1$      $\rho1=ZS1/ZR1$ $\alpha Y=ZY2/ZY1$      $\rho2=ZS2/ZR2$ $\alpha Z=ZZ2/ZZ1$

Fig. 39

| Speed level | Coupling elements | Gear ratio | $\rho1=0.55$ $\alpha X=2$ $\rho2=0.3$ $\alpha Y=1.1$ |
|---|---|---|---|
| 1st | CD1, BB | $\alpha Y/\rho2$ | 3.67 |
| 2nd | CD1, BA | $(\rho1+\rho2)\alpha Y/(1+\rho1)\rho2$ | 2.01 |
| 3rd | CD1, CA1 | $(\rho1+\rho2)\alpha X\alpha Y/\{(1+\rho1)\rho2\alpha X+(1-\rho2)\rho1\alpha Y\}$ | 1.38 |
| 4th | CD1, CB1 | $\alpha Y$ | 1.1 |
| 5th | CA1, CB1 | $\alpha X\alpha Y/\{\rho1(\alpha X-\alpha Y)+\alpha X\}$ | 0.88 |
| 6th | BA, CB1 | $\alpha Y/(1+\rho1)$ | 0.71 |
| Rev | CA1, BB | $\alpha X/\rho1$ | 3.64 |

$\alpha X=ZX2/ZX1$ $\alpha Y=ZY2/ZY1$ $\alpha Z=ZZ2/ZZ1$ $\rho1=ZS1/ZR1$ $\rho2=ZS2/ZR2$

Fig. 42

| Speed level | Coupling elements | Gear ratio | $\rho 1=0.45$  $\alpha X=2$ | $\rho 2=0.35$  $\alpha Y=1.2$ |
|---|---|---|---|---|
| 1st | CD1, BB1 | $(1+\rho 1)\alpha Y/\rho 1$ | | 3.87 |
| 2nd | CD1, BA | $(\rho 1+\rho 2)\alpha Y/\rho 1$ | | 2.13 |
| 3rd | CD1, CA1 | $(\rho 1+\rho 2)\alpha X\alpha Y/(\rho 1\alpha X+\rho 2\alpha Y)$ | | 1.45 |
| 4th | CD1, CB1 | $\alpha Y$ | | 1.2 |
| 5th | CA1, CB1 | $(1-\rho 2)\alpha X\alpha Y/(\alpha X-\rho 2\alpha Y)$ | | 0.99 |
| 6th | BA, CB1 | $(1-\rho 2)\alpha Y$ | | 0.78 |
| Rev | CA1, BB | $(1-\rho 2)\alpha X/\rho 2$ | | 3.71 |

$\alpha X=ZX2/ZX1$ $\alpha Y=ZY2/ZY1$ $\alpha Z=ZZ2/ZZ1$ $\rho 1=ZS1/ZR1$ $\rho 2=ZS2/ZR2$

Fig. 45

| Speed level | Coupling elements | Gear ratio | $\rho1=0.4 \quad \rho2=0.45$ $\alpha X=2 \quad \alpha Y=1.2 \quad \alpha Z=1.05$ |
|---|---|---|---|
| 1st | CD1, BB | $(1+\rho2)\alpha Y/\rho2$ | 3.87 |
| 2nd | CD1, BA | $(1+\rho1)(1+\rho2)\alpha Y/(\rho1+\rho1\rho2+\rho2)$ | 2.37 |
| 3rd | CD1, CA1 | $(1+\rho1)(1+\rho2)\alpha X\alpha Y/\{(\rho1+\rho1\rho2+\rho2)\alpha X+\alpha Y\}$ | 1.49 |
| 4th | CD1, CB1 | $(1+\rho2)\alpha Y\alpha Z/(\rho2\alpha Z+\alpha Y)$ | 1.05 |
| 5th | CA1, CB1 | $\rho1(1+\rho2)\alpha X\alpha Z/\{(\rho1+\rho1\rho2+\rho2)\alpha X-\rho2\alpha Z\}$ | 0.77 |
| 6th | BA, CB1 | $\rho1(1+\rho2)\alpha Z/(\rho1+\rho1\rho2+\rho2)$ | 0.59 |
| Rev | CA1, BB | $\rho1(1+\rho2)\alpha X/\rho2$ | 2.58 |

$\alpha X=ZX2/ZX1$ $\alpha Y=ZY2/ZY1$ $\alpha Z=ZZ2/ZZ1$ $\rho1=ZS1/ZR1$ $\rho2=ZS2/ZR2$

Fig. 51

AUTOMATIC TRANSMISSION APPARATUS

BACKGROUND OF THE INVENTION

1. Field of the Invention

This invention generally relates to an automatic transmission apparatus that transmits power from an engine to an output shaft. More specifically, the present invention relates to a five or six-speed automatic transmission apparatus that expands the direct drive region of the torque converter for front wheel drive to greatly improve the power performance and fuel economy thereof.

2. Background Information

Four-speed automatic transmission apparatuses are well known for driving a front wheel drive vehicle. One example of a four-speed automatic transmission apparatus for a front wheel drive vehicle is shown in FIG. 1. Transmission 1 of FIG. 1 is disposed on a first shaft 3, which is the output shaft of torque converter 2, while the output of transmission 1 is coupled to a second shaft 5 via a pair of counter gears 4. Second shaft 5 is coupled with a third shaft 8 via a pair of counter gears 6 and a differential gear 7 so that its output is transmitted to the front left and right wheels.

One conceivable design for the transmission 1 in such a configuration is one that comprises two planetary gear trains, two clutches CA and CB, and three brakes BA, BB and BD, as shown in FIG. 2A to FIG. 2E. FIG. 3 shows the ON/OFF control of the coupling elements at each speed level of the transmission shown in FIG. 2 and the rotational speed of each structural element A, B, C and D of the planetary gear trains. In the present invention structural element C is the output part of transmission 1 and gear ratios for four forward speeds and one reverse speed are obtained.

As shown in FIG. 4, another example of a transmission is illustrated that comprises a pair of planetary gear trains, three clutches CA, CB and CD, and a pair of brakes BA and BB. As seen in FIG. 5, the ON/OFF control of the coupling elements is shown at each speed level of the transmission shown in FIG. 4 and the rotational speed of each structural element A, B, C and D of the planetary gear trains. In the present invention structural element C is the output part of transmission 1 and gear ratios for four forward speeds and one reverse speed are obtained.

With these automatic transmission apparatuses, the gear ratios of first speed ($1^{st}$) and fourth speed ($4^{th}$) are normally determined by the maximum tractive force and the maximum speed. Consequently, there are large differences in gear ratio between speed levels. These four-speed automatic transmission apparatuses have inferior power performance in comparison with typical five or six-speed manual transmissions. Also, with the large differences between gear ratios, there is a larger region where the engine speed is low when the torque converter is coupled directly. Consequently, an inefficient region (hydraulic coupling region) of the torque converter must be used more often, resulting in poor fuel economy.

Therefore, it is preferred that automatic transmission apparatuses also have five or six speeds with narrower differences between gear ratios similar to five or six-speed manual transmissions.

To this end, the automatic transmission apparatus shown in FIG. 6 has been proposed. This apparatus modifies the configuration shown in FIG. 1 by providing a second shaft 5 with a subordinate transmission ST that comprises a planetary gear train, a direct drive clutch C and a speed-reducing brake B. This configuration achieves an automatic transmission apparatus with five forward speeds, wherein the first through fourth speeds are obtained by outputting the first through fourth speeds of transmission 1 through subordinate transmission ST, while the same is in direct drive mode. The fifth speed is obtained by using subordinate transmission ST to reduce the first speed of transmission 1.

However, there is a limit to how far the difference between the gear ratios of transmission 1 can be narrowed and it is difficult to achieve gear ratios similar to those of a manual transmission. Moreover, subordinate transmission ST is disadvantageous in that it increases both cost and weight.

In view of the above, there exists a need for an automatic transmission apparatus, which overcomes the above mentioned problems in the prior art. This invention addresses this need in the prior art as well as other needs, which will become apparent to those skilled in the art from this disclosure.

SUMMARY OF THE INVENTION

One object of the present invention is to provide an automatic transmission apparatus that expands the direct drive region of the torque converter and greatly improve power performance and fuel economy by providing a five or six-speed automatic transmission apparatus having narrow differences between gear ratios and roughly the same cost and weight of a conventional four-speed automatic transmission apparatus.

Another object of the present invention is provide an automatic transmission apparatus that is more compact in the axial direction by dispersing the structural elements onto two shafts and thus to achieve an automatic transmission apparatus that is suitable for a front-engine, front-wheel-drive vehicle.

Yet another object of the present invention is provide an automatic transmission apparatus that reduces power losses by lowering the rotational speed of the structural elements of the transmission unit.

At least some of the foregoing objects are attained by providing an automatic transmission apparatus in accordance with the present invention. The automatic transmission apparatus of the present invention is a device that transmits power from the engine side thereof to an output shaft and is equipped with a first shaft, a second shaft, a pair of planetary gear trains, first and second pair of counter gears, and a plurality of coupling elements. The first shaft receives power input from the engine side. The second shaft is provided so as to be parallel with the first shaft. The planetary gear trains are disposed on the second shaft. One or both of the planetary gear trains have a first structural element and second structural element to which power is input, a third structural element from which power is output, and a fourth structural element disposed in the power transmission path. The first and second pairs of counter gears couple the first shaft with the structural elements of the planetary gear trains, and each of them has a different gear ratio. The plurality of coupling elements include first, second and third clutches and first and second brakes. The coupling elements are selectively activated in pairs of two elements in order to control the power transmission path. Furthermore, power is input to the first structural element of the planetary gear trains via either the first clutch and the first pair of counter gears, or via the second clutch and the second pair of counter gears. Power is input to the second structural element of the planetary gear trains via the third clutch and the second pair of counter gears. The third structural element of the planetary gear trains is connected to the output shaft. The first brake is provided so as to brake the rotation of the second structural element. Seven speed levels are obtained by selectively activating two coupling elements from among the first clutch, second clutch, third clutch, first brake and second brake. With this automatic transmission apparatus, power from the engine side is input to the first shaft. This power is transmitted to the second shaft via the pair of counter gears, its rotation is modified by the planetary gear trains, and then the power is output from the transmission. A transmission having seven speed levels, including five forward speeds and two reverse speeds, is obtained by selectively activating two coupling elements from among the first clutch, second clutch, third clutch, first brake and second brake.

In the present invention, a transmission having seven speeds and a simple structure is obtained by inputting a different rotational speed to the first structural element of the planetary gear trains of a conventional transmission having four forward speeds and one reverse speed and comprising two clutches and three brakes or three clutches and two brakes. Also, since the input torque and rotation are transmitted to the second shaft by a pair of counter gears, the rotation of the structural elements of the planetary gear trains can be reduced and the clutches and brakes can be dispersed on both the first shaft and the second shaft.

An automatic transmission apparatus in accordance with one aspect of the present invention is a device that transmits power from the engine side thereof to an output shaft and is equipped with: a first shaft; a second shaft; a pair of planetary gear trains; first, second, and third pairs of counter gears; and a plurality of coupling elements. The first shaft receives power input from the engine side. The second shaft is provided so as to be parallel with the first shaft. The planetary gear trains are disposed on the second shaft. One or both planetary gear trains a first structural element and a second structural element to which power is input, a third structural element from which power is output, and a fourth structural element disposed in the power transmission path. The first, second and third pairs of counter gears couple the first shaft with the structural elements of the planetary gear trains and each have a different gear ratio. The plurality of coupling elements include first, second and third clutches and first and second brakes. The coupling elements are selectively activated in pairs of two elements in order to control the power transmission path. Furthermore, power is input to the first structural element of the planetary gear trains via either the first clutch and the first pair of counter gears or via the second clutch and the second pair of counter gears. Power is input to the second structural element of the planetary gear trains via the third clutch and the third pair of counter gears. The third structural element of the planetary gear trains is connected to the output shaft. The first brake is provided so as to brake the rotation of the second structural element. Seven speed levels are obtained by selectively activating two coupling elements from among the first clutch, second clutch, third clutch, first brake and second brake. With this automatic transmission apparatus, as described previously, power from the engine is input to the first shaft. This power is transmitted to the second shaft via a pair of counter gears, the torque is modified by the planetary gear trains, and then the power is output from the transmission. A transmission having seven speed levels, including five forward speeds and two reverse speeds, is obtained by selectively activating two coupling elements from among the plurality of clutches and brakes.

In the present invention, in addition to the operational effects mentioned previously, the addition of a third counter gear increases the degree of freedom with respect to setting the gear ratios.

An automatic transmission apparatus in accordance with certain aspects of the present invention can have the second brake provided so as to brake the rotation the fourth structural element.

An automatic transmission apparatus in accordance with another aspect of the present invention is a device that transmits power from the engine side thereof to an output shaft and is equipped with a first shaft, a second shaft, a pair of planetary gear trains, first and second pairs of counter gears, and a plurality of coupling elements. The first shaft receives power input from the engine side. The second shaft is provided so as to be parallel with the first shaft. The planetary gear trains are disposed on the second shaft and have a first structural element, a second structural element, and a third structural element to which power is input and a fourth structural element from which power is output. The first and second pairs of counter gears couple the first shaft with the structural elements of the planetary gear trains and each have a different gear ratio. The plurality of coupling elements include first, second and third clutches and first and second brakes. The coupling elements are selectively activated in pairs of two elements in order to control the power transmission path. Furthermore, power is input to the first structural element of the planetary gear trains via the first clutch and the first pair of counter gears. Power is input to the second structural element of the planetary gear trains via the second clutch and the second pair of counter gears. Power is input to the fourth structural element of the planetary gear trains via the third clutch and second pair of counter gears. The third structural element C of the planetary gear trains is connected to the output shaft. The first brake is provided so as to brake the rotation of the second structural element. Seven speed levels are obtained by selectively activating two coupling elements from among the first clutch, second clutch, third clutch, first brake and second brake. With this automatic transmission apparatus, power from the engine is input to the first shaft. This power is transmitted to the second shaft via a pair of counter gears, its torque is modified by the planetary gear trains, and then the power is output from the transmission. A transmission having seven speed levels, including six forward speeds and one reverse speed, is obtained by selectively activating two coupling elements from among the three clutches and two brakes.

In the present invention, this automatic transmission apparatus with six forward speeds and one reverse speed provides the same operational effects as mentioned previously.

An automatic transmission apparatus in accordance with certain aspects of the present invention is a device that transmits power from the engine side thereof to an output shaft and is equipped with: a first shaft; a second shaft; a pair of planetary gear trains; first, second and third pairs of counter gears; and a plurality of coupling elements. The first shaft receives power input from the engine side. The second shaft is provided so as to be parallel with the first shaft. The planetary gear trains are disposed on the second shaft and have a first structural element, second structural element, and third structural element to which power is input, and a fourth structural element from which power is output. The first, second and third pairs of counter gears couple the first shaft with the structural elements of the planetary gear trains and each have a different gear ratio. The plurality of coupling elements include first, second and third clutches and first and second brakes. The coupling elements are selectively activated in pairs of two elements in order to control the power transmission path. Furthermore, power is input to the first structural element of the planetary gear trains via the first clutch and the first pair of counter gears. Power is input to the second structural element of the planetary gear trains via the second clutch and the third pair of counter gears. Power is input to the fourth structural element of the planetary gear trains via the third clutch and the second pair of counter gears. The third structural element of the planetary gear trains is connected to the output shaft. The first brake is provided so as to brake the rotation of the second structural element. Seven speed levels are obtained by selectively activating two coupling elements from among the first clutch, second clutch, third clutch, first brake and second brake. With this automatic transmission apparatus, as described previously, power from the engine is input to the first shaft. This power is transmitted to the second shaft via a pair of counter gears, the torque is modified by the planetary gear trains, and then the power is output from the transmission. A transmission having seven speed levels, including six forward speeds and one reverse speed, is obtained by selectively activating two coupling elements from among the plurality of clutches and brakes.

In the present invention, in addition to the operational effects mentioned previously, the addition of a third counter gear increases the degree of freedom with respect to setting the gear ratios.

An automatic transmission apparatus in accordance with certain aspects of the present invention can have the first brake provided so as to brake the rotation of the first structural element.

An automatic transmission apparatus in accordance with certain aspects of the present invention can have the first planetary gear train provided with a first ring gear, a first planet gear that meshes with the first ring gear, a first carrier that supports the first planet gear, and a first sun gear that meshes with the first planet gear. Meanwhile, the second planetary gear train has a second ring gear coupled with the first carrier, a second planet gear that meshes with the second ring gear, a second carrier that supports the second planet gear, and a second sun gear that meshes with the second planet gear and is coupled with the first sun gear. Furthermore, the first structural element is the first ring gear. The second structural element is the first carrier and the second ring gear. The third structural element is the second carrier. The fourth structural element is the first and second sun gears. With this transmission, the rotation from the engine side is input as two different types of rotation to the first ring gear and one type of rotation to the first carrier and second ring gear. The rotation is modified by the planetary gear trains and the rotation is output from the second carrier.

An automatic transmission apparatus in accordance with certain aspects of the present invention can have the first planetary gear train provided with a first ring gear, a first planet gear that meshes with the first ring gear, a first carrier that supports the first planet gear, and a first sun gear that meshes with the first planet gear. Meanwhile, the second planetary gear train has a second ring gear coupled with the first carrier, a second planet gear that meshes with the second ring gear, a second carrier that supports the second planet gear, and a second sun gear that meshes with the second planet gear and is coupled with the first sun gear. Furthermore, the first structural element is the first ring gear. The second structural element is the first carrier and the second ring gear. The third structural element is the second carrier. The fourth structural element is the first and second sun gears. With this transmission, the rotation from the engine side is input as one type of rotation to the first carrier, second ring gear, and first and second sun gears and as a different type of rotation to the first ring gear. The rotation is modified by the planetary gear trains and the rotation is output from the second carrier.

An automatic transmission apparatus in accordance with certain aspects of the present invention can have the first planetary gear train provided with a first ring gear, a first planet gear that meshes with the first ring gear, a first carrier that supports the first planet gear, and a first sun gear that meshes with the first planet gear. Meanwhile, the second planetary gear train has a second ring gear coupled with the first carrier, a second planet gear that meshes with the second ring gear, a second carrier that supports the second planet gear and is coupled with the first ring gear, and a second sun gear that meshes with the second planet gear. Furthermore, the first structural element is the first sun gear. The second structural element is the first carrier and the second ring gear. The third structural element is the first ring gear and second carrier. The fourth structural element is the second sun gear. With this transmission, the rotation from the engine side is input as two different types of rotation to the first sun gear and one type of rotation to the first carrier and second ring gear. The torque is modified by the planetary gear trains and the rotation is output from the first ring gear and second carrier.

An automatic transmission apparatus in accordance with certain aspects of the present invention can have the first planetary gear train provided with a first ring gear, a first planet gear that meshes with the first ring gear, a first carrier that supports the first planet gear, and a first sun gear that meshes with the first planet gear. Meanwhile, the second planetary gear train has a second ring gear coupled with the first carrier, a second planet gear that meshes with the second ring gear, a second carrier that supports the second planet gear and is coupled with the first ring gear, and a second sun gear that meshes with the second planet gear. Furthermore, the first structural element is the first sun gear. The second structural element is the first carrier and the second ring gear. The third structural element is the first ring gear and second carrier. The fourth structural element is the second sun gear. With this transmission, the rotation from the engine side is input as one type of rotation to the first carrier, second ring gear, and second sun gear and as a different type of rotation to the first sun gear. The torque is modified by the planetary gear trains and the rotation is output from the first ring gear and the second carrier.

An automatic transmission apparatus in accordance with certain aspects of the present invention can have the first planetary gear train provided with a first ring gear, a first planet gear that meshes with the first ring gear, a first carrier that supports the first planet gear, and a first sun gear that meshes with the first planet gear. Meanwhile, the second planetary gear train has a second ring gear; a second planet gear that meshes with the second ring gear, a second carrier that supports the second planet gear and is coupled with the first carrier, and a second sun gear that meshes with the second planet gear and is coupled with the first ring gear. Furthermore, the first structural element is the first ring gear and second sun gear. The second structural element is the first and second carriers. The third structural element is the second ring gear. The fourth structural element is the first sun gear. With this transmission, the rotation from the engine side is input as two different types of rotation to the first ring gear and second sun gear and one type of rotation to the first and second carriers. The torque is modified by the planetary gear trains and the rotation is output from the second ring gear.

An automatic transmission apparatus in accordance with certain aspects of the present invention can have the first planetary gear train provided with a first ring gear, a first planet gear that meshes with the first ring gear, a first carrier that supports the first planet gear, and a first sun gear that meshes with the first planet gear. Meanwhile, the second planetary gear train has a second ring gear; a second planet gear that meshes with the second ring gear, a second carrier that supports the second planet gear and is coupled with the first carrier, and a second sun gear that meshes with the second planet gear and is coupled with the first ring gear. Furthermore, the first structural element is the first ring gear and second sun gear. The second structural element is the first and second carriers. The third structural element is the second ring gear. The fourth structural element is the first sun gear. With this transmission, the rotation from the engine side is input as one type of rotation to the first and second carriers and the first sun gear and as a different type of rotation to the first ring gear and the second sun gear. The torque is modified by the planetary gear trains and the rotation is output from the second ring gear.

An automatic transmission apparatus in accordance with certain aspects of the present invention can have the first and second planetary gear trains that can be provided with a common ring gear, a common planet gear that meshes with the common ring gear, a first sun gear that meshes with the common planet gear, a small planet gear that meshes with the common planet gear, a common carrier that supports the common planet gear and the small planet gear, and a second sun gear that meshes with the small planet gear. Furthermore, the first structural element is the first sun gear. The second structural element is the common carrier. The third structural element is the common ring gear. The fourth structural element is the second sun gear. With this transmission, the rotation from the engine side is input as two different types of rotation to the first sun gear and one type of rotation to the common carrier. The torque is modified by the planetary gear trains and the rotation is output from the common ring gear.

An automatic transmission apparatus in accordance with certain aspects of the present invention can have the first and second planetary gear trains that can be provided with a common ring gear, a common planet gear that meshes with the common ring gear, a first sun gear that meshes with the common planet gear, a small planet gear that meshes with the common planet gear, a common carrier that supports the common planet gear and the small planet gear, and a second sun gear that meshes with the small planet gear. Furthermore, the first structural element is the first sun gear. The second structural element is the common carrier. The third structural element is the common ring gear. The fourth structural element is the second sun gear. With this transmission, the rotation from the engine side is input as one type of rotation to the common carrier and second sun gear and another type of rotation to the first sun gear. The torque is modified by the planetary gear trains and the rotation is output from the common ring gear.

An automatic transmission apparatus in accordance with certain aspects of the present invention can have the first and second planetary gear trains that can be provided with a common ring gear, a common planet gear that meshes with the common ring gear, a first sun gear that meshes with the common planet gear, a small planet gear that meshes with the common planet gear, a common carrier that supports the common planet gear and the small planet gear, and a second sun gear that meshes with the small planet gear. Furthermore, the first structural element is the second sun gear. The second structural element is the common ring gear. The third structural element is the common carrier. The fourth structural element is the first sun gear. With this transmission, the rotation from the engine side is input as two different types of rotation to the second sun gear and one type of rotation to the common ring gear. The torque is modified by the planetary gear trains and the rotation is output from the common carrier.

An automatic transmission apparatus with certain aspects of the present invention can have the first and second planetary gear trains that can be provided with a common ring gear, a common planet gear that meshes with the common ring gear, a first sun gear that meshes with the common planet gear, a small planet gear that meshes with the common planet gear, a common carrier that supports the common planet gear and the small planet gear, and a second sun gear that meshes with the small planet gear. Furthermore, the first structural element is the second sun gear. The second structural element is the common ring gear. The third structural element is the common carrier. The fourth structural element is the first sun gear. With this transmission, the rotation from the engine side is input as one type of rotation to the common ring gear and first sun gear and another type of rotation to the second sun gear. The torque is modified by the planetary gear trains and the rotation is output from the common carrier.

An automatic transmission apparatus in accordance with certain aspects of the present invention can have a hydraulic coupling part having an impeller, a turbine, and a stator is provided on the input side of the first planetary gear train.

These and other objects, features, aspects and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure:

FIG. 11 is a graph illustrating the control of the coupling elements and the gear ratio for each speed level of the first embodiment shown in FIG. 9;

FIG. 14 is a graph illustrating the control of the coupling elements and the gear ratio for each speed level of the second embodiment shown in FIG. 12;

FIG. 17 is a graph illustrating the control of the coupling elements and the gear ratio for each speed level of the third embodiment shown in FIG. 15;

FIG. 20 is a graph illustrating the control of the coupling elements and the gear ratio for each speed level of the fourth embodiment shown in FIG. 18;

FIG. 23 is a graph illustrating the control of the coupling elements and the gear ratio for each speed level of the fifth embodiment shown in FIG. 19;

FIG. 28 is a graph illustrating the control of the coupling elements and the gear ratio for each speed level of the sixth embodiment shown in FIG. 26;

FIG. 33 is a graph illustrating the control of the coupling elements and the gear ratio for each speed level of the seventh embodiment shown in FIG. 31;

FIG. 36 is a graph illustrating the control of the coupling elements and the gear ratio for each speed level of the eighth embodiment shown in FIG. 31;

FIG. 39 is a graph illustrating the control of the coupling elements and the gear ratio for each speed level of the ninth embodiment shown in FIG. 3;

FIG. 42 is a graph illustrating the control of the coupling elements and the gear ratio for each speed level of the tenth embodiment shown in FIG. 40;

FIG. 45 is a graph illustrating the control of the coupling elements and the gear ratio for each speed level of the eleventh embodiment shown in FIG. 43;

FIG. 51 is a graph illustrating the control of the coupling elements and the gear ratio for each speed level of the twelfth embodiment shown in FIG. 49.

DETAILED DESCRIPTION OF THE PREFERRED EMBODIMENTS

Transmission Configurations $I_1$–$I_5$

Referring to FIGS. 7A–7E, five configurations $I_1$–$I_5$ for automatic transmission apparatuses are illustrated in accordance with five of the embodiments of the present invention. Each of the transmission configurations $I_1$–$I_5$ of FIGS. 7A–7E have five forward speeds and two reverse speeds, and includes a plurality of pairs of counter gears, a plurality of clutches, a plurality of brakes, and a plurality of planetary gear trains, as explained below. In the FIGS. 7A–7E, planetary gear trains 11 and 12 are provided on a second shaft 31 as seen in FIGS. 9, 12, 15, 18 and 21. Second shaft 31 is disposed so as to be substantially parallel with the input or first shaft 10. In the present invention, the structural elements of planetary gear trains 11 and 12 that serve to transmit power are indicated as structural elements A, B, C and D. Between structural element A and first shaft 10, clutch CA1 is provided on the first shaft side and clutch CA2 is provided on the second shaft side. Clutch CB1 is provided between structural element B and first shaft 10. First shaft 10 is coupled with structural element A (which is on the second shaft side) via clutch CA1 and the pair of counter gears X. First shaft 10 is also coupled with structural element A via the pair of counter gears Y and clutch CA2 and with structural element B (which is on the second shaft side) via the pair of counter gears Y and clutch CB1. Brake BB is provided to brake the rotation of structural element B and brake BD is provided to brake the rotation of structural element D.

Below, the details of the transmission configurations $I_1$–$I_5$ shown in the FIGS. 7A–7E are discussed.

Configuration $I_1$

Figure 7A:
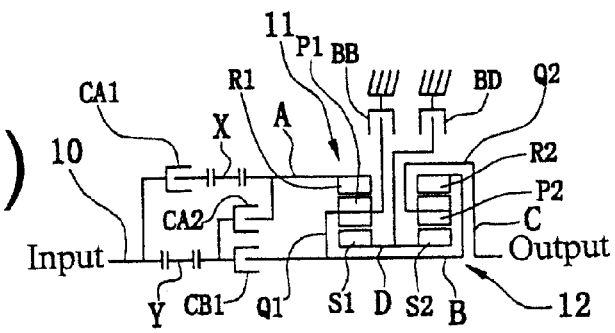
FIG. 7A is a schematic diagram of a transmission to be used in an automatic transmission apparatus of the present invention in accordance with Configuration I.

In the first configuration $I_1$, shown FIG. 7A, the transmission has two simple planetary gear trains 11 and 12. Each of planetary gear trains 11 and 12 has the following components, respectively: a ring gear R1, R2; a plurality of planet gears P1, P2 that mesh with the ring gear R1, R2; a carrier Q1, Q2 that supports the planet gears P1, P2 in a freely rotatable manner; and a sun gear S1, S2 that meshes with the planet gears P1, P2. Also, first carrier Q1 is coupled with second ring gear R2, first sun gear S1 is coupled with second sun gear S2, and second carrier Q2 serves as the output of the transmission. In the present invention, first ring gear R1 forms structural element A. First carrier Q1 and second ring gear R2 coupled thereto form structural element B. Second carrier Q2 forms structural element C. First sun gear S1 and second sun gear S2 coupled thereto form structural element D.

Configuration $I_2$

In the second configuration $I_2$, shown in FIG. 7B, the transmission again has two simple planetary gear trains 11 and 12 and the structural members of planetary gear trains 11 and 12 are the same as in the first configuration $I_1$. Also, first carrier Q1 is coupled with second ring gear R2 while first ring gear R1 is coupled with second carrier Q2 and serves as the output. In the present invention, first sun gear S1 forms structural element A. First carrier Q1 and second ring gear R2 coupled thereto form structural element B. First ring gear R1 and second carrier Q2 coupled thereto form structural element C. Second sun gear S2 forms structural element D.

Configuration $I_3$

In the third configuration $I_3$, shown in FIG. 7C, the transmission again has two simple planetary gear trains 11 and 12 and the structural members of planetary gear trains 11 and 12 are the same as in the first configuration $I_1$. Also, first carrier Q1 is coupled with second carrier Q2, first ring gear R1 is coupled with second sun gear S2, and second ring gear R2 and serves as the output. In the present invention, first ring gear R1 and second sun gear S2 coupled thereto form structural element A. First carrier Q1 and second carrier Q2 coupled thereto form structural element B. Second ring gear R2 forms structural element C. First sun gear S1 forms structural element D.

Configuration $I_4$

Figure 7B:
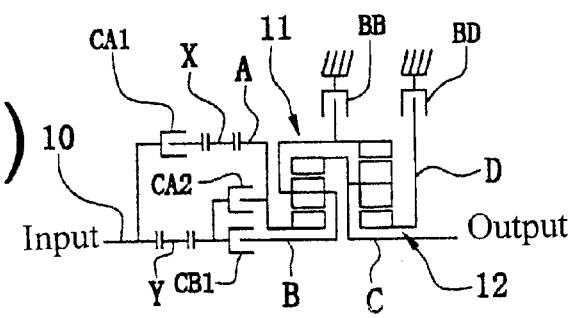
FIG. 7B is a schematic diagram of a transmission to be used in an automatic transmission apparatus of the present invention in accordance with Configuration $I_2$.
Figure 7C:
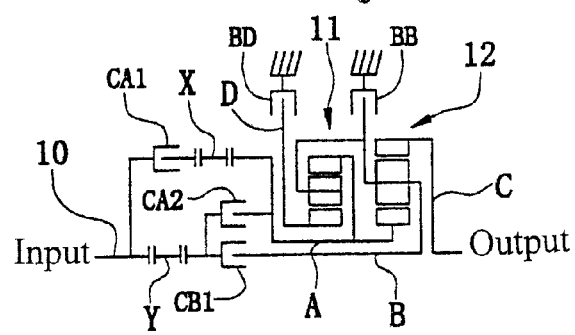
FIG. 7C is a schematic diagram of a transmission to be used in an automatic transmission apparatus of the present invention in accordance with Configuration $I_3$.
Figure 7D:
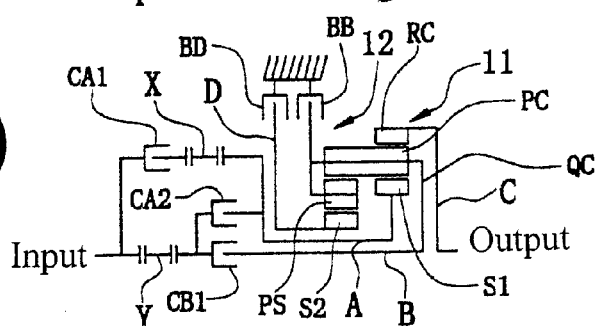
FIG. 7D is a schematic diagram of a transmission to be used in an automatic transmission apparatus of the present invention in accordance with Configuration $I_4$.

In the fourth configuration $I_4$, shown in FIG. 7D, the transmission has a simple planetary gear train 11 with a shared planet gear and a double planetary gear train 12 with a double planet gear. More specifically, planetary gear trains 11 and 12 have a common ring gear Rc, a common planet gear Pc that meshes with common ring gear Rc, a small planet gear Ps that meshes with common planet gear Pc, a common carrier Qc that supports common planet gear Pc and small planet gear Ps, a first sun gear S1 that meshes with common planet gear Pc, and a second sun gear S2 that meshes with small planet gear Ps. Also, common ring gear Rc serves as the output. In the present invention, first sun gear S1 forms structural element A. Common carrier Qc forms structural element B. Common ring gear Rc forms structural element C. Second sun gear S2 forms structural element D.

Configurations $I_5$

Figure 7E:
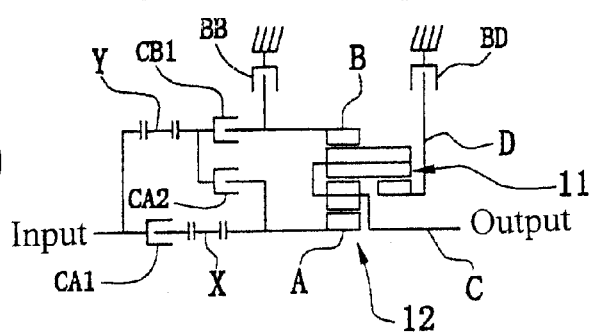
FIG. 7E is a schematic diagram of a transmission to be used in an automatic transmission apparatus of the present invention in accordance with Configuration $I_5$.

Similar to the fourth configuration $I_4$, in the fifth configuration $I_5$ shown in FIG. 7E, the transmission has a simple planetary gear train 11 with a shared planet gear and a double planetary gear train 12 with a double planet gear. Also, common carrier Qc and serves as the output. In the present invention, second sun gear S2 forms structural element A. Common ring gear Rc forms structural element B. Common carrier Qc forms structural element C. First sun gear S1 forms structural element D.

Speed Diagram for Configuration $I_1$–$I_4$

The speed diagram for the first through fourth configurations $I_1$–$I_4$ as shown in FIGS. 7A–7D are all similar. Thus, the speed characteristics of each of these configurations are discussed while referring to FIG. 8.

Figure 8:
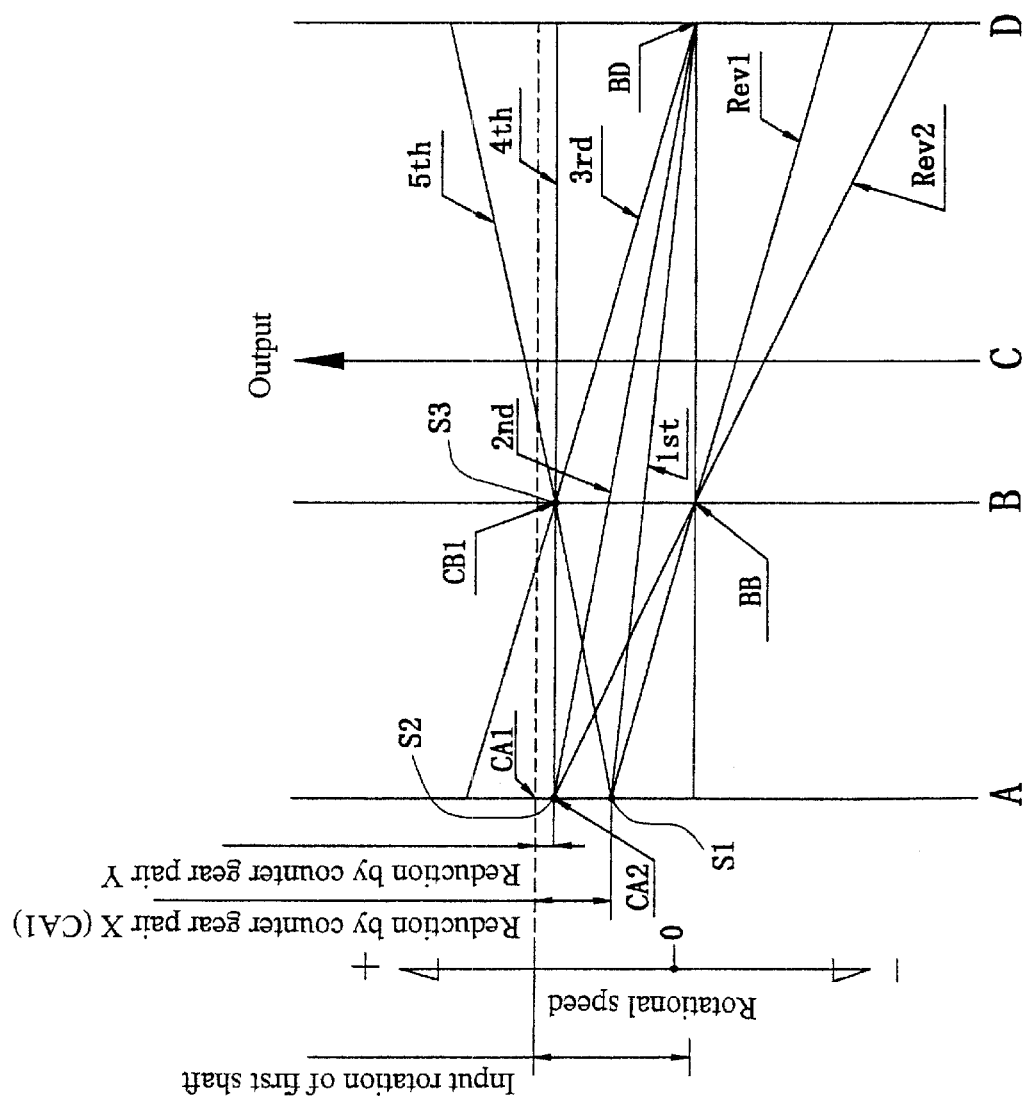
FIG. 8 is a graph showing operational characteristics of the coupling elements and a speed diagram illustrating each speed level of the transmissions of Configurations $I_1$–$I_5$.

FIG. 8 shows the control details of the coupling elements and the speed diagram for each speed level. In the speed diagram of FIG. 8, the vertical axis indicates the rotational speed and the horizontal axis indicates the positions of structural elements A, B, C and D. The position on the horizontal axis is determined by the reduction ratios between the structural elements. The "A", "B", "C" and "D" indicated on the horizontal axis correspond to the structural elements A, B, C and D shown in FIGS. 7A–7D.

First Forward Speed of Configuration $I_1$–$I_5$

In the first forward speed, clutch CA1 is turned ON (transmitting state) and brake BD is turned ON (braking). The other coupling elements, i.e., clutches CA2, CB1 and brake BB are turned OFF (power disconnected, brake released). As a result, the rotation fed from first shaft 10 is transmitted to structural element A via clutch CA1 and the pair of counter gears X and the rotation of structural element D is stopped. Thus, in the first forward speed, the rotation of first shaft 10 is reduced by the pair of counter gears X, transmitted to structural element A of planetary gear trains 11 and 12, reduced by planetary gear trains 11 and 12, and outputted from structural element C. Meanwhile, the rotation of structural element D is 0 (zero). Consequently, the first forward speed characteristic for the first forward speed is marked "$1^{st}$" in FIG. 8. The first forward speed characteristic is a straight line joining the rotational speed S1 of structural element A and the rotational speed (0) of structural element D.

Second Forward Speed of Configuration $I_1$–$I_5$

In the second forward speed, clutch CA2 and brake BD are turned ON, while clutches CA1 and CB1 and brake BB are turned OFF. As a result, the rotation fed from first shaft 10 is transmitted to structural element A via the pair of counter gears Y and clutch CA2. Also, the rotation of structural element D is stopped. Thus, in the second forward speed, the rotation fed from first shaft 10 is reduced by the pair of counter gears Y, transmitted to structural element A of planetary gear trains 11 and 12, reduced by planetary gear trains 11 and 12, and outputted from structural element C. Meanwhile, the rotation of structural element D is 0. Consequently, the second forward speed characteristic for the second forward speed is marked "$2^{nd}$" in FIG. 8. The second forward speed characteristic is a straight line joining the rotational speed S2 of structural element A and the rotational speed (0) of structural element D.

Third Forward Speed of Configuration $I_1$–$I_5$

In the third forward speed, clutch CB1 and brake BD are turned ON, while clutches CA1, CA2 and brake BB are turned OFF. As a result, the rotation fed from first shaft 10 is transmitted to structural element B via the pair of counter gears Y and clutch CB1. Also, the rotation of structural element D is stopped. Thus, in the third forward speed, the rotation fed from first shaft 10 is reduced by the pair of counter gears Y, transmitted to structural element B of planetary gear trains 11 and 12, reduced by planetary gear trains 11 and 12, and outputted from structural element C. Meanwhile, the rotation of structural element D is 0. Consequently, the third forward speed characteristic for the third forward speed is marked "$3^{rd}$" in FIG. 8. The third forward speed characteristic is a straight line joining the rotational speed S3 of structural element B and the rotational speed (0) of structural element D.

Fourth Forward Speed of Configuration $I_1$–$I_5$

In the fourth forward speed, clutches CA2 and CB1 are turned ON, while clutch CA1 and brakes BB and BD are all turned OFF. As a result, the rotation fed from first shaft 10 is transmitted to structural elements A and B via the pair of counter gears Y and clutches CA2 and CB1. In the present invention, the rotation fed from first shaft 10 is reduced by the pair of counter gears Y and transmitted to structural elements A and B of planetary gear trains 11 and 12, causing planetary gear trains 11 and 12 to rotate as an integral unit. Consequently, the fourth forward speed characteristic for the fourth forward speed is marked "$4^{th}$" in FIG. 8. The fourth forward speed characteristic is a straight line for which rotational speeds S2 and S3 of structural elements A and B are maintained at all locations.

Fifth Forward Speed of Configuration $I_1$–$I_5$

In the fifth forward speed, clutches CA1 and CB1 are turned ON, while clutch CA2 and brakes BB and BD are all turned OFF. As a result, the rotation fed from first shaft 10 is transmitted to structural element A via clutch CA1 and the pair of counter gears X and to structural element B via the pair of counter gears Y and clutch CB1. Thus, in the fifth forward speed, the rotation fed from first shaft 10 is reduced by the pair of counter gears X and transmitted to structural element A of planetary gear trains 11 and 12. Concurrently, the same rotation is reduced by the pair of counter gears Y and transmitted to structural element B of planetary gear trains 11 and 12. The rotation is then reduced by planetary gear trains 11 and 12 and then outputted from structural element C. Consequently, the fifth forward speed characteristic for the fifth forward speed is marked "$5^{th}$" in FIG. 8. The fifth forward speed characteristic is a straight line joining rotational speed S1 of structural element A and rotational speed S3 of structural element B.

First Reverse Speed of Configuration $I_1$–$I_5$

In the first reverse speed, clutch CA1 and brake BB are turned ON, while clutches CA2 and CB1 and brake BD are all turned OFF. As a result, the rotation fed from first shaft 10 is transmitted to structural element A via clutch CA1 and the pair of counter gears X, and the rotation of structural element B is stopped. Thus, in the first reverse speed, the rotation fed from first shaft 10 is reduced by the pair of counter gears X and transmitted to structural element A of planetary gear trains 11 and 12. The rotation is then reduced by planetary gear trains 11 and 12 and outputted from structural element C. Meanwhile, the rotation of structural element B is 0. Consequently, the first reverse speed characteristic for the first reverse speed is marked "Rev1" in FIG. 8. The first reverse speed characteristic is a straight line joining rotational speed S1 of structural element A and the rotational speed (0) of structural element B.

Second Reverse Speed of Configuration $I_1$–$I_5$

In the second reverse speed, clutch CA2 and brake BB are turned ON, while clutches CA1 and CB1 and brake BD are all turned OFF. As a result, the rotation fed from first shaft 10 is transmitted to structural element A via the pair of counter gears Y and clutch CA2, and the rotation of structural element B is stopped. Thus, in the second reverse speed, the rotation fed from first shaft 10 is reduced by the pair of counter gears Y and transmitted to structural element A of planetary gear trains 11 and 12. The rotation is then reduced by planetary gear trains 11 and 12, and then outputted from structural element C. Meanwhile, the rotation of structural element B is 0. Consequently, the second reverse speed characteristic for the second reverse speed is marked "Rev2" in FIG. 8. The second reverse speed characteristic is a straight line joining rotational speed S2 of structural element A and the rotational speed (0) of structural element B.

Operational Effects of Configurations $I_1$–$I_5$

Figure 1:
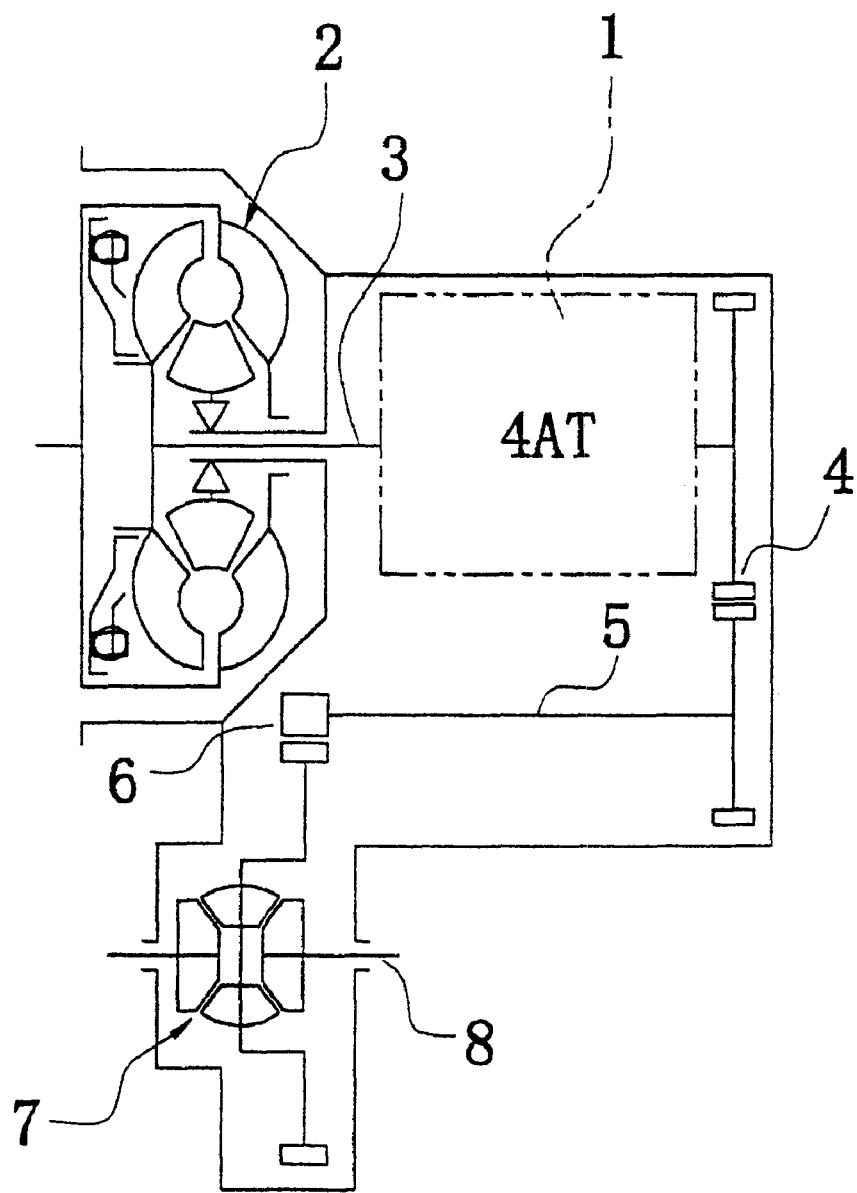
FIG. 1 is a schematic diagram of a conventional four-speed automatic transmission apparatus for driving the front wheels of a front wheel drive vehicle.
Figure 2A:
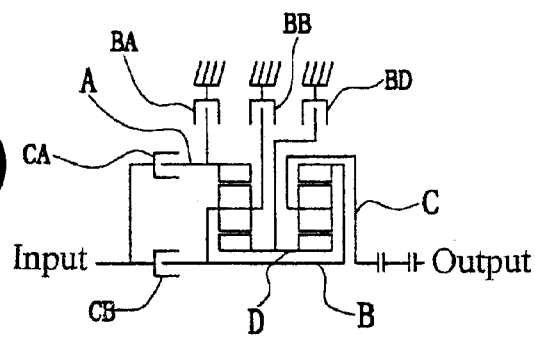
FIG. 2A is a schematic diagram of a first basic configuration for the conventional transmission illustrated in FIG. 1.
Figure 2B:
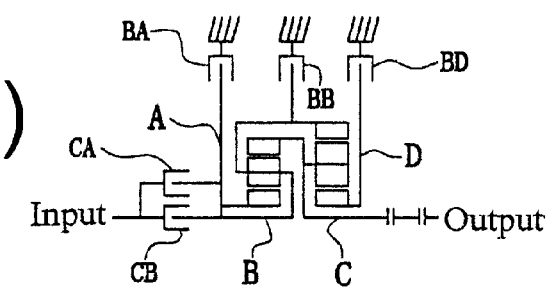
FIG. 2B is a schematic diagram of a second basic configuration for the conventional transmission illustrated in FIG. 1.
Figure 2C:
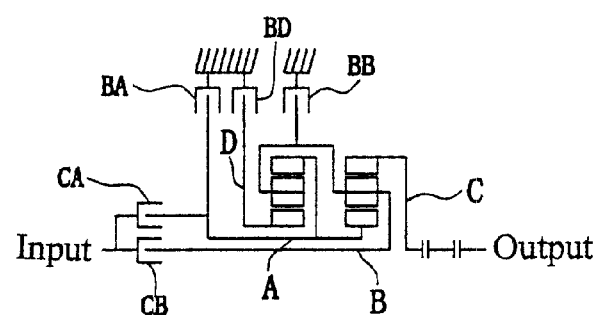
FIG. 2C is a schematic diagram of a third basic configuration for the conventional transmission illustrated in FIG. 1.
Figure 2D:
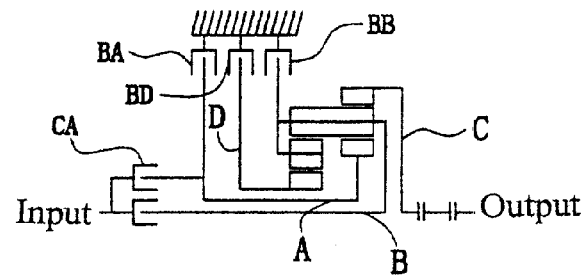
FIG. 2D is a schematic diagram of a fourth basic configuration for the conventional transmission illustrated in FIG. 1.
Figure 2E:
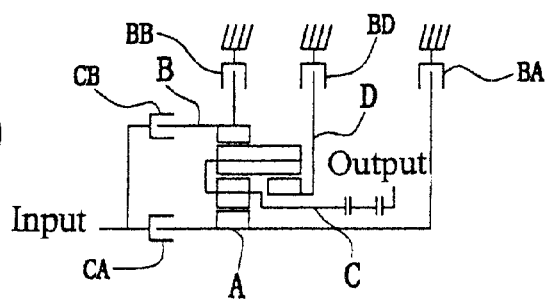
FIG. 2E is a schematic diagram of a fifth basic configuration for the conventional transmission illustrated in FIG. 1.
Figure 3:
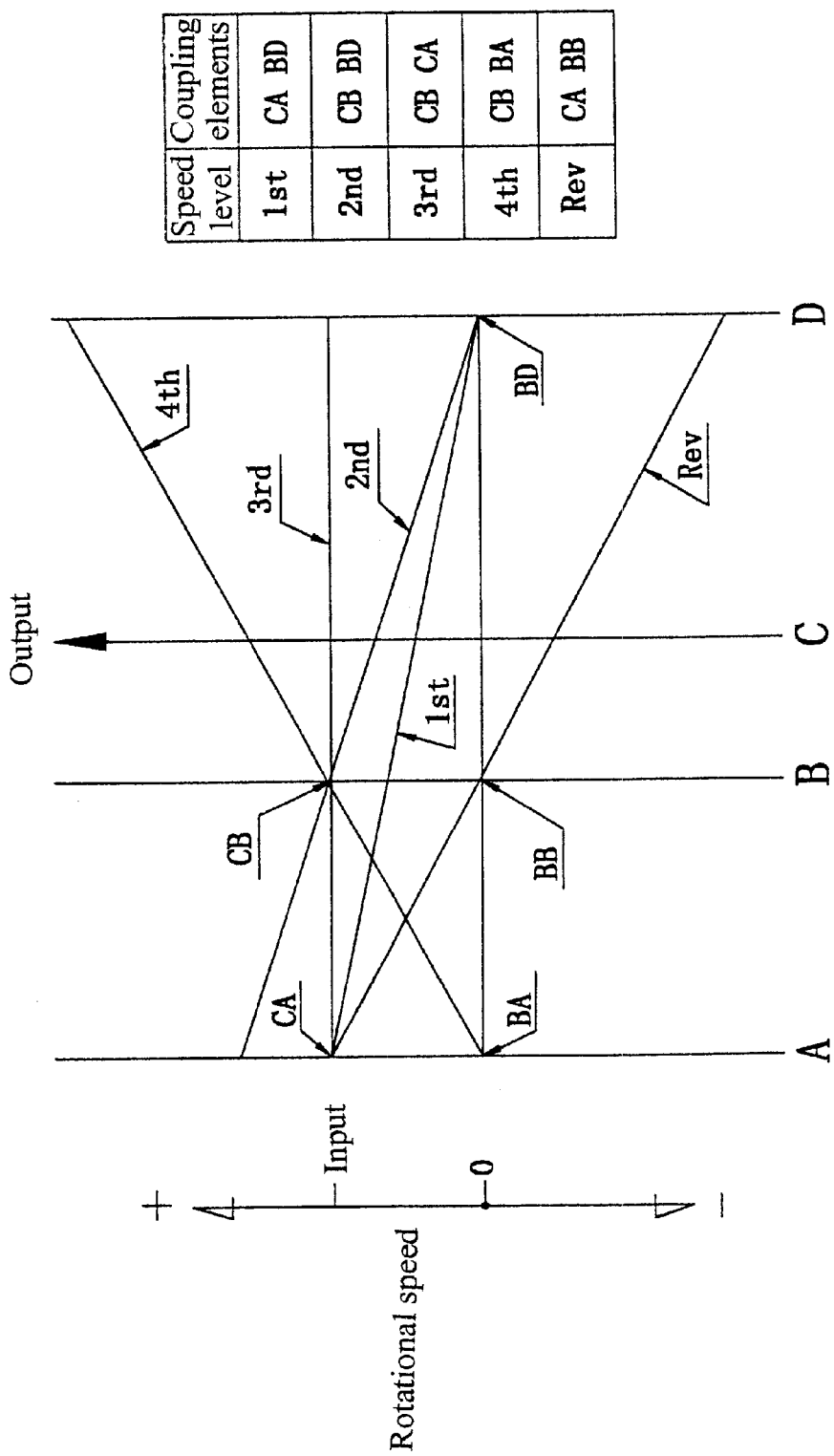
FIG. 3 is a graph showing operational characteristics of the coupling elements and a speed diagram illustrating each speed level of the conventional transmissions of FIGS. 2A–2E.
Figure 4A:
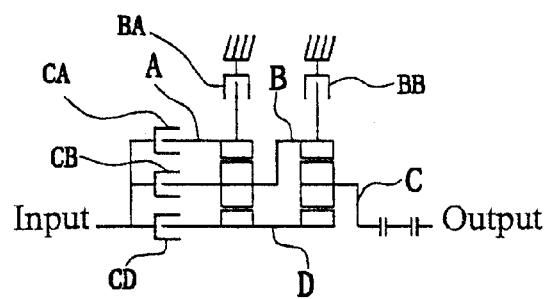
FIG. 4A is a schematic diagram of a sixth basic configuration for a conventional transmission.
Figure 4B:
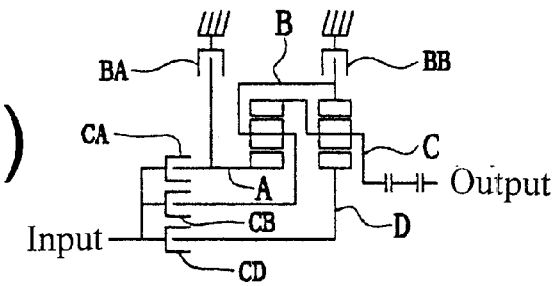
FIG. 4B is a schematic diagram of a seventh basic configuration for a conventional transmission.
Figure 4C:
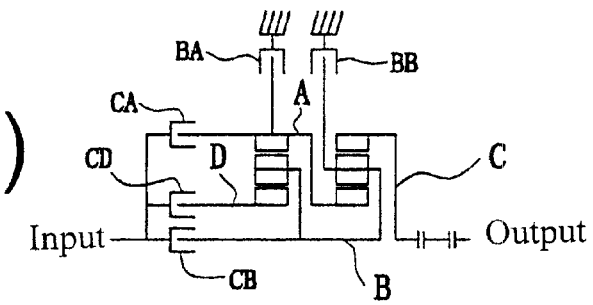
FIG. 4C is a schematic diagram of an eighth basic configuration for a conventional transmission.
Figure 4D:
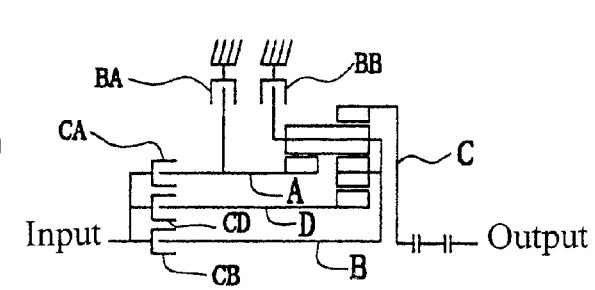
FIG. 4D is a schematic diagram of a ninth basic configuration for a conventional transmission.
Figure 4E:
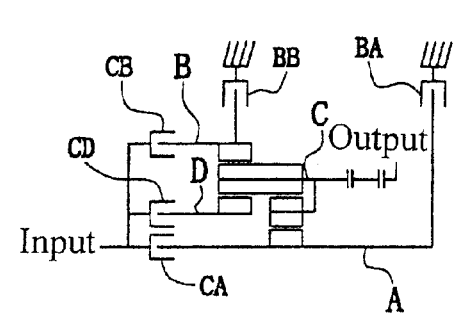
FIG. 4E is a schematic diagram of a tenth basic configuration for a conventional transmission.
Figure 5:
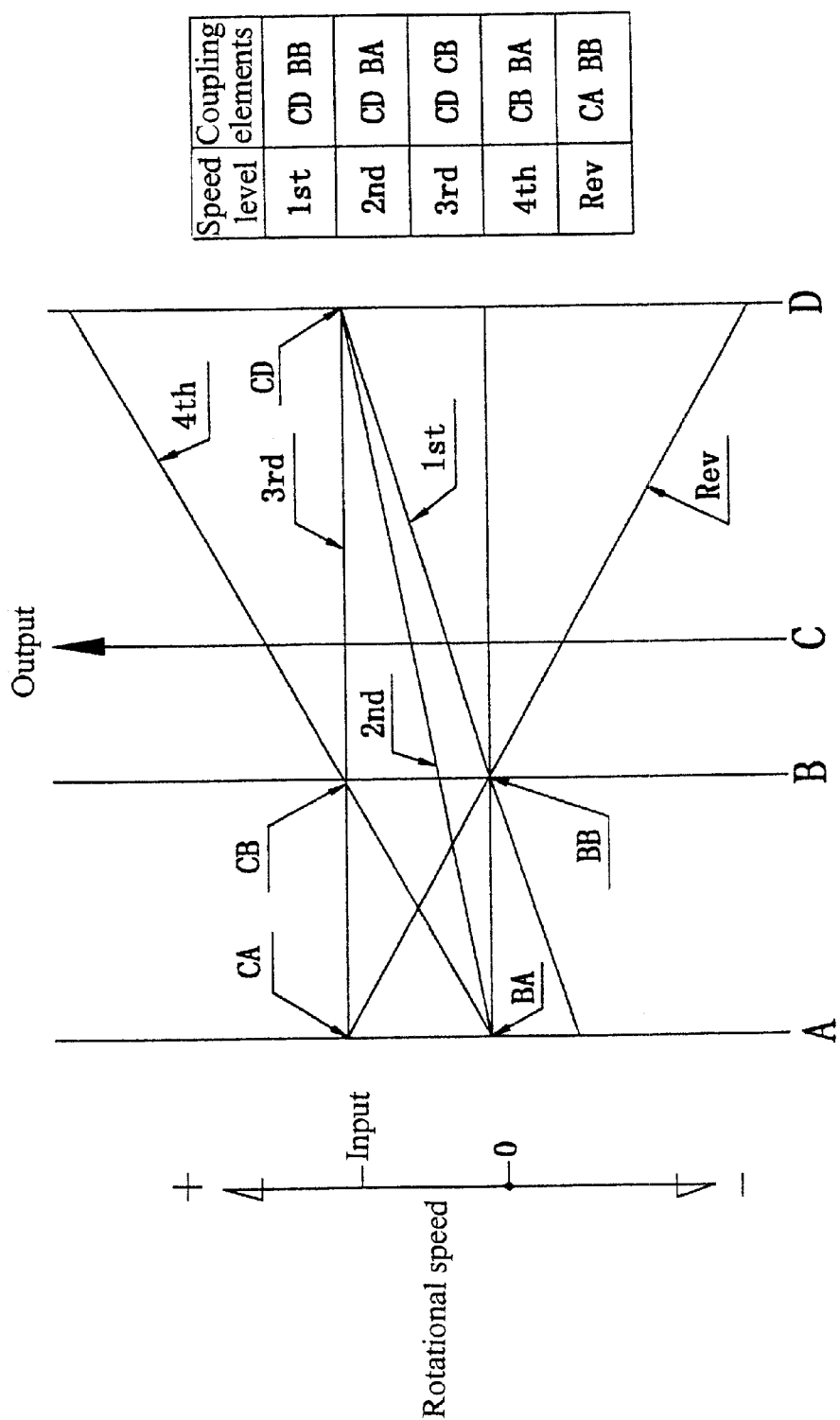
FIG. 5 is a graph showing operational characteristics of the coupling elements and a speed diagram illustrating each speed level of the conventional transmissions shown in FIG. 4A–4E.
Figure 6:
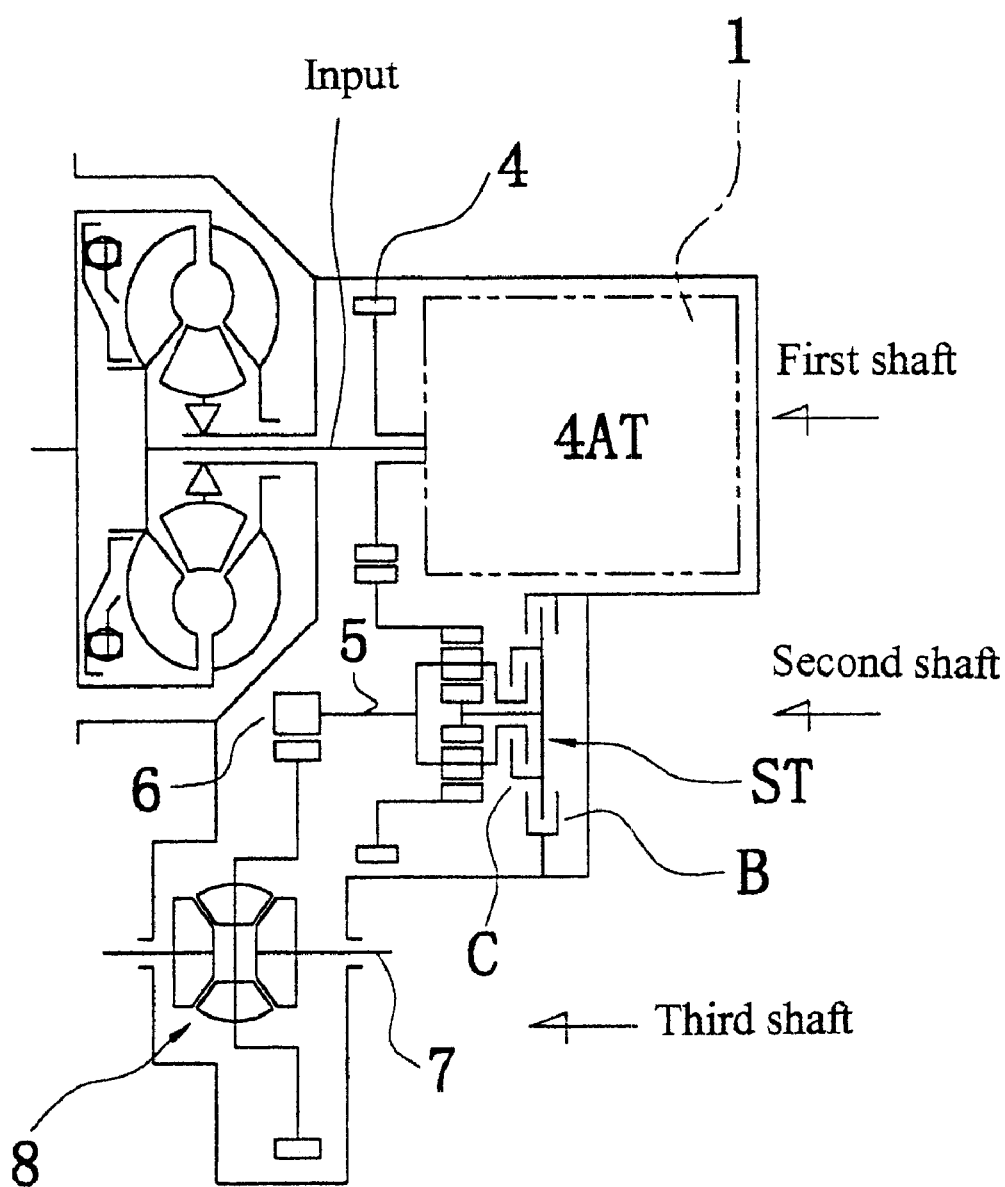
FIG. 6 is a schematic diagram of another conventional automatic transmission apparatus for driving the front wheels of a front wheel drive vehicle.

In a conventional transmission with four forward speeds and one reverse speed, structural element A has a brake (see item BA in FIG. 3) and uses only one type of speed region. With the configurations $I_1$–$I_5$ new speed regions are obtained. Specifically, the first and fifth forward speeds and the first reverse speed are obtained by inputting rotation to structural element A via clutch CA1, instead of using a brake. Also, by providing two pairs of counter gears X and Y to produce two types of rotation to be input to structural element A of the planetary gear trains, the number of speed regions is increased by two and a five-forward-speed/two-reverse-speed transmission apparatus having smaller differences between gear ratios can be realized. Furthermore, with a conventional five-forward speed automatic transmission apparatus, the first shaft and the second shaft are coupled by one pair of counter gears. Conversely, the configurations shown in FIGS. 7 use two pairs of counter gears to couple the first shaft and the second shaft and consequently the configuration is complex. However, with the conventional transmission apparatus, the output of the four-speed transmission is transmitted using a pair of counter gears. Consequently, the input torque increases by the amount by which the first forward speed is reduced and the input rotational speed increases by the amount by which the fourth forward speed is multiplied. Consequently, it is necessary to increase the torque capacity and rotational speed capacity of the gears and bearings of the pair of counter gears. Conversely, with the configurations shown in FIGS. 7A–7E, the bearings and gears of the pairs of counter gears X and Y can be made smaller because the pairs of counter gears transmit the input torque and input rotation without being multiplied. Also, since the rotation of the first shaft can be reduced by the pairs of counter gears X and Y as well as transmitted by them to the second shaft, the rotational speed of the structural elements of the planetary gear trains 11 and 12 can be lowered. Thus, the gear efficiency can be improved and the relative rotation between the frictional members of the clutches and brakes can be decreased. As a result, the power loss of the transmission apparatus as a whole can be reduced.

Variations on Configurations $I_1$–$I_5$

Regarding the two clutches that couple with structural element A of the planetary gear trains 11 and 12, FIGS. 7A–7E show clutch CA1 disposed on first shaft 10 and clutch CA2 disposed on the second shaft. However, it is also acceptable for clutch CA1 to be disposed on the second shaft.

First Embodiment Using Configuration $I_1$

Figure 9:
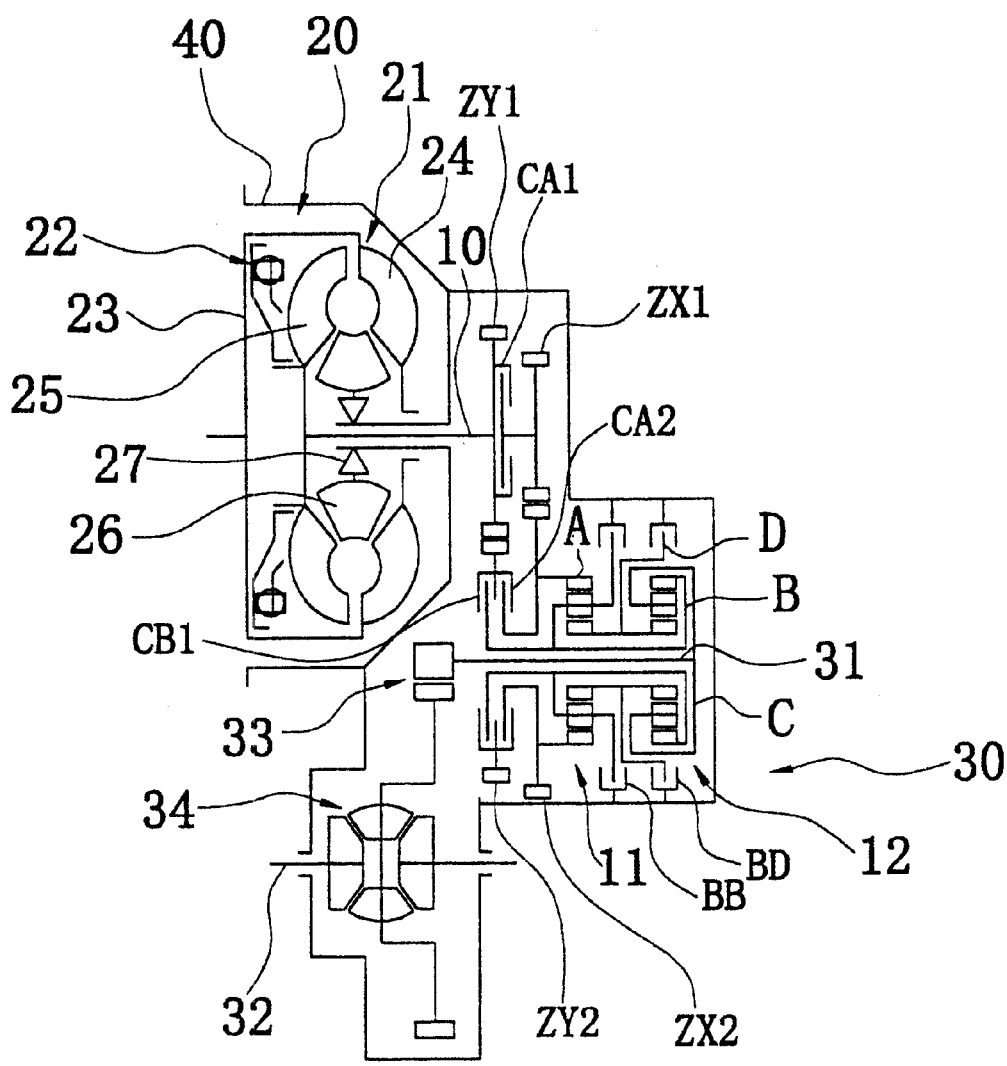
FIG. 9 is a schematic diagram of an automatic transmission apparatus utilizing Configuration $I_1$ of FIG. 7A in accordance with a first embodiment of the present invention.

A schematic view of the automatic transmission apparatus is shown in FIG. 9 in accordance with a first embodiment of the present invention. This automatic transmission apparatus uses the transmission configuration $I_1$ shown in FIG. 7A and has a torque converter 20 that serves as a hydraulic coupling to which power from the engine is input and a transmission 30 that is provided on the output side of torque converter 20. Torque converter 20 and transmission 30 are enclosed inside housing 40. Toque converter 20 has a torque converter main body 21 and a lockup clutch 22 for transmitting power from the engine directly to the output side.

Torque converter main body 21 has a front cover 23 coupled with the output part of the engine, an impeller 24 coupled with front cover 23, a turbine 25 axially facing impeller 24, and a stator 26 disposed between the inner circumferential portion of the impeller and turbine. Also, stator 26 is fixedly coupled to housing 40 via one-way clutch 27.

Transmission 30 has a first shaft 10 coupled to the output side of turbine 25, a second shaft 31 disposed so as to be parallel to first shaft 10, and an output shaft 32 is disposed toward the output side of second shaft 31 so as to be parallel to first shaft 10. In the embodiment, the first pair of counter gears X are represented by reference numerals ZX1 and ZX2, while the second pair of counter gears Y are represented by reference numbers ZY1 and ZY2. One gear each (i.e., ZX1 and ZY1, respectively) of the two pairs of counter gears X and Y and a clutch CA1 are disposed on first shaft 10. Planetary gear trains 11 and 12, clutches CA2 and CB1, brakes BB and BD, and one gear each (i.e., ZX2, and ZY2, respectively) of the pairs of counter gears X and Y are disposed on second shaft 31. Second shaft 31 and output shaft 32 are coupled together via the pair of counter gears 33 and a differential gear mechanism 34.

The gear reduction ratios $\alpha X$ and $\alpha Y$ of the two pairs of counter gears X and Y are given by the following equations: $\alpha X=ZX2/ZX1$; and $\alpha Y=ZY2/ZY1$, where ZX1, ZX2, ZY1 and ZY2 are the tooth counts of gears ZX1, ZX2, ZY1 and ZY2, respectively.

Meanwhile, the reduction ratios $\rho 1$ and $\rho 2$ of planetary gear trains 11 and 12 are given by the following equations: $\rho 1=ZS1/ZR1$; and $\rho 2=ZS2/ZR2$, where ZS1 is the tooth count of first sun gear S1, ZR1 is the tooth count of second ring gear R1, ZS2 is the tooth count of second sun gear S2, and ZR2 is the tooth count of second ring gear R2.

In this embodiment, the aforementioned gear ratios are set as follows:

$\alpha X=1.9$; $\alpha Y=1.2$; $\rho 1=0.45$; and $\rho 2=0.35$.

Next, the gear ratio of each speed level will be explained. However, detailed explanations regarding the ON/OFF control of the coupling elements and the speed diagram for each speed level are omitted here because these items are exactly the same as explained previously with reference to FIG. 8.

First Forward Speed

Figure 10:
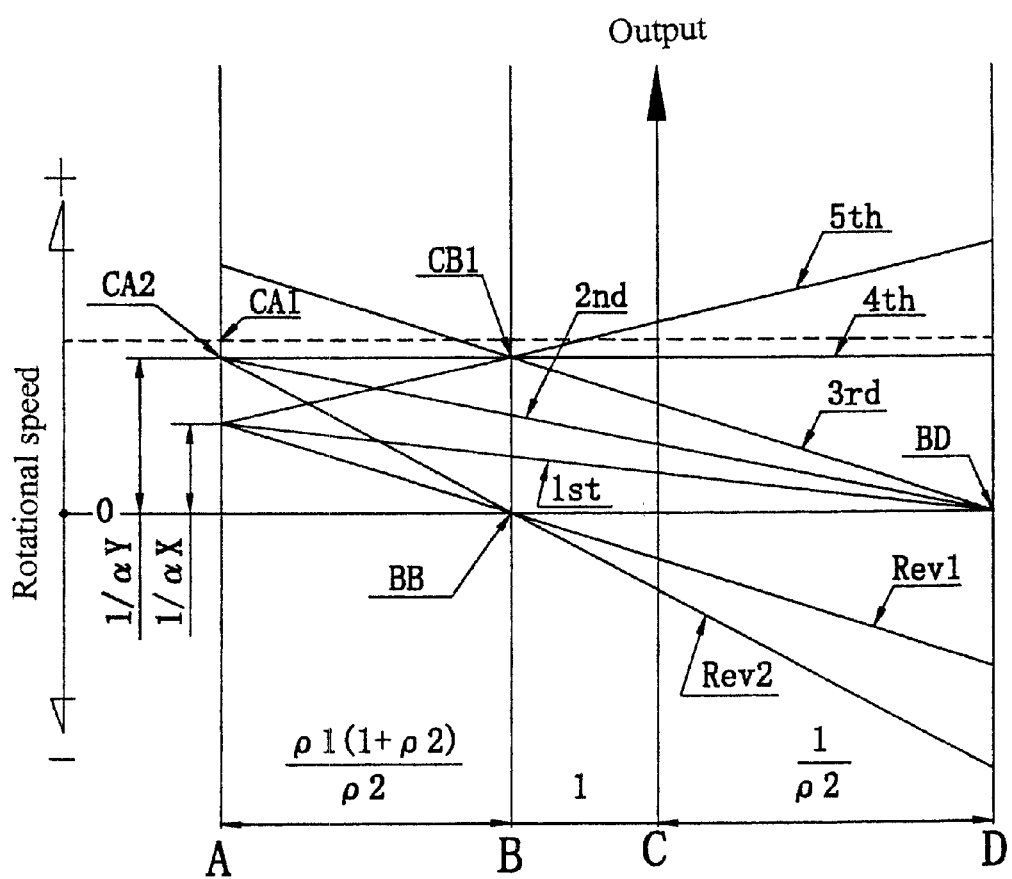
FIG. 10 is a graph showing operational characteristics of the coupling elements and a speed diagram for each speed level of the first embodiment shown in FIG. 9.

In the first forward speed, by turning on clutch CA1 and brake BD, the rotation fed from first shaft 10 is reduced by the pair of counter gears X, transmitted to first ring gear R1 (structural element A), reduced by planetary gear trains 11 and 12, and outputted from second carrier Q2 (structural element C). The first forward speed characteristic in this case is basically the same as the speed characteristic marked "$1^{st}$" in FIG. 8. More specifically, the first forward speed characteristic is marked "$1^{st}$" in FIG. 10. Meanwhile, as shown in FIG. 11, the gear reduction ratio is given by the equation $(1+\rho 1)(1+\rho 2)\alpha X$, which is preferably 3.72 in this embodiment. The gear ratio mentioned here is the gear ratio at the output portion of second shaft 31 and the same holds for the other speeds discussed below.

Second Forward Speed

In the second forward speed, by turning ON clutch CA2 and brake BD, the rotation fed from first shaft 10 is reduced by the pair of counter gears Y, transmitted to first ring gear R1 (structural element A), reduced by planetary gear trains 11 and 12, and outputted from second carrier C. The second forward speed characteristic in this case is marked "$2^{nd}$" in FIG. 10. Meanwhile, as shown in FIG. 11, the gear reduction ratio is given by the equation $(1+\rho 1)(1+\rho 2)\alpha Y$, which is preferably 2.35 in this embodiment.

Third Forward Speed

In the third forward speed, by turning ON clutch CB1 and brake BD, the rotation fed from first shaft 10 is reduced by the pair of counter gears Y, transmitted to first carrier Q1 and second ring gear R2 (structural element B), reduced by planetary gear trains 11 and 12, and outputted from second carrier Q2. The third forward speed characteristic in this case is marked "$3^{rd}$" in FIG. 10. Meanwhile, as shown in FIG. 11, the gear reduction ratio is given by the equation $(1+\rho 2)\alpha Y$, which is preferably 1.62 in this embodiment.

Fourth Forward Speed

In the fourth forward speed, by turning ON clutches CA2 and CB1, the rotation fed from first shaft 10 is reduced by the pair of counter gears Y and transmitted to first ring gear R1, first carrier Q1, and second ring gear R2. This causes planetary gear trains 11 and 12 to rotate as an integral unit. The fourth forward speed characteristic is marked "$4^{th}$" in FIG. 10. Meanwhile, as shown in FIG. 11, the gear reduction ratio $\alpha Y$ is preferably 1.2 in this embodiment.

Fifth Forward Speed

In the fifth forward speed, by turning ON clutches CA1 and CB1, the rotation fed from first shaft 10 is reduced by the pair of counter gears X and transmitted to first ring gear R1, while concurrently, the same rotation is reduced by the pair of counter gears Y and transmitted to first carrier Q1 and second ring gear R2. The rotation is then reduced by planetary gear trains 11 and 12 and outputted from second carrier Q2. The fifth forward speed characteristic in this case is marked "$5^{th}$" in FIG. 10. Meanwhile, as shown in FIG. 11, the gear ratio is given by the equation $\rho 1(1+\rho 2)\alpha X\alpha Y/\{(1+\rho 1\rho 2+\rho 2)\alpha X-\rho 2\alpha X\}$, which is preferably 0.99 in this embodiment.

First Reverse Speed

In the first reverse speed, by turning ON clutch CA1 and brake BB, the rotation fed from first shaft 10 is reduced by the pair of counter gears X, transmitted to first ring gear R1, reduced by planetary gear trains 11 and 12, and outputted from second carrier Q2. The first reverse speed characteristic in this case is marked "Rev1" in FIG. 10. Meanwhile, as shown in FIG. 11, the gear ratio is given by the equation $\rho 1(1+\rho 2)\alpha X/\rho 2$, which is preferably 3.3 in this embodiment.

Second Reverse Speed

In the second reverse speed, by turning ON clutch CA2 and brake BB, the rotation fed from first shaft 10 is reduced by the pair of counter gears Y, transmitted to first ring gear R1, reduced by planetary gear trains 11 and 12, and outputted from second carrier Q2. The second reverse speed characteristic in this case is marked "Rev2" in FIG. 10. Meanwhile, as shown in FIG. 11, the gear ratio is given by the equation $\rho 1(1+\rho 2)\alpha Y/\rho 2$.

There are five coupling elements CA, CB, BA, BB and BD in the automatic transmission apparatus of this embodiment. The structure of this embodiment is simple and the manufacturing cost is reduced. It is also easy to narrow the differences between gear ratios.

Second Embodiment Using Configuration $I_2$

Figure 12:
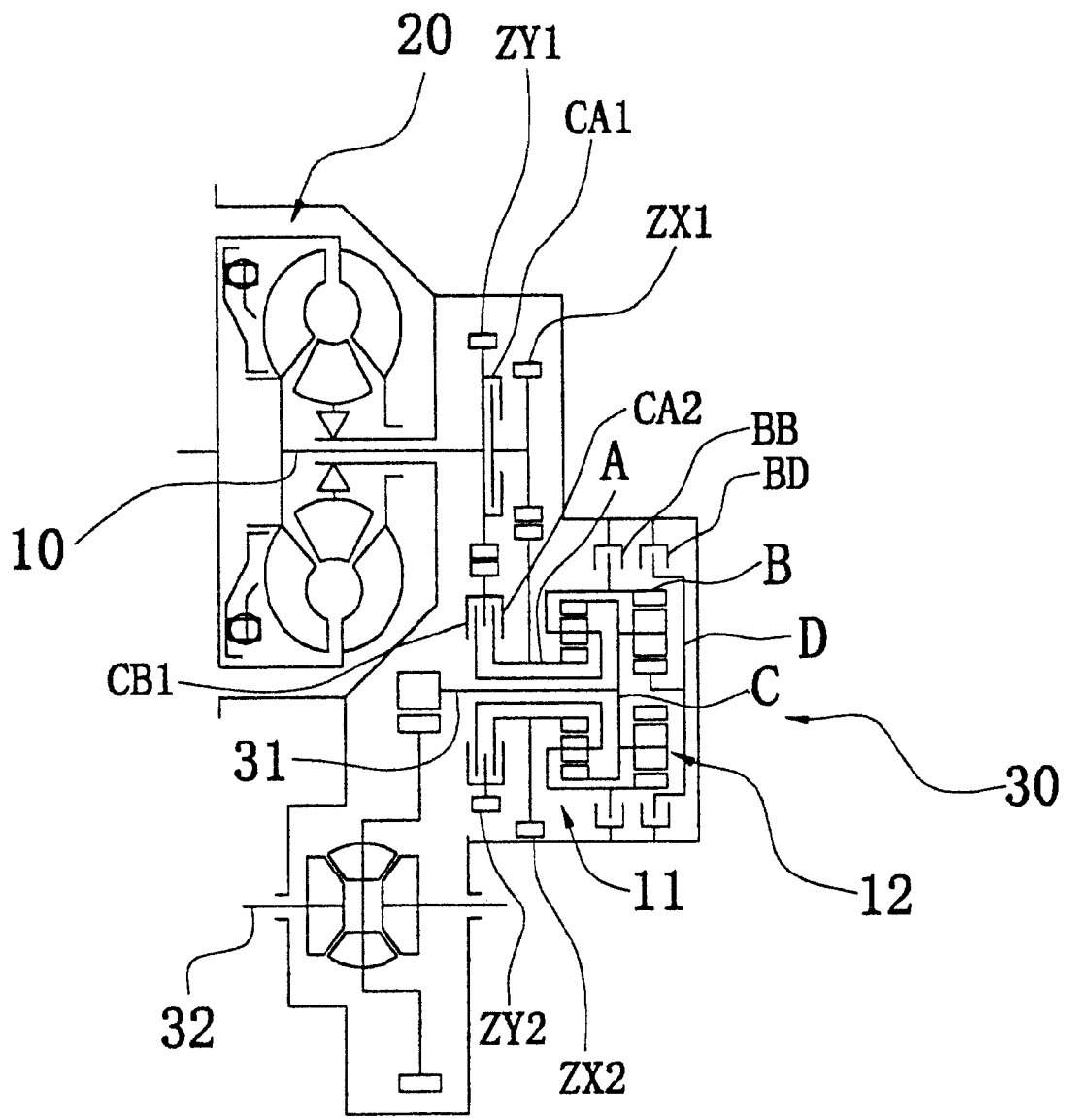
FIG. 12 is a schematic diagram of an automatic transmission apparatus utilizing Configuration $I_2$ of FIG. 7B in accordance with a second embodiment of the present invention.

A schematic view of the automatic transmission apparatus is shown in FIG. 12 in accordance with a second embodiment of the present invention. This automatic transmission apparatus uses the transmission configuration $I_2$ shown in FIG. 7B and has basically the same construction and operation as the first embodiment. The only differences are in the parts related to the transmission, which are constructed as shown in FIG. 7B. In this embodiment, the gear ratios of the pairs of counter gears X and Y and planetary gear trains 11 and 12 are set as follows: $\alpha X=1.8$; $\alpha Y=1.2$; $\rho 1=0.6$; and $\rho 2=0.38$.

Next, the gear reduction ratio of each speed level is explained. However, detailed explanations regarding the ON/OFF control of the coupling elements CA, CB, BA, BB and BD and the speed diagram for each of the speed levels are omitted here because these items are exactly the same as explained previously regarding FIG. 8.

First Forward Speed

Figure 13:
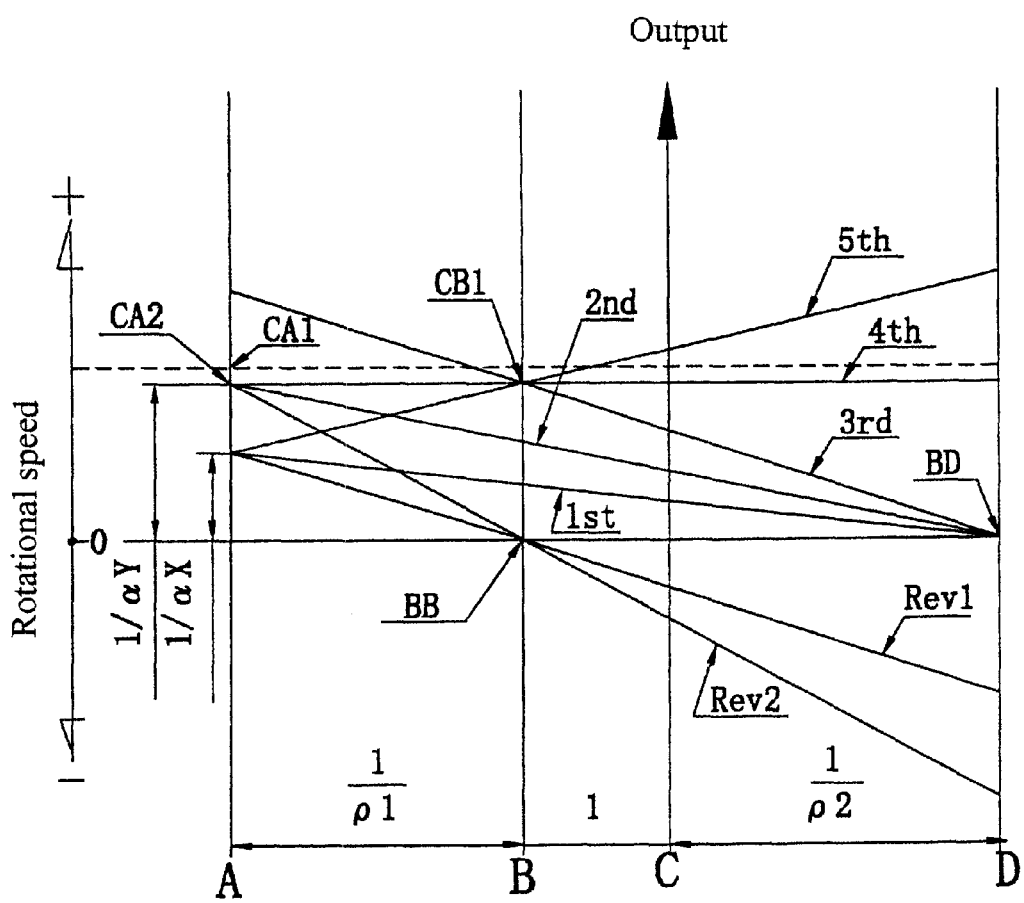
FIG. 13 is a graph showing operational characteristics of the coupling elements and a speed diagram for each speed level of the second embodiment shown in FIG. 12.

In the first forward speed, by turning on clutch CA1 and brake BD, the rotation fed from first shaft 10 is reduced by the pair of counter gears X, transmitted to first sun gear S1 (structural element A), reduced by planetary gear trains 11 and 12, and outputted from first ring gear R1 and second carrier Q2 coupled thereto (structural element C). The output part remains the same for the other speed levels discussed below. The first forward speed characteristic in this case is marked "$1^{st}$" in FIG. 13 (which is basically the same as FIG. 8). Meanwhile, as shown in FIG. 14, the gear reduction ratio is given by the equation $(\rho 1+\rho 1\rho 2+\rho 2)\alpha X/\rho 1$, which is preferably 3.72 in this embodiment. Again, the gear ratio mentioned here is the gear ratio at the output portion of second shaft 31.

Second Forward Speed

In the second forward speed, by turning ON clutch CA2 and brake BD, the rotation fed from first shaft 10 is reduced by the pair of counter gears Y, transmitted to first sun gear S1, reduced by planetary gear trains 11 and 12, and outputted. The second forward speed characteristic in this case is marked "$2^{nd}$" in FIG. 13.

Meanwhile, as shown in FIG. 14, the gear ratio is given by the equation $(\rho 1+\rho 1\rho 2+\rho 2)\alpha Y/\rho 1$, which is preferably 2.42 in this embodiment.

Third Forward Speed

In the third forward speed, by turning ON clutch CB1 and brake BD, the rotation fed from first shaft 10 is reduced by the pair of counter gears Y, transmitted to first carrier Q1 and second ring gear R2 (structural element B), reduced by planetary gear trains 11 and 12, and outputted. The third forward speed characteristic in this case is marked "$3^{rd}$" in FIG. 13. Meanwhile, as shown in FIG. 14, the gear ratio is given by the equation $(1+\rho 2)\alpha Y$, which is preferably 1.66 in this embodiment.

Fourth Forward Speed

In the fourth forward speed, planetary gear trains 11 and 12 are made to rotate as an integral unit by turning ON clutches CA2 and CB1. The fourth forward speed characteristic in this case is marked "$4^{th}$" in FIG. 13. Meanwhile, as shown in FIG. 14, the gear ratio $\alpha Y$ is preferably 1.2 in this embodiment.

Fifth Forward Speed

In the fifth forward speed, by turning ON clutches CA1 and CB1, the rotation fed from first shaft 10 is reduced by the pair of counter gears X and transmitted to first sun gear S1, while concurrently, the same rotation is reduced by the pair of counter gears Y and transmitted to first carrier Q1 and second ring gear R2. The rotation is then reduced by planetary gear trains 11 and 12 and outputted. The fifth forward speed characteristic in this case is marked "$5^{th}$" in FIG. 13. Meanwhile, as shown in FIG. 14, the gear ratio is given by the equation $\alpha X\alpha Y/\{(1+\rho 1)\alpha X-\rho 1\alpha Y\}$, which is preferably 0.99 in this embodiment.

First Reverse Speed

In the first reverse speed, by turning ON clutch CA1 and brake BB, the rotation fed from first shaft 10 is reduced by the pair of counter gears X, transmitted to first sun gear S1, reduced by planetary gear trains 11 and 12, and outputted. The first reverse speed characteristic in this case is marked "Rev1" in FIG. 13. Meanwhile, as shown in FIG. 14, the gear ratio is given by the equation $\alpha X/\rho 1$, which is preferably 3.08 in this embodiment.

Second Reverse Speed

In the second reverse speed, by turning ON clutch CA2 and brake BB, the rotation fed from first shaft 10 is reduced by the pair of counter gears Y, transmitted to first sun gear S1, reduced by planetary gear trains 11 and 12, and outputted. The second reverse speed characteristic in this case is marked "Rev2" in FIG. 13. Meanwhile, as shown in FIG. 14, the gear ratio is given by the equation $\alpha Y/\rho 1$, which is preferably 2.0 in this embodiment.

Third Embodiment Using Configuration $I_3$

Figure 15:
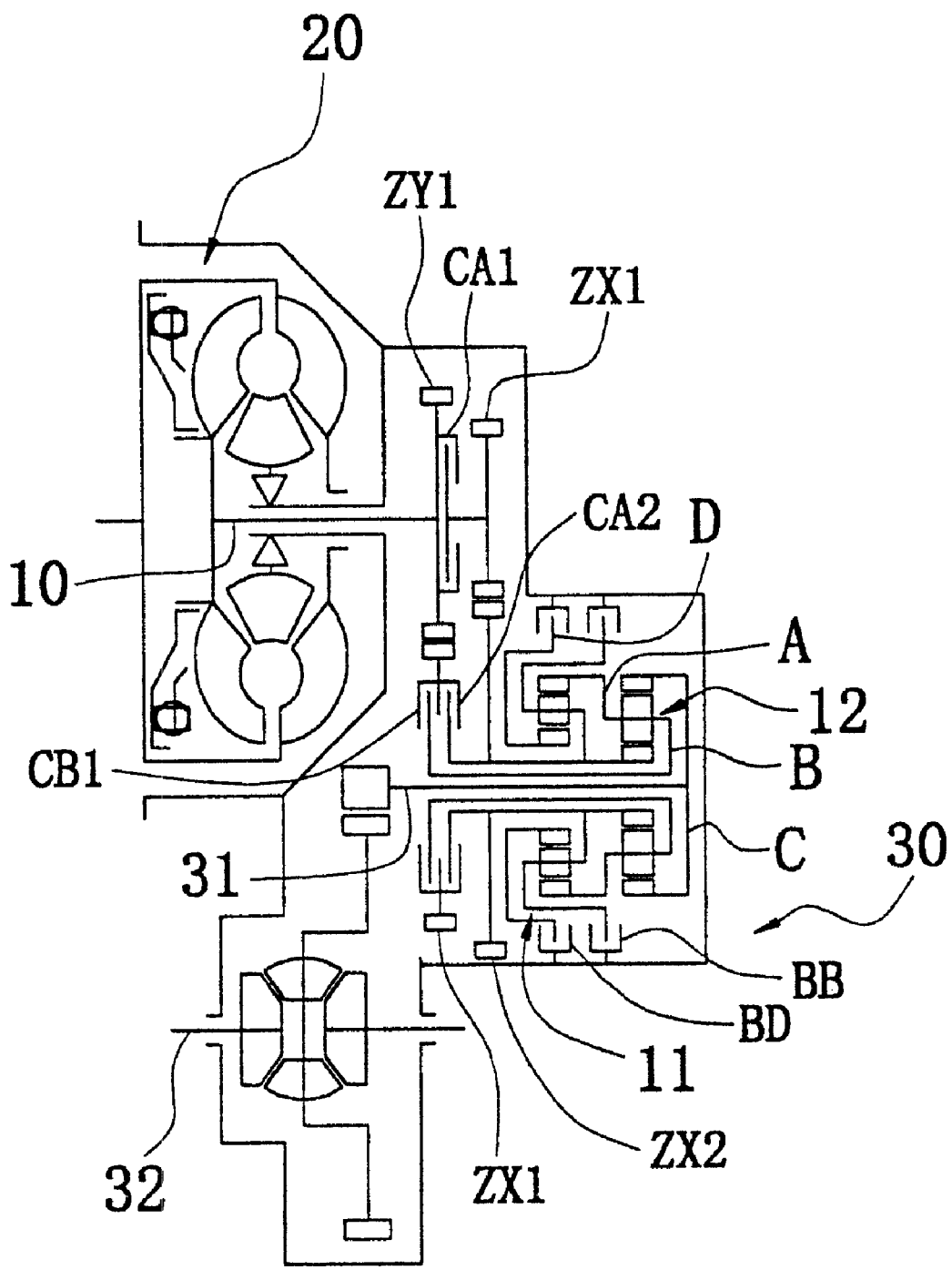
FIG. 15 is a schematic diagram of an automatic transmission apparatus utilizing Configuration $I_3$ of FIG. 7C in accordance with a third embodiment of the present invention.

A schematic view of the automatic transmission apparatus is shown in FIG. 15 in accordance with a third embodiment of the present invention. This automatic transmission apparatus uses the transmission configuration shown in FIG. 7C and has basically the same construction and operation as the first embodiment. The only differences are in the parts related to the transmission, which are constructed as shown in FIG. 7C. In this embodiment, the gear ratios of the pairs of counter gears X and Y and planetary gear trains 11 and 12 are set as follows: $\alpha X=1.0$; $\alpha Y=1.2$; and $\rho 1=\rho 2=0.5$.

Next, the gear ratio of each speed level will be explained. However, detailed explanations regarding the ON/OFF control of the coupling elements CA, CB, BA, BB and BD and the speed diagram for each of the speed levels are omitted here because these items are exactly the same as explained previously regarding FIG. 8.

First Forward Speed

Figure 16:
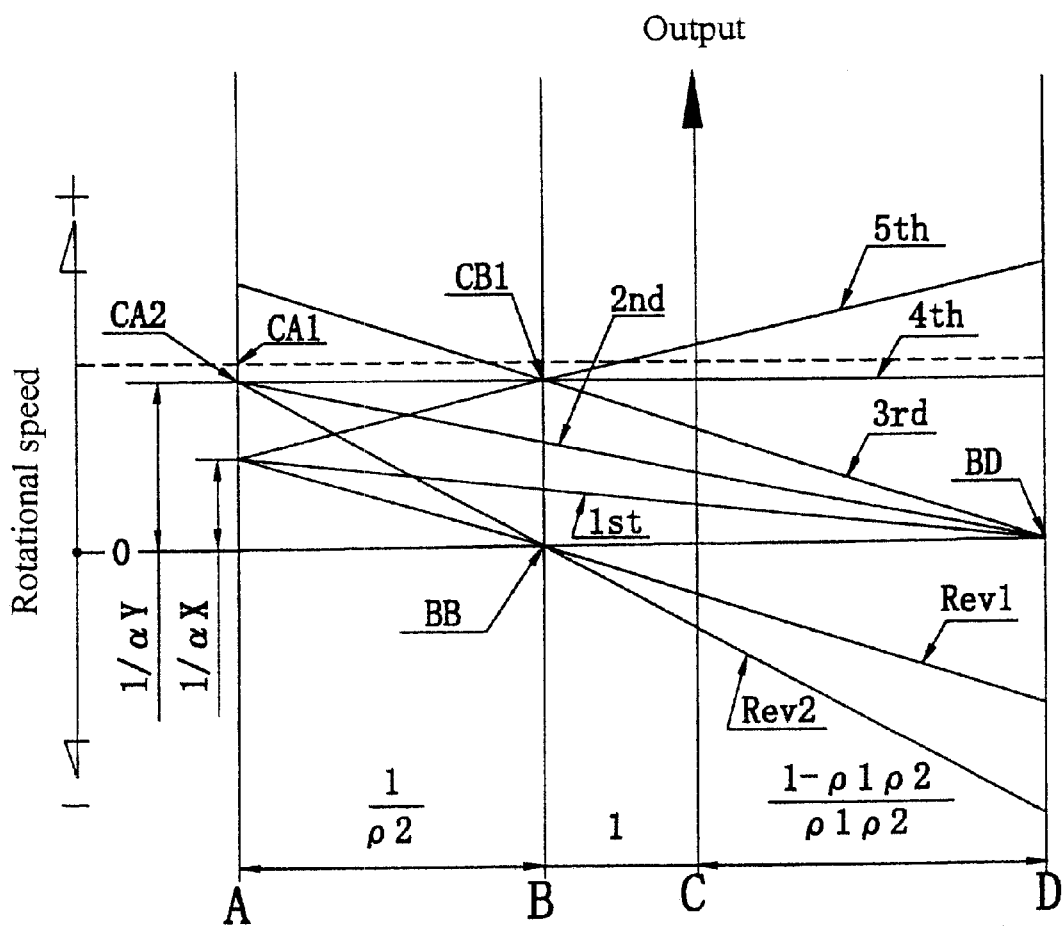
FIG. 16 is a graph showing operational characteristics of the coupling elements and a speed diagram for each speed level of the third embodiment shown in FIG. 15.

In the first forward speed, by turning on clutch CA1 and brake BD, the rotation fed from first shaft 10 is reduced by the pair of counter gears X, transmitted to first ring gear R1 and second sun gear S2 (structural element A), reduced by planetary gear trains 11 and 12, and outputted from second ring gear R2 (structural element C). The output part remains the same for the other speed levels discussed below. The first forward speed characteristic is marked "$1^{st}$" in FIG. 16 (which is basically the same as FIG. 8). Meanwhile, as shown in FIG. 17, the gear ratio is given by the equation $(1+\rho 1)\alpha X/(1-\rho 1\rho 2)$, which is preferably 4.0 in this embodiment. Again, the gear ratio mentioned here is the gear ratio at the output portion of second shaft 31.

Second Forward Speed

In the second forward speed, by turning ON clutch CA2 and brake BD, the rotation fed from first shaft 10 is reduced by the pair of counter gears Y, transmitted to first ring gear R1 and second sun gear S2, reduced by planetary gear trains 11 and 12, and outputted. The second forward speed characteristic is marked "$2^{nd}$" in FIG. 16. Meanwhile, as shown in FIG. 17, the gear ratio is given by the equation $(1+\rho1)\alpha Y/(1-\rho1\rho2)$, which is preferably 2.4 in this embodiment.

Third Forward Speed

In the third forward speed, by turning ON clutch CB1 and brake BD, the rotation fed from first shaft 10 is reduced by the pair of counter gears Y, transmitted to first and second carriers Q1, Q2 (structural element B), reduced by planetary gear trains 11 and 12, and outputted. The speed diagram in this case is the characteristic marked "$3^{rd}$" in FIG. 16. Meanwhile, as shown in FIG. 17, the gear ratio is given by the equation $\alpha Y/(1-\rho1\rho2)$, which is preferably 1.6 in this embodiment.

Fourth Forward Speed

In the fourth forward speed, planetary gear trains 11 and 12 are made to rotate as an integral unit by turning ON clutches CA2 and CB1. The fourth forward speed characteristic is marked "$4^{th}$" in FIG. 16. Meanwhile, as shown in FIG. 17, the gear ratio $\alpha Y$ is preferably 1.2 in this embodiment.

Fifth Forward Speed

In the fifth forward speed, by turning ON clutches CA1 and CB1, the rotation fed from first shaft 10 is reduced by the pair of counter gears X and transmitted to first ring gear R1 and second sun gear S2, while concurrently, the same rotation is reduced by the pair of counter gears Y and transmitted to first and second carriers Q1 and Q2. The rotation is then reduced by planetary gear trains 11 and 12 and outputted. The fifth forward speed characteristic is marked "$5^{th}$" in FIG. 16. Meanwhile, as shown in FIG. 17, the gear ratio is given by the equation $\alpha X\alpha Y/\{(1+\rho2)\alpha X-\rho2\alpha Y\}$, which is preferably 1.0 in this embodiment.

First Reverse Speed

In the first reverse speed, by turning ON clutch CA1 and brake BB, the rotation fed from first shaft 10 is reduced by the pair of counter gears X, transmitted to first ring gear R1 and second sun gear S2, reduced by planetary gear trains 11 and 12, and outputted. The first reverse speed characteristic is marked "Rev1" in FIG. 16. Meanwhile, as shown in FIG. 17, the gear ratio is given by the equation $(\alpha X/\rho2$, which is preferably 4.0 in this embodiment.

Second Reverse Speed

In the second reverse speed, by turning ON clutch CA2 and brake BB, the rotation fed from first shaft 10 is reduced by the pair of counter gears Y, transmitted to first ring gear R1 and second sun gear S2, reduced by planetary gear trains 11 and 12, and outputted. The second reverse speed characteristic is marked "Rev2" in FIG. 16. Meanwhile, as shown in FIG. 17, the gear ratio is given by the equation $\alpha Y/\rho2$, which is preferably 2.4 in this embodiment.

Fourth Embodiment Using Configuration $I_4$

Figure 18:
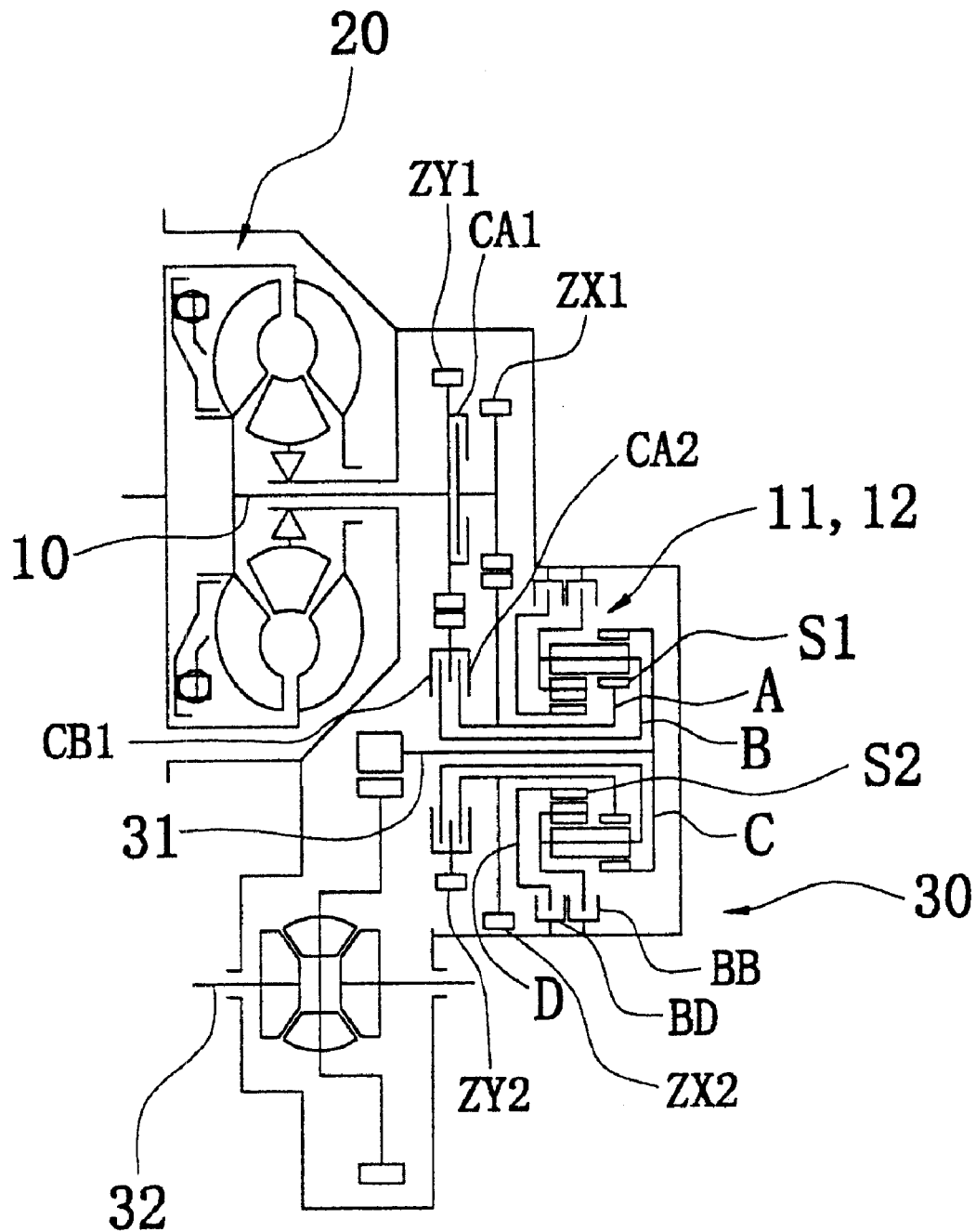
FIG. 18 is a schematic diagram of an automatic transmission apparatus utilizing Configuration $I_4$ of FIG. 7D in accordance with the fourth embodiment of the present invention.

A schematic view of the automatic transmission apparatus is shown in FIG. 18 in accordance with a fourth embodiment of the present invention. This automatic transmission apparatus uses the transmission configuration shown in FIG. 7D and has basically the same construction and operation as the first embodiment. The only differences are in parts related to the transmission which is constructed as shown in FIG. 7D. In this embodiment, the gear ratios of the pairs of counter gears X and Y and planetary gear trains 11 and 12 are set as follows: $\alpha X=2.0$; $\alpha Y=1.2$; $\rho1=0.55$; and $\rho2=0.3$.

Next, the gear ratio of each speed level is explained. However, detailed explanations regarding the ON/OFF control of the coupling elements CA, CB, BA, BB and BD and the speed diagram for each of the speed levels is omitted here because these items are exactly the same as explained previously regarding FIG. 8.

First Forward Speed

Figure 19:
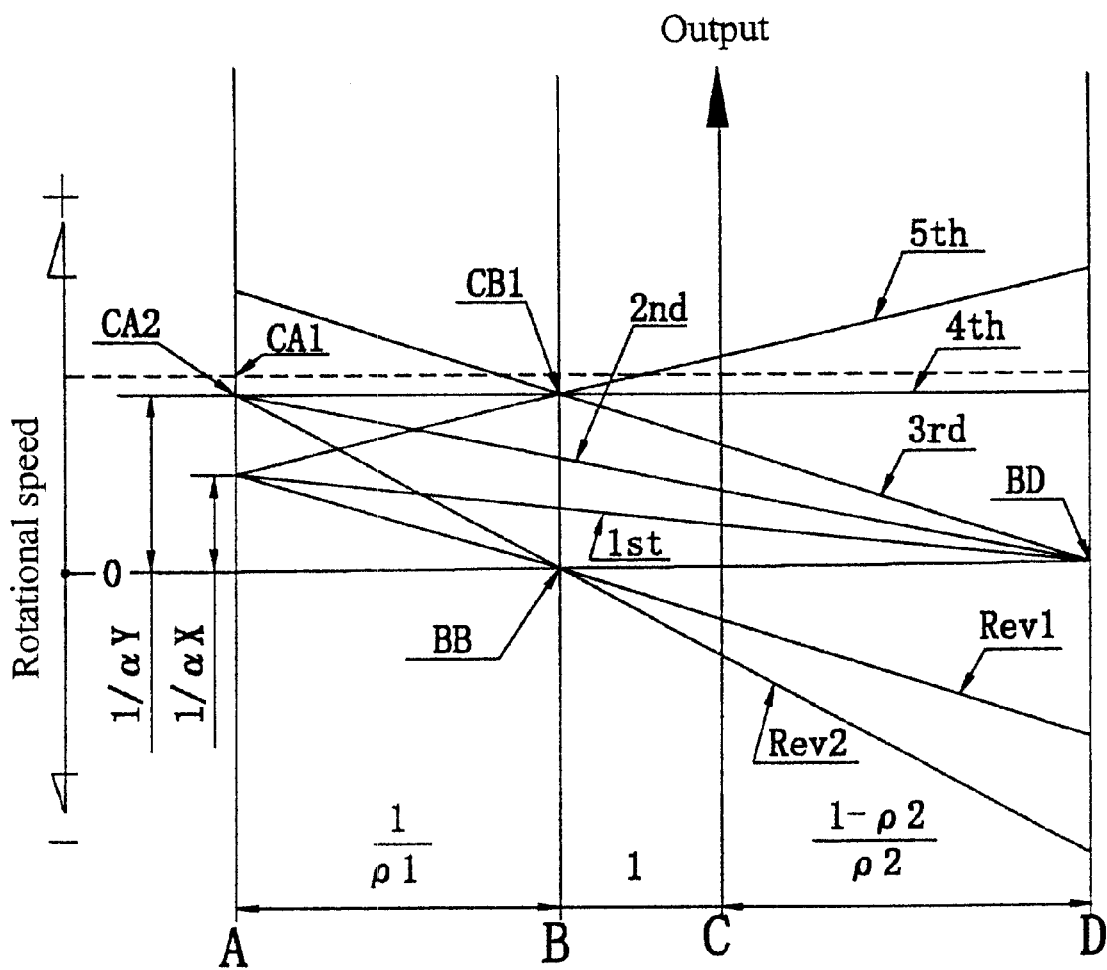
FIG. 19 is a graph showing operational characteristics of the coupling elements and a speed diagram for each speed level of the fourth embodiment shown in FIG. 18.

In the first forward speed, by turning on clutch CA1 and brake BD, the rotation fed from first shaft 10 is reduced by the pair of counter gears X, transmitted to first sun gear S1 (structural element A), reduced by planetary gear trains 11 and 12, and outputted from common ring gear Rc (structural element C). The output part remains the same for the other speed levels discussed below. The first forward speed characteristic is marked "$1^{st}$" in FIG. 19 (which is basically the same as FIG. 8). Meanwhile, as shown in FIG. 20, the gear ratio is given by the equation $(\rho1+\rho2)\alpha X/\rho1(1-\rho2)$, which is preferably 4.41 in this embodiment. Again, the gear ratio mentioned here is the gear ratio at the output portion of second shaft 31.

Second Forward Speed

In the second forward speed, by turning ON clutch CA2 and brake BD, the rotation fed from first shaft 10 is reduced by the pair of counter gears Y, transmitted to first sun gear S1, reduced by planetary gear trains 11 and 12, and outputted. The second forward speed characteristic is marked "$2^{nd}$" in FIG. 19. Meanwhile, as shown in FIG. 20, the gear ratio is given by the equation $(\rho1+\rho2)\alpha Y/\rho1(1-\rho2)$, which is preferably 2.65 in this embodiment.

Third Forward Speed

In the third forward speed, by turning ON clutch CB1 and brake BD, the rotation fed from first shaft 10 is reduced by the pair of counter gears Y, transmitted to common carrier Qc (structural element B), reduced by planetary gear trains 11 and 12, and outputted. The third forward speed characteristic is marked "$3^{rd}$" in FIG. 19. Meanwhile, as shown in FIG. 20, the gear ratio is given by the equation $\alpha Y/(1-\rho2)$, which is preferably 1.71 in this embodiment.

Fourth Forward Speed

In the fourth forward speed, planetary gear trains 11 and 12 are made to rotate as an integral unit by turning ON clutches CA2 and CB1. The fourth forward speed characteristic is marked "$4^{th}$" in FIG. 19. Meanwhile, as shown in FIG. 20, the gear ratio $\alpha Y$ is preferably 1.2 in this embodiment.

Fifth Forward Speed

In the fifth forward speed, by turning ON clutches CA1 and CB1, the rotation fed from first shaft 10 is reduced by the pair of counter gears X and transmitted to first sun gear S1, while concurrently, the same rotation is reduced by the pair of counter gears Y and transmitted to common carrier Qc. The rotation is then reduced by planetary gear trains 11 and 12 and then outputted. The fifth forward speed characteristic is marked "$5^{th}$" in FIG. 19. Meanwhile, as shown in FIG. 20, the gear ratio is given by the equation $\alpha X\alpha Y/\{(1+\rho 1)\alpha X-\rho 1\alpha Y\}$, which is preferably 0.98 in this embodiment.

First Reverse Speed

In the first reverse speed, by turning ON clutch CA1 and brake BB, the rotation fed from first shaft 10 is reduced by the pair of counter gears X, transmitted to first sun gear S1, reduced by planetary gear trains 11 and 12, and outputted. The first reverse speed characteristic is marked "Rev1" in FIG. 19. Meanwhile, as shown in FIG. 20, the gear ratio is given by the equation $\alpha X/\rho 1$, which is preferably 3.64 in this embodiment.

Second Reverse Speed

In the second reverse speed, by turning ON clutch CA2 and brake BB, the rotation fed from first shaft 10 is reduced by the pair of counter gears Y, transmitted to first sun gear S1, reduced by planetary gear trains 11 and 12, and then outputted. The second reverse characteristic is marked "Rev2" in FIG. 19. Meanwhile, as shown in FIG. 20, the gear ratio is given by $\alpha Y/\rho 1$, which is 2.18 in this embodiment.

Fifth Embodiment Using Configuration $I_5$

Figure 21:
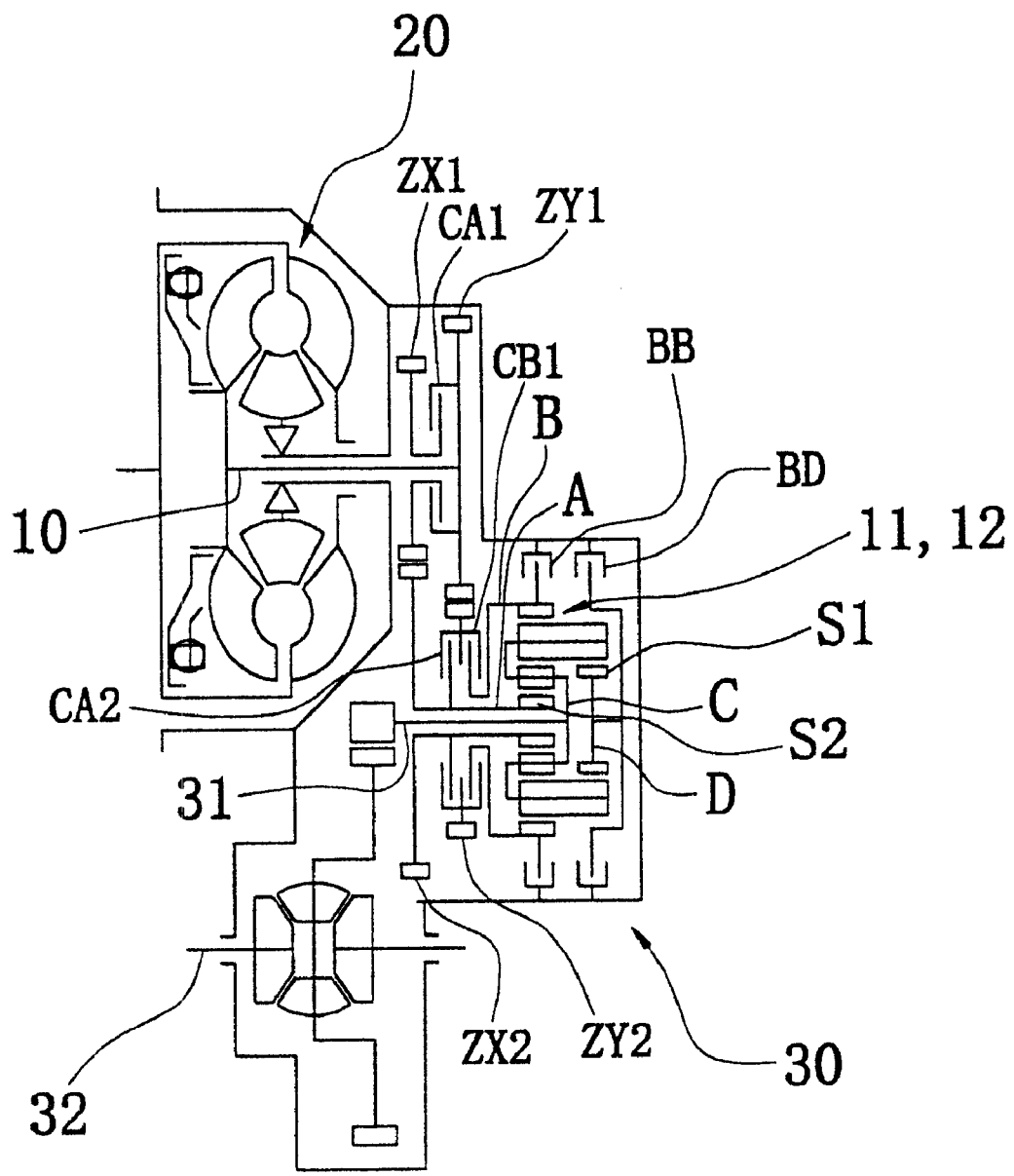
FIG. 21 is a schematic diagram of the automatic transmission apparatus utilizing Configuration $I_5$ of FIG. 7E in accordance with the fifth embodiment of the present invention.

A schematic view of the automatic transmission apparatus is shown in FIG. 21 in accordance with a fifth embodiment of the present invention. This automatic transmission apparatus uses the transmission configuration shown in FIG. 7E and has basically the same construction and operation as the first embodiment. The only differences are in parts related to the transmission which are constructed as shown in FIG. 7E. In this embodiment, the gear ratios of the pair of counter gears and planetary gear trains are set as follows: $\alpha X=2.0$; $\alpha Y=1.2$; $\rho 1=0.4$; and $\rho 2=0.35$.

Next, the gear ratio of each speed level is explained. However, detailed explanations regarding the ON/OFF control of the coupling elements CA, CB, BA, BB and BD and the speed diagram for each speed level are omitted here because these items are exactly the same as explained previously regarding FIG. 8.

First Forward Speed

Figure 22:
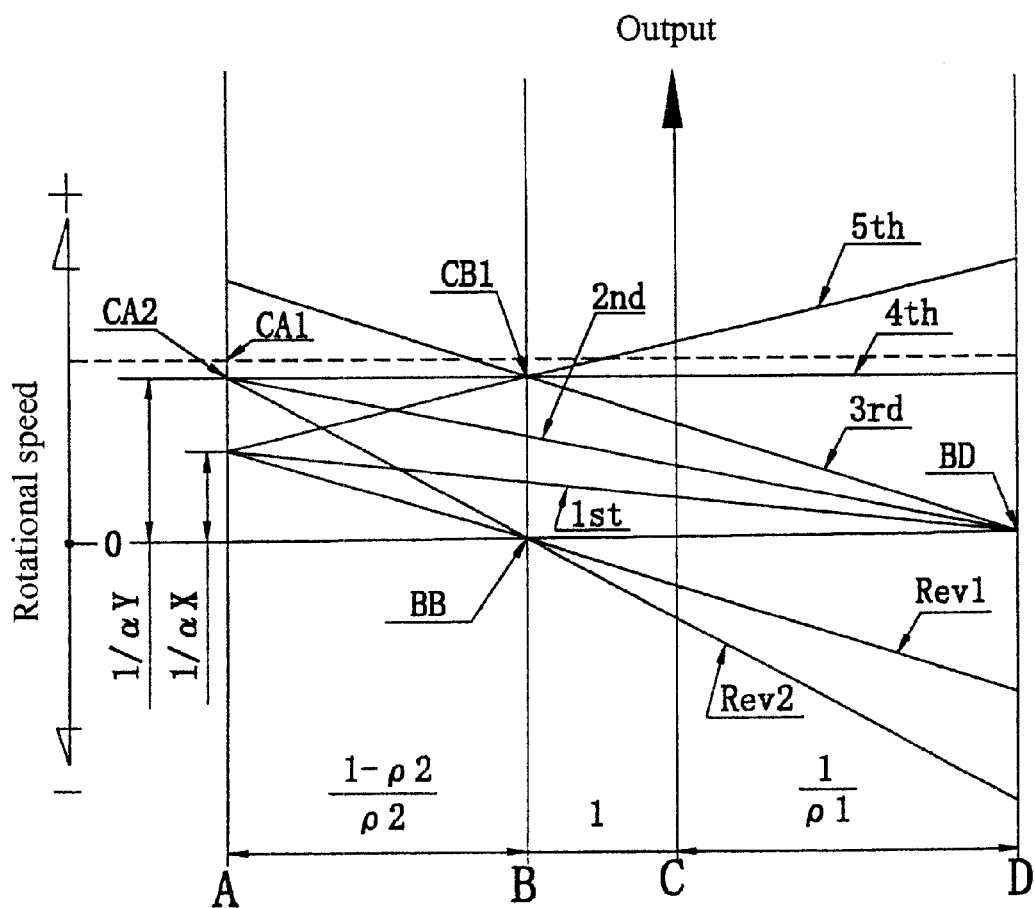
FIG. 22 is a graph showing operational characteristics of the coupling elements and a speed diagram for each speed level of the fifth embodiment shown in FIG. 19.
Figure 24A:
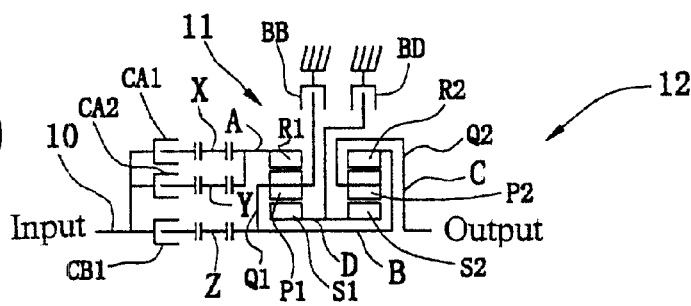
FIG. 24A is a schematic diagram of a transmission to be used in an automatic transmission apparatus of the present invention in accordance with Configuration $II_1$.
Figure 24B:
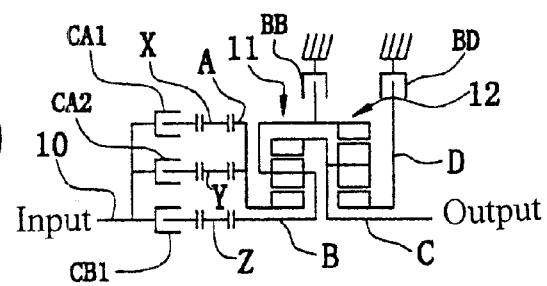
FIG. 24B is a schematic diagram of a transmission to be used in an automatic transmission apparatus of the present invention in accordance with Configuration $II_2$.
Figure 24C:
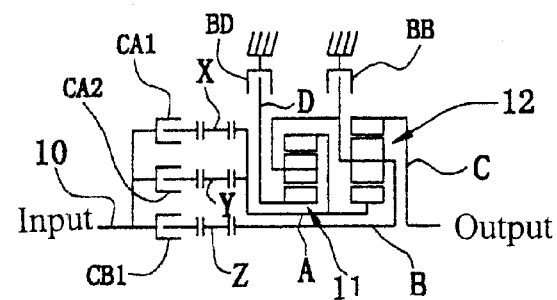
FIG. 24C is a schematic diagram of a transmission to be used in an automatic transmission apparatus of the present invention in accordance with Configuration $II_3$.
Figure 24D:
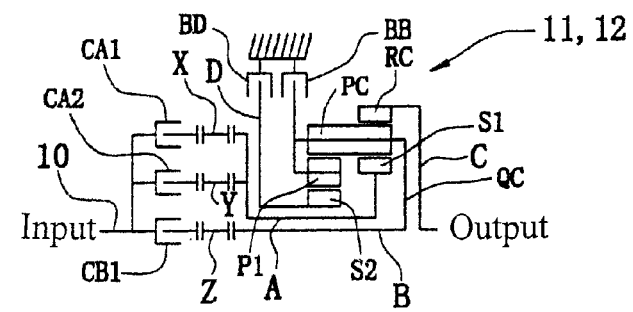
FIG. 24D is a schematic diagram of a transmission to be used in an automatic transmission apparatus of the present invention in accordance with Configuration $II_4$.
Figure 24E:
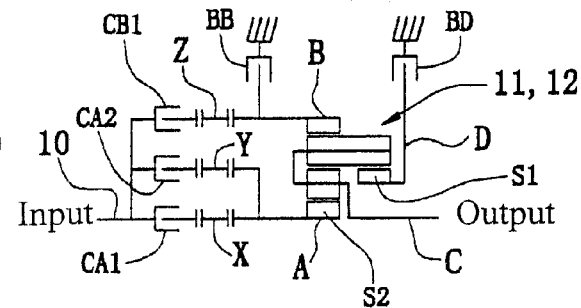
FIG. 24E is a schematic diagram of a transmission to be used in an automatic transmission apparatus of the present invention in accordance with Configuration $II_5$.

In the first forward speed, by turning on clutch CA1 and brake BD, the rotation fed from first shaft 10 is reduced by the pair of counter gears X, transmitted to second sun gear S2 (structural element A), reduced by planetary gear trains 11 and 12, and then outputted from common carrier Qc (structural element C). The output part remains the same for the other speed levels discussed below. The first forward speed characteristic is marked "$1^{st}$" in FIG. 22 (which is basically the same as FIG. 8). Meanwhile, as shown in FIG. 23, the gear ratio is given by the equation $(\rho 1+\rho 2)\alpha X/\rho 2$, which is preferably 4.29 in this embodiment. Again, the gear ratio mentioned here is the gear ratio at the output portion of second shaft 31.

Second Forward Speed

In the second forward speed, by turning ON clutch CA2 and brake BD, the rotation fed from first shaft 10 is reduced by the pair of counter gears Y, transmitted to second sun gear S2, reduced by planetary gear trains 11 and 12, and then outputted. The second forward speed characteristic is marked "$2^{nd}$" in FIG. 22. Meanwhile, as shown in FIG. 23, the gear ratio is given by the equation $(\rho 1+\rho 2)\alpha Y/\rho 2$, which is preferably 2.57 in this embodiment.

Third Forward Speed

In the third forward speed, by turning ON clutch CB1 and brake BD, the rotation fed from first shaft 10 is reduced by the pair of counter gears Y, transmitted to common ring gear Rc (structural element B), reduced by planetary gear trains 11 and 12, and then outputted. The third forward speed characteristic is marked "$3^{rd}$" in FIG. 22. Meanwhile, as shown in FIG. 23, the gear ratio is given by the equation $(1+\rho 1)\alpha Y$, which is preferably 1.68 in this embodiment.

Fourth Forward Speed

In the fourth forward speed, planetary gear trains 11 and 12 are made to rotate as an integral unit by turning ON clutches CA2 and CB1. The fourth forward speed characteristic is marked "$4^{th}$" in FIG. 22. Meanwhile, as shown in FIG. 23, the gear ratio $\alpha Y$ is preferably 1.2 in this embodiment.

Fifth Forward Speed

Figure 25:
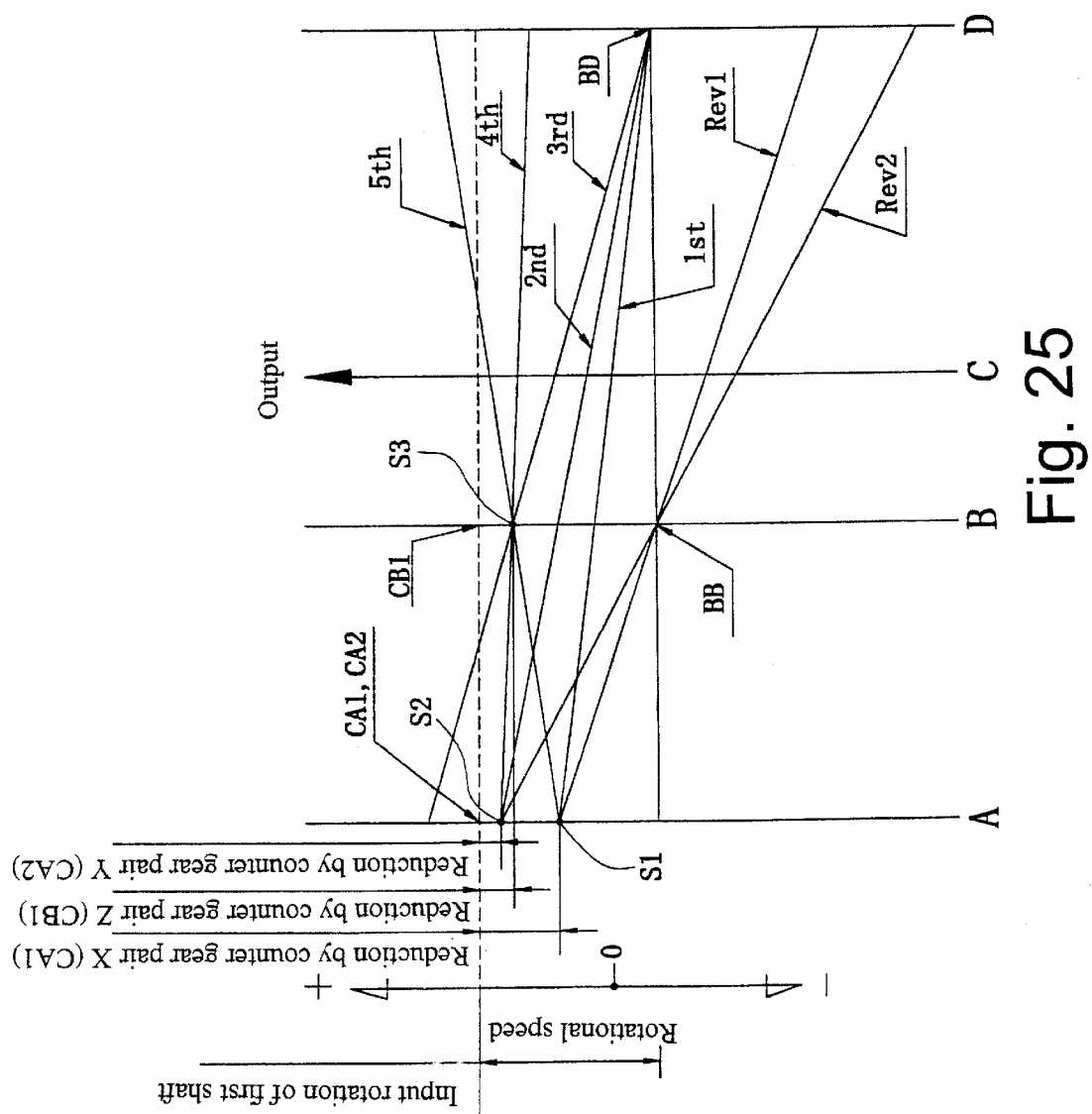
FIG. 25 is a graph showing operational characteristics of the coupling elements and speed diagram for each speed level of the transmissions of Configurations $II_1$–$II_5$.

In the fifth forward speed, by turning ON clutches CA1 and CB1, the rotation fed from first shaft 10 is reduced by the pair of counter gears X and transmitted to second sun gear S2, while concurrently, the same rotation is reduced by the pair of counter gears Y and transmitted to common ring gear Rc. The rotation is then reduced by planetary gear trains 11 and 12 and then outputted. The fifth forward speed characteristic is marked "$5^{th}$" in FIG. 22. Meanwhile, as shown in FIG. 25, the gear ratio is given by the equation $(1-\rho 2)\alpha X\alpha Y/(\alpha X-\rho 2\alpha Y)$, which is preferably 0.99 in this embodiment.

First Reverse Speed

In the first reverse speed, by turning ON clutch CA1 and brake BB, the rotation fed from first shaft 10 is reduced by the pair of counter gears X, transmitted to second sun gear S2, reduced by planetary gear trains 11 and 12, and then outputted. The first reverse speed characteristic is marked "Rev1" in FIG. 22. Meanwhile, as shown in FIG. 23, the gear ratio is given by the equation $(1-\rho 2)\alpha X/\rho 2$, which is preferably 3.71 in this embodiment.

Second Reverse Speed

In the second reverse speed, by turning ON clutch CA2 and brake BB, the rotation fed from first shaft 10 is reduced by the pair of counter gears Y, transmitted to second sun gear S2, reduced by planetary gear trains 11 and 12, and then outputted. The second reverse speed characteristic is marked "Rev2" in FIG. 22. Meanwhile, as shown in FIG. 23, the gear ratio is given by the equation $(1-\rho 2)\alpha Y/\rho 2$, which is preferably 2.23 in this embodiment.

Transmission Configurations $II_1$–$II_5$

Referring to FIGS. 24A–24E, five additional configurations $II_1$–$II_5$ for automatic transmission apparatuses are illustrated in accordance with other embodiments of the present invention. Each of the transmission configurations $II_1$–$II_5$ of FIGS. 24A–24E has five forward speeds and two reverse speeds, and includes a plurality of counter gears, a plurality of clutches, a plurality of brakes, and a pair of planetary gear trains, as discussed below. In the figure, planetary gear trains 11 and 12 are provided on the second shaft 31, which is disposed so as to be parallel with the input or first shaft 10. The structural elements of planetary gear trains 11 and 12 that serve to transmit power are indicated as structural elements A, B, C and D. Clutch CA1 and clutch CA2 are provided between structural element A and first shaft 10, and clutch CB1 is provided between structural element B and first shaft 10. Clutches CA1, CA2 and CB1 are provided on the first shaft side. First shaft 10 is coupled with structural element A (which is on the second shaft side) via clutch CA1 and the pair of counter gears X. First shaft 10 is also coupled with structural element A via clutch CA2 and the pair of counter gears Y and with structural element B (which is on the second shaft side) via clutch CB1 and the pair of counter gears Z.

Brake BB is provided to brake the rotation of structural element B, while brake BD is provided to brake the rotation of structural element D.

The following aspects of the transmission configurations $II_1-II_5$ shown in FIGS. 24A to 24E differ from those of the previously discussed Configurations $I_1-I_5$:

(i) Clutch CA2 is disposed on the first shaft side, and the same clutch CA2 is coupled with structural element A of planetary gear trains 11 and 12 via the pair of counter gears Y.

(ii) Clutch CB1 is disposed on the first shaft side, and the same clutch CB1 is coupled to structural element B of planetary gear trains 11 and 12 via the pair of counter gears Z.

Meanwhile, the main features of the planetary gear trains 11 and 12 and other components remain the same as in the prior configuration. For this reason, detailed explanations of each transmission configuration $II_1-II_5$ shown in the FIGS. 24A–24E are omitted.

Speed Diagram for Configurations $II_1-II_5$

The speed diagram for the first through fifth configurations $II_1-II_5$ shown in FIGS. 24A–24E are all similar. Regarding these configurations $II_1-II_5$, FIG. 25 shows the control details of the coupling elements and the speed diagram for each speed level. On the speed diagram, as before, the vertical axis indicates the rotational speed and the horizontal axis indicates the positions of structural elements A, B, C and D. The "A", "B", "C" and "D" indicated on the horizontal axis correspond to the structural elements A, B, C and D shown in FIGS. 24A–24E.

As previously mentioned, the locations of clutch CA2 and clutch CB1 in the configurations shown in FIGS. 24A–24E are different from those shown in FIGS. 7A–7E. However, the ON/OFF controls of the coupling elements are the same, as should be clear upon comparing FIG. 8 and FIG. 25. The speed characteristics are also the same, except that when clutch CA2 is turned ON (second forward speed, fourth forward speed, and second reverse speed), the rotational speed of structural element A is reduced by the pair of counter gears Y.

Operational Effects of Configurations $II_1-II_5$

Since these configurations $II_1-II_5$ are provided with three pairs of counter gears, it is possible to feed a different rotational speed to structural element A than is fed to structural element B. As a result, the degree of freedom for setting the gear ratio is increased.

As in the case of Configurations $II_1-II_5$, the structure is complex, but the bearings and gears of the pair of counter gears can be made with smaller torque and rotation capacities. Also, the gear efficiency of the planetary gear trains can be improved and the relative rotation between the frictional members of the clutches and brakes can be decreased. Consequently, the power loss of the transmission apparatus as a whole can be reduced.

Variations on Configurations $II_1-II_5$

Although in FIGS. 24A–24E the three clutches CA1, CA2 and CB1 are disposed on first shaft 10, it is also acceptable for these clutches to be disposed on the second shaft 31 or dispersed on both of the two shafts 11 and 31.

Sixth Embodiment Using Configuration $II_1$

Figure 26:
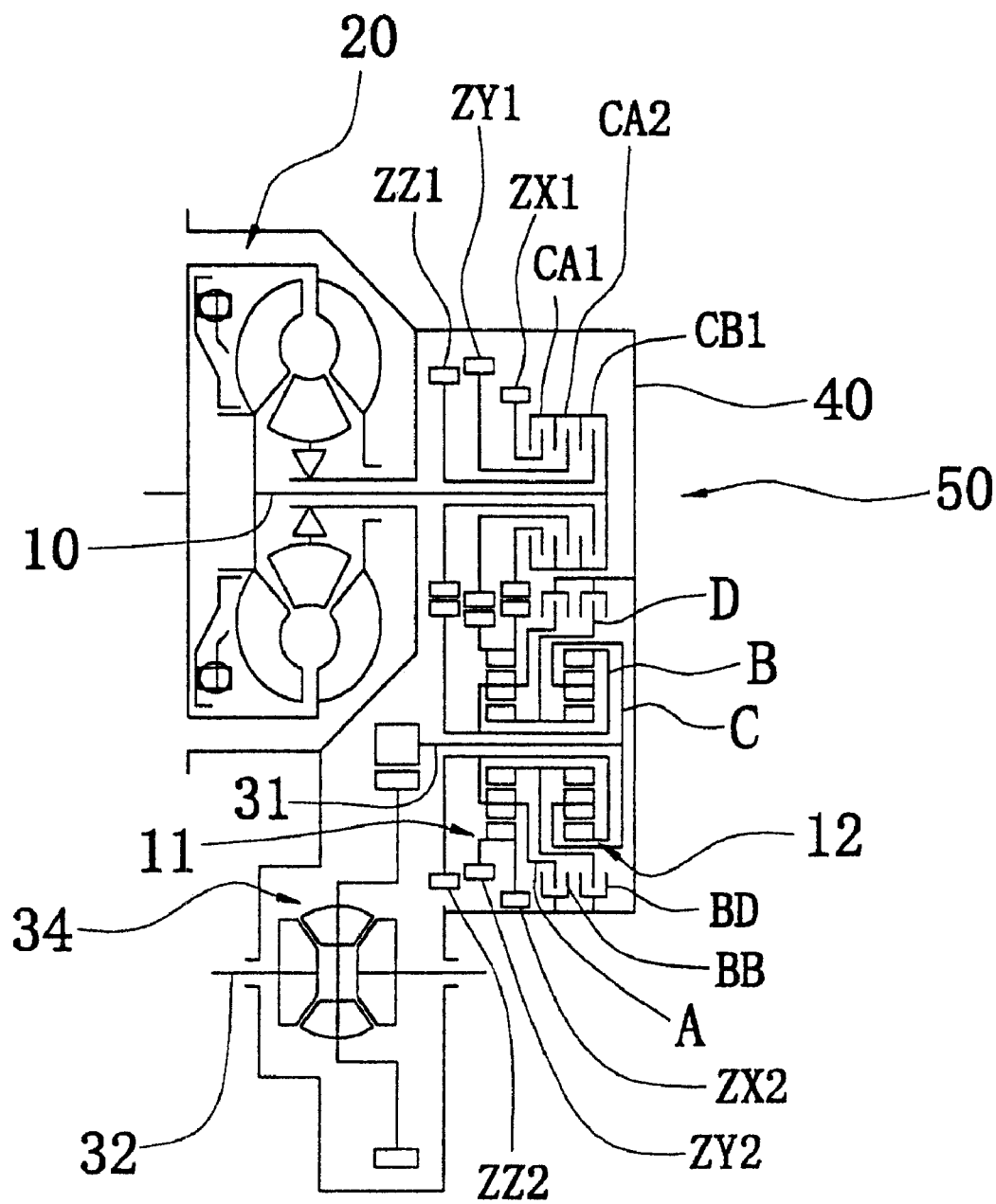
FIG. 26 is a schematic diagram of an automatic transmission apparatus utilizing Configuration $II_1$ of FIG. 24A in accordance with a sixth embodiment of the present invention.

A schematic view of the automatic transmission apparatus is shown in FIG. 26 in accordance with a sixth embodiment of the present invention. This automatic transmission apparatus uses the transmission configuration $II_1$ shown in FIG. 24A and has a torque converter 20 that serves as a hydraulic coupling to which power from the engine is input, and a transmission 50 that is provided on the output side of torque converter 20. Torque converter 20 and transmission 50 are enclosed inside housing 40.

The primary features of torque converter 20 and the primary features of transmission 50 on the output side of second shaft 31 are the same as in the previously described embodiments. Only the primary features of three pairs of counter gears X, Y and Z and the clutches CA1, CA2 and CB1 of transmission 50 are different.

More specifically, in this embodiment, three clutches CA1, CA2 and CB1 are disposed on first shaft 10. One gear ZX1 of the pair of counter gears X is disposed at the output side of clutch CA1, one gear ZY1 of second pair of counter gears Y is disposed at the output side of clutch CA2, and one gear ZZ1 of the pair of counter gears Z is disposed at the output side of clutch CB1. Each of these gears ZX1 and ZY1 and ZZ1 is supported so that it can rotate freely relative to first shaft 10. The other gears ZX2, ZY2 and ZZ2 mesh with the first gears of counter gears pairs X, Y and Z, respectively, and are rotatably disposed on second shaft 31.

In this embodiment, the gear reduction ratios $\alpha X$, $\alpha Y$, and $\alpha Z$ of the three pairs of counter gears X, Y and Z are given by the following equations: $\alpha X = ZX2/ZX1$; $\alpha Y = ZY2/ZY1$; and $\alpha Z = ZZ2/ZZ1$, where ZX1, ZX2, ZY1, ZY2, ZZ1 and ZZ2 are the tooth counts of gears ZX1, ZX2, ZY1, ZY2, ZZ1 and ZZ2, respectively.

Meanwhile, as previously discussed, the gear reduction ratios $\rho 1$ and $\rho 2$ of planetary gear trains 11 and 12 are given by the following equations: $\rho 1 = ZS1/ZR1$ and $\rho 2 = ZS2/ZR2$. In this embodiment, the aforementioned gear reduction ratios are set as follows: $\alpha X = 2.1$; $\alpha Y = 1.3$; $\alpha Z = 1.25$; $\rho 1 = 0.45$; and $\rho 2 = 0.35$.

Next, the gear ratio of each speed level is explained. However, detailed explanations regarding the ON/OFF control of the coupling elements and the speed diagram for each of the speed levels are omitted here because these items are exactly the same as explained previously regarding FIG. 25 (FIG. 8).

First Forward Speed

Figure 27:
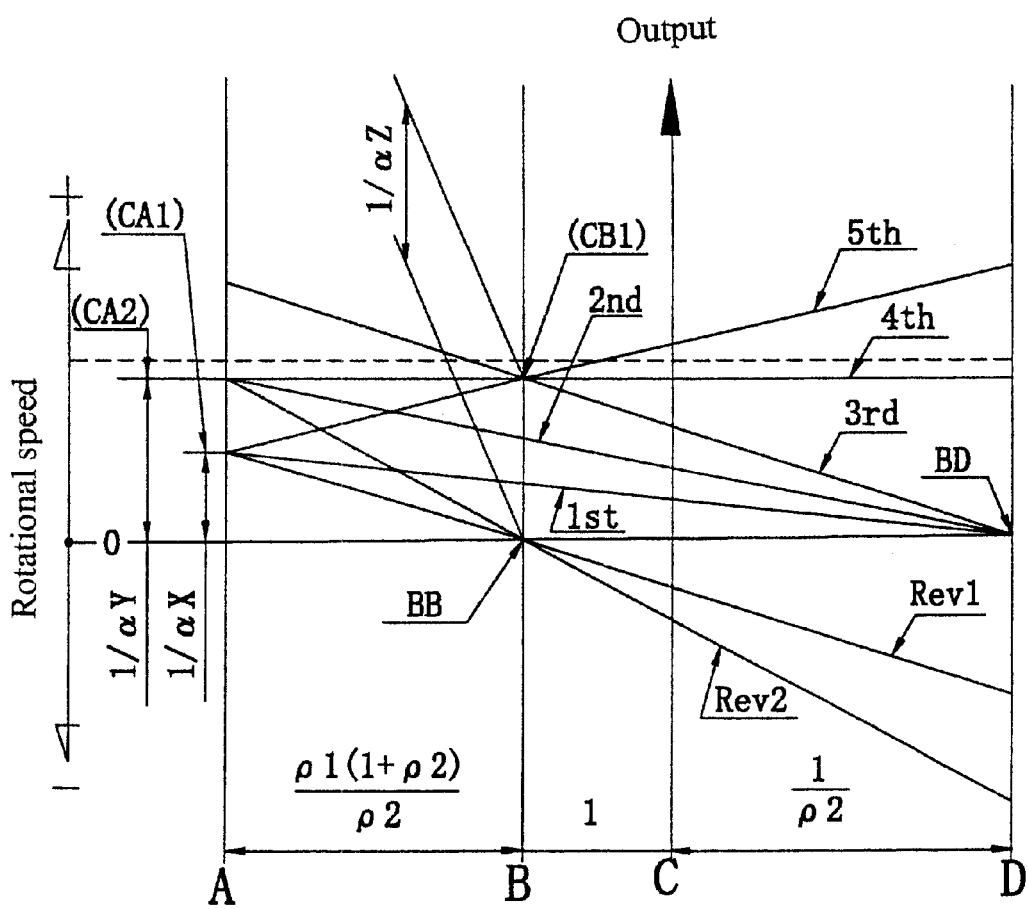
FIG. 27 is a graph showing operational characteristics of the coupling elements and a speed diagram for each speed level of the sixth embodiment shown in FIG. 26.

Similar to the first embodiment, the first forward speed characteristic is marked "$1^{st}$" in FIG. 27. The first forward speed is obtained by turning ON clutch CA1 and brake BD. Meanwhile, as shown in FIG. 28, the gear ratio is given by the equation $(1+\rho 1)(1+\rho 2)\alpha X$, which is preferably 4.11 in this embodiment.

Second Forward Speed

Similarly to the first embodiment, the speed characteristic marked "$2^{nd}$" in FIG. 27 is obtained by turning ON clutch CA2 and brake BD. Meanwhile, as shown in FIG. 28, the gear ratio is given by the equation $(1+\rho 1)(1+\rho 2)\alpha Y$, which is 2.54 in this embodiment.

Third Forward Speed

By turning ON clutch CB1 and brake BD, the rotation fed from first shaft 10 is reduced by the pair of counter gears Z, transmitted to first carrier Q1 and second ring gear R2 (structural element B), reduced by planetary gear trains 11 and 12, and then outputted from second carrier Q2. The third forward speed characteristic is marked "$3^{rd}$" in FIG. 27. Meanwhile, as shown in FIG. 28, the gear ratio is given by the equation $(1+\rho 2)\alpha Z$, which is preferably 1.69 in this embodiment.

Fourth Forward Speed

By turning ON clutches CA2 and CB1, the rotation fed from first shaft 10 is reduced by the pair of counter gears Y and inputted to first ring gear R1 while the same rotation is inputted to first carrier Q1 and second ring gear R2 via the pair of counter gears Z. These inputs are reduced by planetary gear trains 11 and 12 and then outputted from second carrier Q2. The fourth forward speed characteristic is marked "$4^{th}$" in FIG. 27. Meanwhile, as shown in FIG. 28, the gear ratio is given by the equation $\rho 1(1+\rho 2)\alpha Y\alpha Z/\{(\rho 1+\rho 1\rho 2+\rho 2)\alpha 1-\rho 2\alpha Z\}$, which is preferably 1.22 in this embodiment.

Fifth Forward Speed

By turning ON clutches CA1 and CB1, the rotation fed from first shaft 10 is reduced by the pair of counter gears X and transmitted to first ring gear R1, while concurrently, the same rotation is reduced by the pair of counter gears Z and transmitted to first carrier Q1 and second ring gear R2. The rotation is then reduced by planetary gear trains 11 and 12 and then outputted from second carrier Q2. The fifth forward speed characteristic is marked "$5^{th}$" in FIG. 27. Meanwhile, as shown in FIG. 28, the gear reduction ratio is given by the equation $\rho 1(1+\rho 2)\alpha X\alpha Z/\{(1+\rho 1\rho 2+\rho 2)\alpha X-\rho 2\alpha Z\}$, which is preferably 1.01 in this embodiment.

First Reverse Speed

Similarly to the first embodiment, the first reverse speed characteristic is marked "Rev1" in FIG. 27 is obtained by turning ON clutch CA1 and brake BB. Meanwhile, as shown in FIG. 28, the gear reduction ratio is given by the equation $\rho 1(1+\rho 2)\alpha X/\rho 2$, which is 3.65 in this embodiment.

Second Reverse Speed

Similarly to the first embodiment, the second reverse speed characteristic is marked "Rev2" in FIG. 27 is obtained by turning on clutch CA2 and brake BB. Meanwhile, as shown in FIG. 28, the gear ratio is given by the equation $\rho 1(1+\rho 2)\alpha Y/\rho 2$, which is preferably 2.26 in this embodiment.

Other Embodiments

The four other basic configurations $II_2$–$II_5$ shown in FIGS. 24B–24e can each be worked as an automatic transmission for front wheel drive in a similar manner to that demonstrated in the sixth embodiment. However, explanations of the embodiments corresponding to configurations $II_2$–$II_5$ of FIGS. 24B–24E are omitted since those embodiments are basically the same as the first through fifth embodiments already discussed.

Transmission Configurations $III_1$–$III_5$

Referring to FIGS. 29A–29E, five additional configurations $III_1$–$III_5$ of automatic transmission apparatuses are illustrated in accordance with other embodiments of the present invention. Each of the transmission configurations $III_1$–$III_5$ of FIGS. 29A–29E has six forward speeds and one reverse speed, and includes a plurality of pairs of the pair of counter gears, a plurality of clutches, a plurality of brakes, and a plurality of planetary gear trains. In implementing configurations $III_1$–$III_5$, two planetary gear trains 11 and 12 are provided on the second shaft 31, which is disposed so as to be parallel with the input or first shaft 10. In the present invention, the structural elements of planetary gear trains 11 and 12 that serve to transmit power are indicated as structural elements A, B, C and D. Clutch CA1 is provided on the first shaft side between structural element A and first shaft 10. Clutch CB1 is provided on the second shaft side between structural element B and first shaft 10. Clutch CD1 is provided on the second shaft side between structural element D and first shaft 10. Meanwhile, first shaft 10 is coupled with structural element A (which is on the second shaft side) via clutch CA1 and the pair of counter gears X. The first shaft 10 is also coupled with structural element B (which is on the second shaft side) via the pair of counter gears Y and clutch CB1 and with structural element D (which is on the second shaft side) via the pair of counter gears Y and clutch CD1.

Brake BA is provided on the first shaft side to brake the rotation of structural element A, while brake BB is provided to brake the rotation of structural element B. Below, the details of the transmission configurations $III_1$–$III_5$ shown in the figures are discussed.

Configuration $III_1$

Figure 29A:
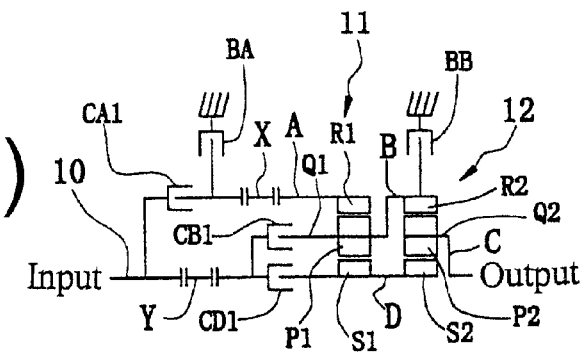
FIG. 29A is a schematic diagram of a transmission to be used in an automatic transmission apparatus of the present invention in accordance with Configuration $III_1$.

In the first configuration $III_1$, shown in FIG. 29A, the transmission has two simple planetary gear trains 11 and 12. Each of first and second planetary gear trains 11 and 12 has the following components, respectively: a ring gear R1, R2; a plurality of planet gears P1, P2 that mesh with the ring gear R1, R2; a carrier Q1, Q2 that supports planet gears P1, P2 in a freely rotatable manner; and a sun gear S1, S2 that meshes with the planet gears P1, P2. Also, first carrier Q1 is coupled with second ring gear R2, first sun gear S1 is coupled with second sun gear S2, and second carrier Q2 serves as the output of the transmission.

In the present invention, first ring gear R1 forms structural element A. First carrier Q1 and second ring gear R2 coupled thereto form structural element B. Second carrier Q2 forms structural element C. First sun gear S1 and second sun gear S2 coupled thereto forms structural element D.

Configuration $III_2$

In the second configuration $III_2$, shown in FIG. 29B, the transmission again has two simple planetary gear trains 11 and 12 and the structural members of planetary gear trains 11 and 12 are the same as in the first configuration $III_1$. Also, first carrier Q1 is coupled with second ring gear R2, while first ring gear R1 is coupled with second carrier Q2 and serves as the output.

In the present invention, first sun gear S1 forms structural element A. First carrier Q1 and second ring gear R2 coupled thereto form structural element B. First ring gear R1 and second carrier Q2 coupled thereto form structural element C. Second sun gear S2 forms structural element D.

Configuration $III_3$

In the third configuration $III_3$, shown in FIG. 29C, the transmission again has two simple planetary gear trains 11 and 12 and the structural members of planetary gear trains 11 and 12 are the same as in the first configuration $III_1$. Also, first carrier Q1 is coupled with second carrier Q2. First ring gear R1 is coupled with second sun gear S2 and second ring gear R2 and serves as the output.

In the present invention, first ring gear R1 and second sun gear S2 coupled thereto form structural element A. First carrier Q1 and second carrier Q2 coupled thereto form structural element B. Second ring gear R2 forms structural element C. First sun gear S1 forms structural element D.

Configuration $III_4$

Figure 29B:
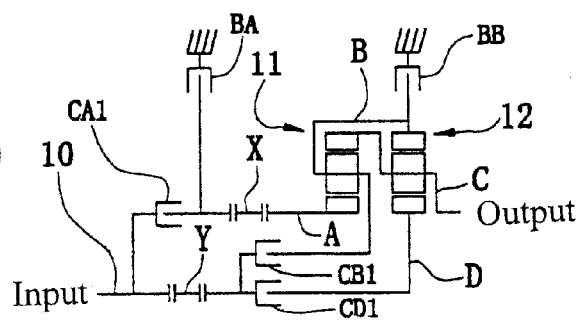
FIG. 29B is a schematic diagram of a transmission to be used in an automatic transmission apparatus of the present invention in accordance with Configuration $III_2$.
Figure 29C:
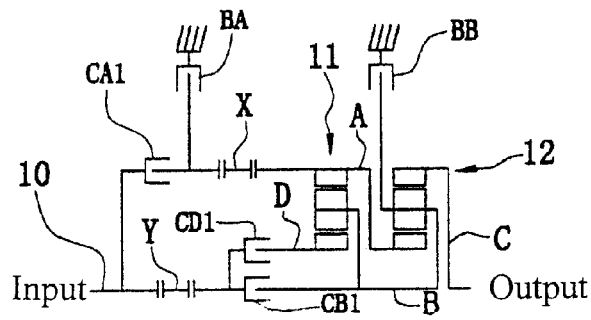
FIG. 29C is a schematic diagram of a transmission to be used in an automatic transmission apparatus of the present invention in accordance with Configuration $III_3$.
Figure 29D:
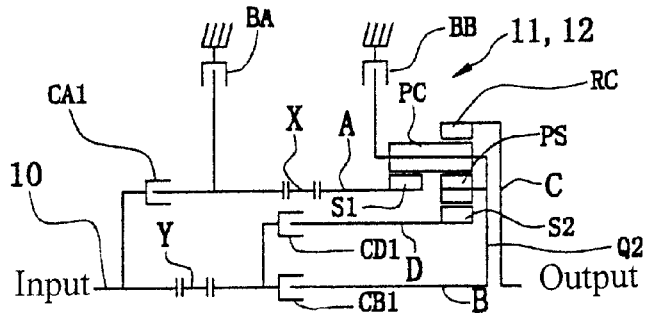
FIG. 29D is a schematic diagram of a transmission to be used in an automatic transmission apparatus of the present invention in accordance with Configuration $III_4$.

In the fourth configuration $III_4$, shown in FIG. 29D, the transmission has a simple planetary gear train 11 with a shared planet gear and a double planetary gear train 12 with a double planet gear. More specifically, planetary gear trains 11 and 12 have a common ring gear Rc, a common planet gear Pc that meshes with common ring gear Rc, a small planet gear Ps that meshes with common planet gear Pc, a common carrier Qc that supports common planet gear Pc and small planet gear Ps, a first sun gear S1 that meshes with common planet gear Pc, and a second sun gear S2 that meshes with small planet gear Ps. Also, common ring gear Rc serves as the output.

In the present invention, first sun gear S1 forms structural element A. Common carrier Qc forms structural element B. Common ring gear Rc forms structural element C. Second sun gear S2 forms structural element D.

Configuration $III_5$

Figure 29E:
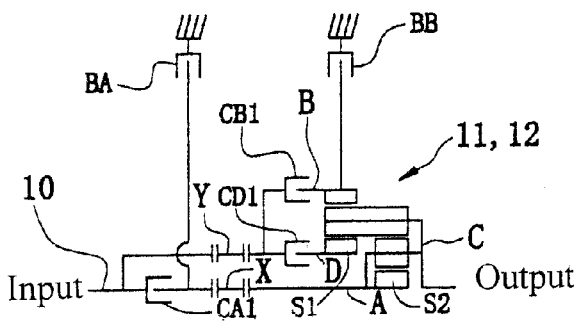
FIG. 29E is a schematic diagram of a transmission to be used in an automatic transmission apparatus of the present invention in accordance with the Configuration $III_5$.

Similar to the fourth configuration $III_4$, the transmission of the fifth configuration $III_5$, shown in FIG. 29E, has a simple planetary gear train 11 with a shared planet gear and a double planetary gear train 12 with a double planet gear. Also, common carrier Qc and serves as the output. In the present invention, second sun gear S2 forms structural element A. Common ring gear Rc forms structural element B. Common carrier Qc forms structural element C. First sun gear S1 forms structural element D.

Speed Diagram of Configurations $III_1$–$III_5$

Figure 30:
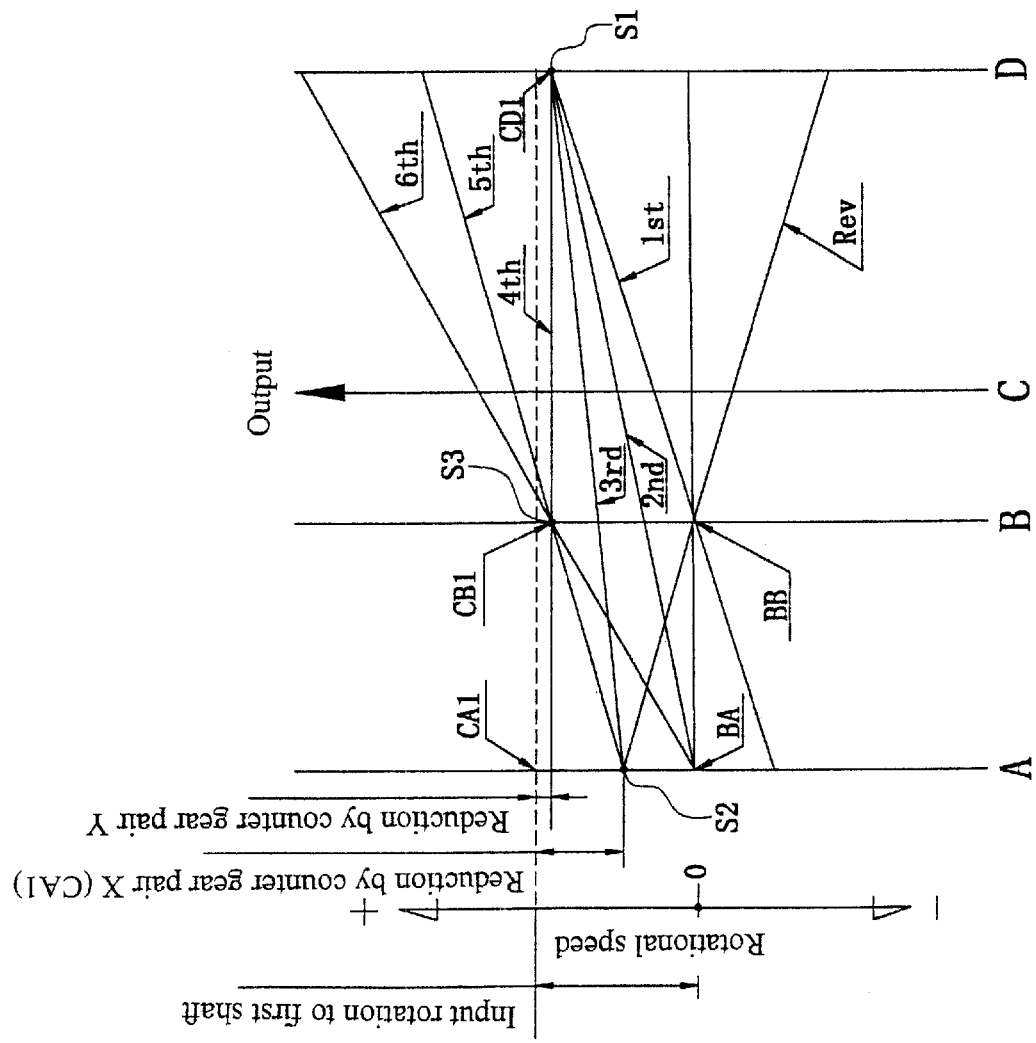
FIG. 30 is a graph showing operational characteristics of the coupling elements and a speed diagram for each speed level of the transmissions of Configurations $III_1$–$III_5$.

The speed characteristics for the first through fifth configurations $III_1$–$III_5$ shown in FIGS. 29A–29E are all similar. The speed characteristics of each of the configurations are discussed with reference to FIG. 30. FIG. 30 shows the control details of the coupling elements and the speed characteristics for each speed level. On the speed diagram, the vertical axis indicates the rotational speed and the horizontal axis indicates the positions of structural elements A, B, C and D. The position on the horizontal axis is determined by the reduction ratios between elements. The "A", "B", "C" and "D" indicated on the horizontal axis correspond to the structural elements A, B, C and D shown in FIGS. 29A–29E.

First Forward Speed

In the first forward speed, clutch CD1 and brake BB are turned ON, while the other coupling elements are turned OFF. As a result, the rotation fed from first shaft 10 is transmitted to structural element D via the pair of counter gears Y and clutch CD1, while the rotation of structural element B is stopped.

Thus, in the first forward speed, the rotation fed from first shaft 10 is reduced by the pair of counter gears Y, transmitted to structural element D of planetary gear trains 11 and 12, reduced by planetary gear trains 11 and 12, and then outputted from structural element C. Meanwhile, the rotation of structural element B is 0. Consequently, the first forward speed characteristic is marked "$1^{st}$" in FIG. 30, which is a straight line joining the rotational speed S1 of structural element D and the rotational speed (0) of structural element B.

Second Forward Speed

In the second forward speed, clutch CD1 and brake BA are turned ON. Consequently, as a before, the rotation fed from first shaft 10 is transmitted to structural element D via the pair of counter gears Y and clutch CD, while the rotation of structural element A is stopped.

Thus, in the second forward speed, the rotation fed from first shaft 10 is reduced by the pair of counter gears Y, transmitted to structural element D of planetary gear trains 11 and 12, reduced by planetary gear trains 11 and 12, and then outputted from structural element C. Meanwhile, the rotation of structural element B is 0. Consequently, the second forward speed characteristic is marked "$2^{nd}$" in FIG. 30, which is a straight line joining the rotational speed S1 of structural element D and the rotational speed (0) of structural element A.

Third Forward Speed

In the third forward speed, clutch CA1 and clutch CD1 are turned ON. As a result, the rotation fed from first shaft 10 is transmitted to structural element A via clutch CA1 and the pair of counter gears X, while the same rotation is transmitted to structural element D via the pair of counter gears Y and clutch CD1.

Thus, in the third forward speed, the rotation fed from first shaft 10 is reduced by the pair of counter gears X and transmitted to structural element A of planetary gear trains 11 and 12, while the same rotation is reduced by the pair of counter gears Y and transmitted to structural element D. These rotations are then reduced by planetary gear trains 11 and 12 and outputted from structural element C. Consequently, the third forward speed characteristic is marked "$3^{rd}$" in FIG. 30, which is a straight line joining the rotational speed S1 of structural element D and the rotational speed S2 of structural element A.

Fourth Forward Speed

In the fourth forward speed, clutches CB1 and CD1 are turned ON. As a result, the rotation fed from first shaft 10 is transmitted to structural elements B and D via the pair of counter gears Y and clutches CB2 and CD1.

In the present invention, the rotation fed from first shaft 10 is transmitted without reduction to structural elements B and D of planetary gear trains 11 and 12, causing planetary gear trains 11 and 12 to rotate as an integral unit. Consequently, the fourth forward speed characteristic is marked "$4^{th}$" in FIG. 30, which is a straight line for which equal rotational speeds S3 and S1 of structural elements B and D are maintained at all locations.

Fifth Forward Speed

In the fifth forward speed, clutches CA1 and CB1 are turned ON. As a result, the rotation fed from first shaft 10 is transmitted to structural element A via clutch CA1 and the pair of counter gears X and to structural element B via the pair of counter gears Y and clutch CB1.

Thus, in the fifth forward speed, the rotation fed from first shaft 10 is reduced by the pair of counter gears X and transmitted to structural element A of planetary gear trains 11 and 12, while the same rotation is reduced by the pair of counter gears Y and transmitted to structural element B of planetary gear trains 11 and 12. The rotation is then reduced by planetary gear trains 11 and 12 and then outputted from structural element C. Consequently, the fifth forward speed characteristic is marked "$5^{th}$" in FIG. 30, which is a straight line joining rotational speed S2 of structural element A and rotational speed S3 of structural element B.

Sixth Forward Speed

In the sixth forward speed, clutch CB1 and brake BA are turned ON. As a result, the rotation fed from first shaft 10 is transmitted to structural element B via the pair of counter gears Y and clutch CB1, while the rotation of structural element A is stopped. Thus, in the sixth forward speed, the rotation fed from first shaft 10 is reduced by the pair of counter gears Y and transmitted to structural element B of planetary gear trains 11 and 12. The rotation is then reduced by planetary gear trains 11 and 12 and then outputted from structural element C. Meanwhile, the rotation of structural element A is 0. Consequently, the second reverse speed characteristic is marked "$6^{th}$" in FIG. 30, which is a straight line joining rotational speed S3 of structural element B and the rotational speed (0) of structural element A.

Reverse

In reverse, clutch CA1 and brake BB are turned ON. As a result, the rotation fed from first shaft 10 is transmitted to structural element A via clutch CA1 and the pair of counter gears X, while the rotation of structural element B is stopped. Thus, in reverse, the rotation fed from first shaft 10 is reduced by the pair of counter gears X and transmitted to structural element A of planetary gear trains 11 and 12. The rotation is then reduced by planetary gear trains 11 and 12 and outputted structural element C. Meanwhile, the rotation of structural element B is 0. Consequently, the first reverse speed characteristic is marked "Rev" in FIG. 30, which is a straight line joining rotational speed S2 of structural element A and the rotational speed (0) of structural element B.

Operational Effects of Configurations III$_1$–III$_5$

With these configurations III$_1$–III$_5$, rotation can be inputted to the three structural elements A, B and D of the planetary gear trains 11 and 12 and two pairs of counter gears are provided between shaft 10 and shaft 31. As a result, this configuration provides two new speed regions (i.e., the third and fifth forward speeds) that can not be obtained with a conventional transmission apparatus, making it possible to realize an automatic transmission apparatus having six forward speeds, one reverse speed, and small differences between gear ratios.

Furthermore, similarly to Configurations I$_1$–I$_5$, the pairs of counter gears X and Y in Configurations III$_1$–III$_5$ transmit input torque and input rotation without reduction. Therefore, the torque and rotation capacities of the bearings and gears of the pair of counter gears can be made smaller. Also, since the rotation of the first shaft 10 can be reduced by the pairs of counter gears X and Y as well as transmitted by them to the second shaft 31, the rotational speed of the structural elements of the planetary gear trains 11 and 12 can be lowered. Thus, the gear efficiency can be improved and the relative rotation between the frictional members of the clutches and brakes can be decreased. As a result, the power loss of the transmission apparatus as a whole can be reduced.

Variations on Configurations III$_1$–III$_5$

In FIGS. 29A–29E, clutch CA1 and brake BA, which couple with structural element A of the planetary gear trains, are disposed on first shaft 10, but it is also acceptable for these items to be disposed on the second shaft 31.

Seventh Embodiment Using Configuration III$_1$

Figure 31:
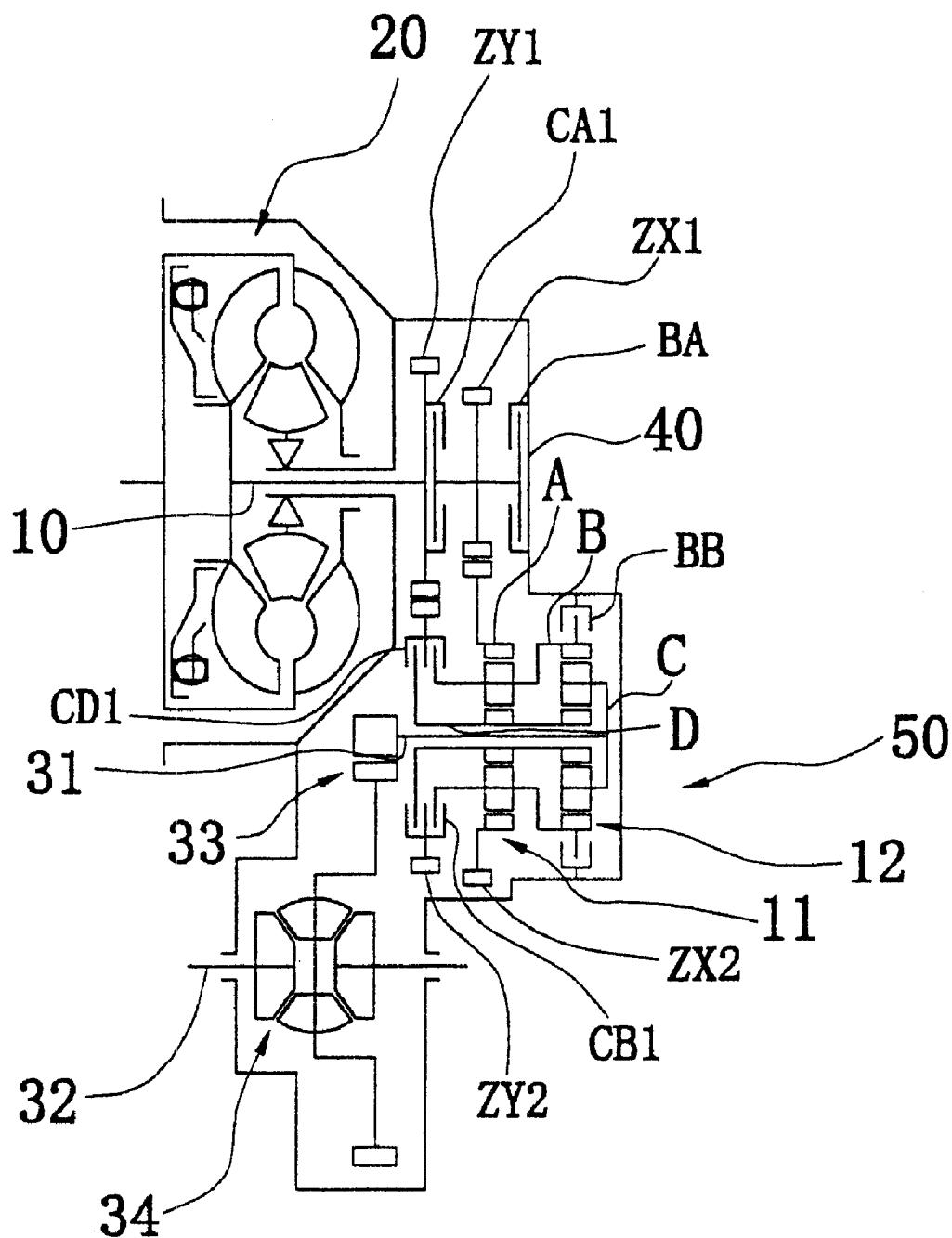
FIG. 31 is a schematic diagram of an automatic transmission apparatus utilizing Configuration $III_1$ of FIG. 29A in accordance with a seventh embodiment of the present invention.

A schematic view of the automatic transmission apparatus is shown in FIG. 31 in accordance with a seventh embodiment of the present invention. This automatic transmission apparatus uses the transmission configuration shown in FIG. 29A and is the same as the other embodiments, except for the primary features of the transmission 50.

Transmission 50 has a first shaft 10 on the input side, a second shaft 31 disposed so as to be parallel to first shaft 10, and an output shaft 32 disposed toward the output side of second shaft 31 so as to be parallel to first shaft 10. One gear each (i.e., ZX1 and ZY1, respectively) of two pairs of counter gears X and Y and a clutch CA1, and a brake BA are disposed on first shaft 10. Gear ZX1 of the pair of counter gears X is provided at the output part of clutch CA1. Meanwhile, planetary gear trains 11 and 12, clutch CB1, clutch CD1, brake BB, and the other gears (i.e., ZX2, and ZY2, respectively) of the pairs of counter gears X and Y are disposed on second shaft 31. Second shaft 31 and output shaft 32 are coupled together via the pair of counter gears 33 and a differential gear mechanism 34.

The reduction ratios αx and αy of two pairs of counter gears X and Y and the reduction ratios ρ1 and ρ2 of planetary gear trains 11 and 12 are given by the following equations: αX=ZX2/ZX1; αY=ZY2/ZY1; ρ1=ZS1/ZR1 and ρ2=ZS2/ZR2, where, as before, ZX1, ZX2, ZY1 and ZY2 are the tooth counts of gears ZX1, ZX2, ZY1 and ZY2, respectively, ZS1 is the tooth count of first sun gear S1, ZR1 is the tooth count of second ring gear R1, ZS2 is the tooth count of second sun gear S1, and ZR2 is the tooth count of second ring gear R2.

In this embodiment, the aforementioned gear ratios are set as follows: αX=2.0; αY=1.1; ρ1=0.5; and ρ2=0.4.

Next, the gear ratio of each speed level is explained. However, detailed explanations regarding the ON/OFF control of the coupling elements and the speed diagram for each of the speed levels is omitted here because these items are exactly the same as explained previously regarding FIG. 30.

First Forward Speed

Figure 32:
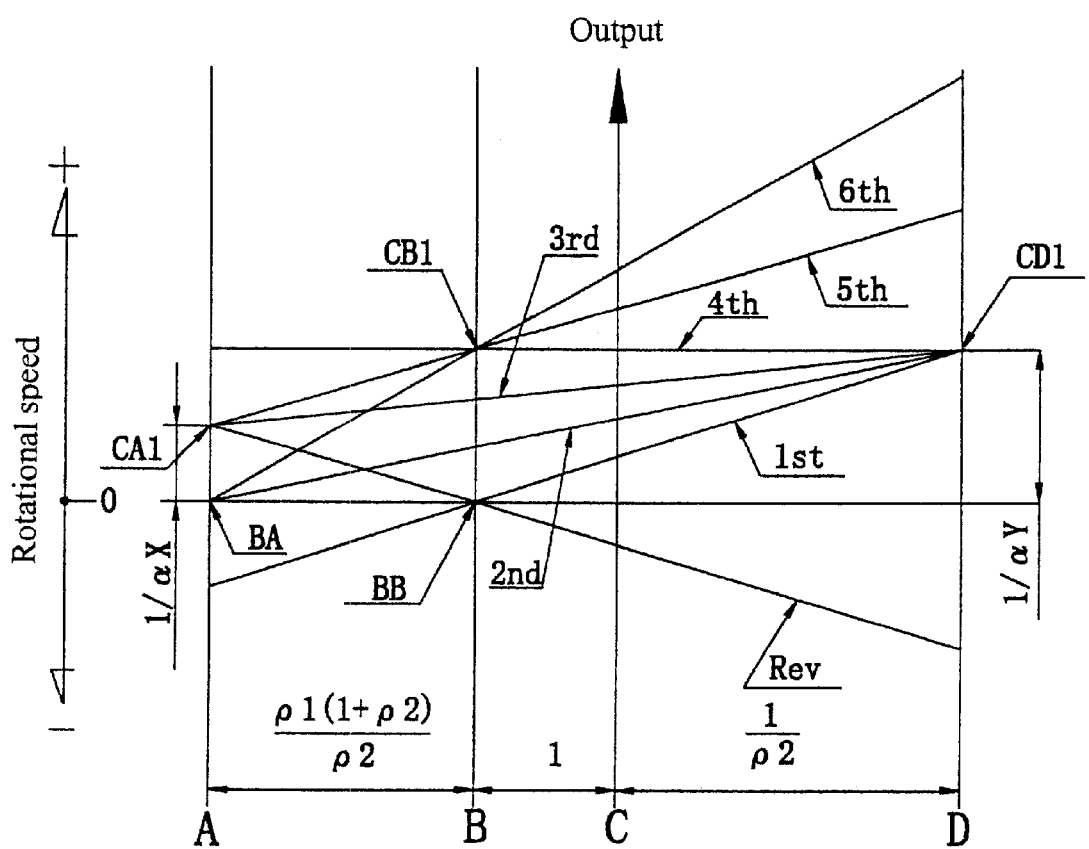
FIG. 32 is a graph showing operational characteristics of the coupling elements and a speed diagram for each speed level of the seventh embodiment shown in FIG. 31.

In the first forward speed, by turning on clutch CD1 and brake BB, the rotation fed from first shaft 10 is reduced by the pair of counter gears Y, transmitted to first and second sun gears S1 and S2 (structural element D), reduced by planetary gear trains 11 and 12, and outputted from second carrier Q2 (structural element C). The first forward speed characteristic in this case is basically the same as the speed characteristic marked "$1^{st}$" in FIG. 30 and, more specifically, is the speed characteristic marked "$1^{st}$" in FIG. 32. Meanwhile, as shown in FIG. 33, the gear ratio is given by the equation (1+ρ1)αY/ρ2, which is preferably 3.85 in this embodiment. The gear ratio mentioned here is the gear ratio at the output portion of second shaft 31, which holds true for the other speeds discussed below.

Second Forward Speed

In the second forward speed, by turning ON clutch CD1 and brake BA, the rotation fed from first shaft 10 is reduced by the pair of counter gears Y, transmitted to first and second sun gears S1 and S2, reduced by planetary gear trains 11 and 12, and then outputted from second carrier Qc. The second forward speed characteristic is marked "$2^{nd}$" in FIG. 32.

Meanwhile, as shown in FIG. 33, the gear ratio is given by the equation $(1+\rho1)(1+\rho2)\alpha Y/(\rho1+\rho1\rho2+\rho2)$, which is preferably 2.1 in this embodiment.

Third Forward Speed

In the third forward speed, by turning ON clutch CA1 and clutch CD1, the rotation fed from first shaft 10 is reduced by the pair of counter gears X and transmitted to first ring gear R1 (structural element A), while the same rotation is reduced by the pair of counter gears Y and transmitted to first and second sun gears S1 and S2. The rotation is then reduced by planetary gear trains 11 and 12, and then outputted from second carrier Q2. The third forward speed characteristic is marked "3$^{rd}$" in FIG. 32. Meanwhile, as shown in FIG. 33, the gear ratio is given by the equation $(1+\rho1)(1+\rho2)\alpha X\alpha Y/\{(\rho1+\rho1\rho2+\rho2)\alpha X+\alpha Y)\}$, which is preferably 1.4 in this embodiment.

Fourth Forward Speed

In the fourth forward speed, by turning ON clutch CB1 and clutch CD1, the rotation fed from first shaft 10 is reduced by the pair of counter gears Y and transmitted to first carrier Q1 and second ring gear R2 (structural element B). At the same time, the rotation reduced by the pair of counter gears Y is also fed to first and second sun gears S1 and S2. This causes planetary gear trains 11 and 12 to rotate as an integral unit. The fourth forward speed characteristic is marked "4$^{th}$" in FIG. 32. Meanwhile, as shown in FIG. 33, the gear ratio $\alpha Y$ is preferably 1.1 in this embodiment.

Fifth Forward Speed

In the fifth forward speed, by turning ON clutch CA1 and clutch CB1, the rotation fed from first shaft 10 is reduced by the pair of counter gears X and transmitted to first ring gear R1, while concurrently, the same rotation is reduced by the pair of counter gears Y and transmitted to first carrier Q1 and second ring gear R2. The rotation is then reduced by planetary gear trains 11 and 12, and then outputted from second carrier Q2. The fifth forward speed characteristic is marked "5$^{th}$" in FIG. 32. Meanwhile, as shown in FIG. 33, the gear ratio is given by the equation $\rho1(1+\rho2)\alpha X\alpha Y/\{(\rho1+\rho1\rho2+\rho2)\alpha X-\rho2\alpha X\}$, which is preferably 0.87 in this embodiment.

Sixth Forward Speed

In the sixth forward speed, by turning ON clutch CB1 and brake BA, the rotation fed from first shaft 10 is reduced by the pair of counter gears Y and transmitted to first carrier Q1 and second ring gear R2. The sixth forward speed characteristic is marked "6$^{th}$" in FIG. 32. Meanwhile, as shown in FIG. 33, the gear ratio is given by the equation $\rho1(1+\rho2)\alpha Y/(\beta1+\rho1\rho2+\rho2)$, which is preferably 0.7 in this embodiment.

Reverse

In reverse, by turning ON clutch CA1 and brake BB, the rotation fed from first shaft 10 is reduced by the pair of counter gears X, transmitted to first ring gear R1, reduced by planetary gear trains 11 and 12, and then outputted from second carrier Q2. The reverse speed characteristic is marked "Rev" in FIG. 32. Meanwhile, as shown in FIG. 33, the gear ratio is given by the equation $\rho1(1+\rho2)\alpha X/\rho2$, which is preferably 3.5 in this embodiment.

Eighth Embodiment Using Configurations III$_2$

Figure 34:
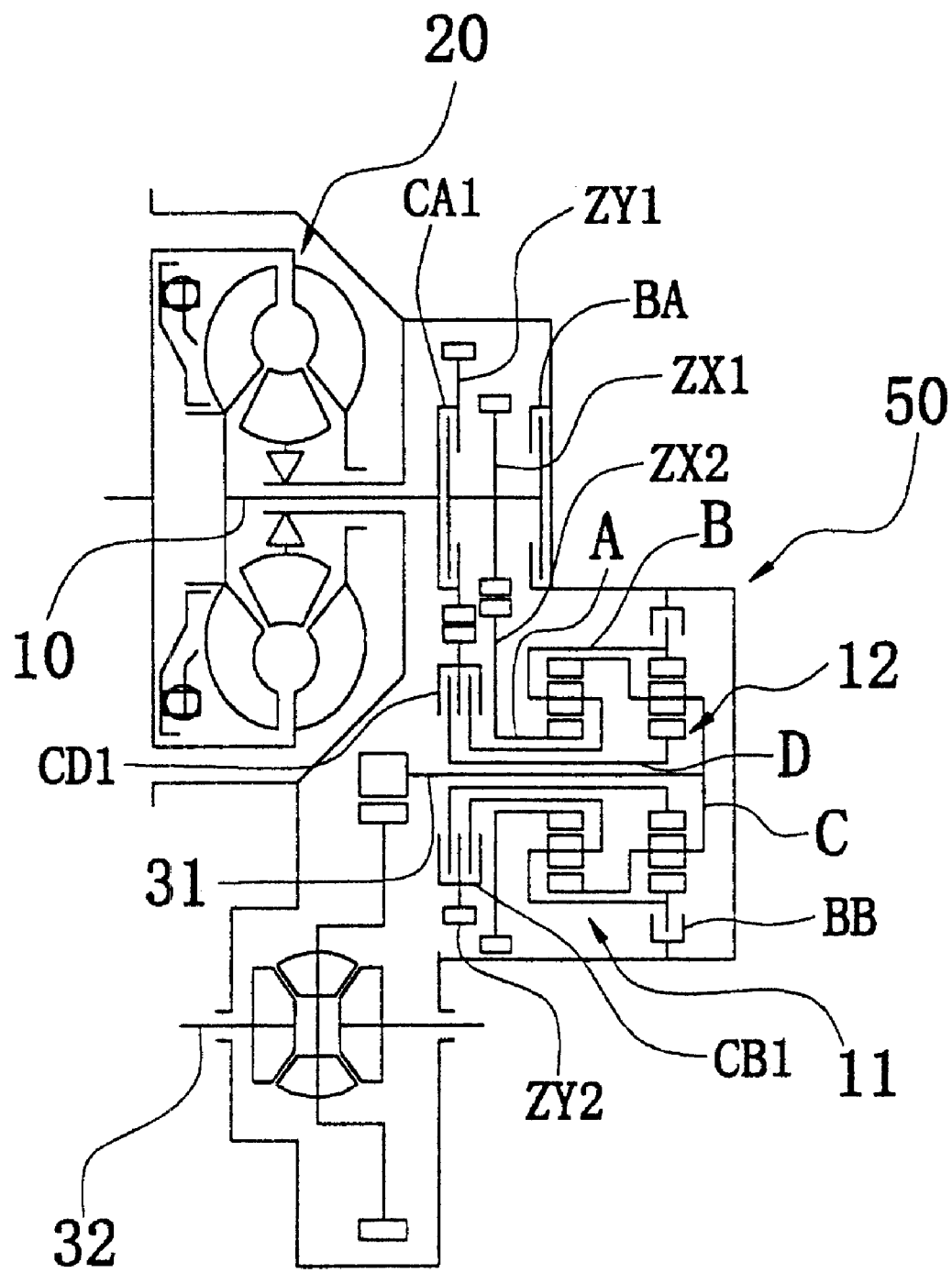
FIG. 34 is a schematic diagram of an automatic transmission apparatus utilizing Configuration $III_2$ of FIG. 29B in accordance with an eighth embodiment of the present invention.

A schematic view of the automatic transmission apparatus is shown in FIG. 34 in accordance with an eighth embodiment of the present invention. This automatic transmission apparatus uses the transmission configuration III$_2$ shown in FIG. 29B and has basically the same construction and operation as the seventh embodiment. The only differences are in parts related to the transmission, which are constructed as shown in FIG. 29B.

In this embodiment, the gear ratios of the pair of counter gears and planetary gear trains are set as follows: $\alpha X=2.1$; $\alpha Y=1.1$; $\rho1=0.65$; and $\rho2=0.4$.

Next, the gear ratio of each speed level is explained. However, detailed explanations regarding the ON/OFF control of the coupling elements and the speed diagram for each of the speed levels is omitted here because these items are exactly the same as explained previously regarding FIG. 30.

First Forward Speed

Figure 35:
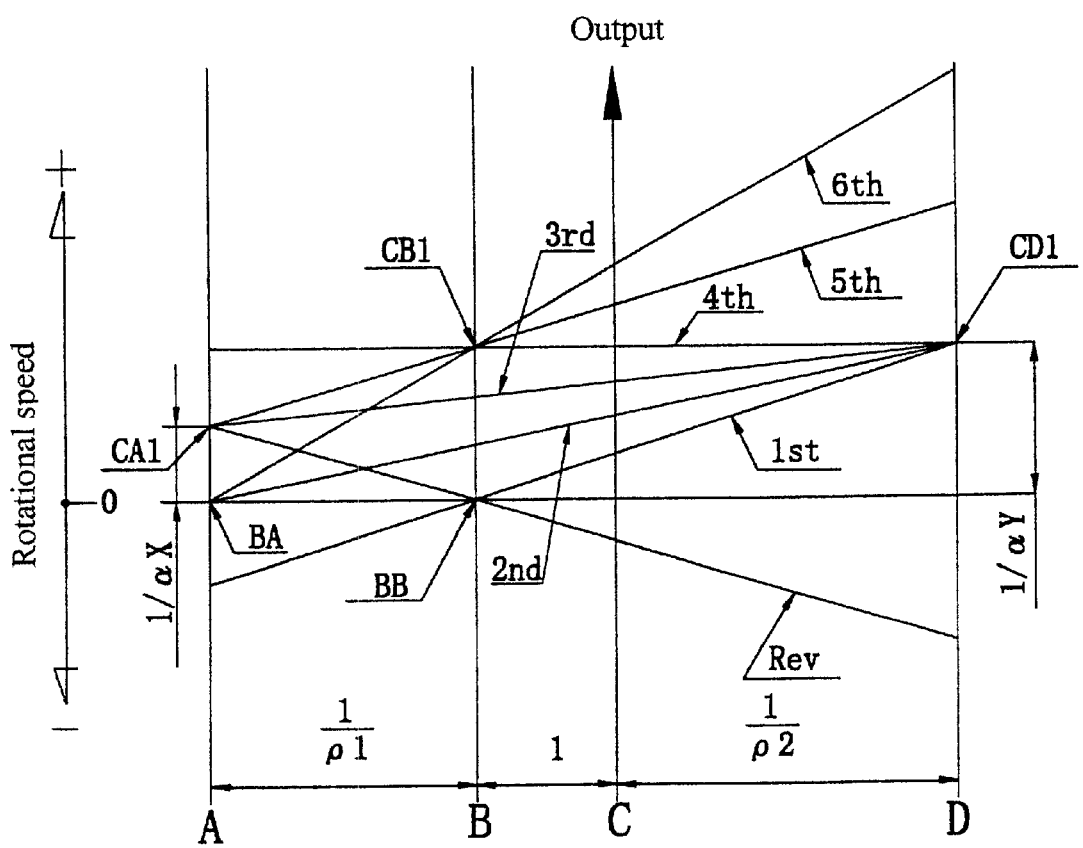
FIG. 35 is a graph showing operational characteristics of the coupling elements and a speed diagram for each speed level of the eighth embodiment shown in FIG. 34.

In the first forward speed, by turning on clutch CD1 and brake BB, the rotation fed from first shaft 10 is reduced by the pair of counter gears Y, transmitted to second sun gear S2 (structural element D), reduced by planetary gear trains 11 and 12, and outputted from first ring gear R1 and second carrier Q2 coupled thereto (structural element C). The output part remains the same for the other speed levels discussed below. The first forward speed characteristic is marked "1$^{st}$" in FIG. 35 (which is basically the same as FIG. 30). Meanwhile, as shown in FIG. 36, the gear ratio is given by the equation $(1+\rho2)\alpha Y/\rho2$, which is preferably 3.85 in this embodiment. As before, the gear ratio mentioned here is the gear ratio at the output portion of second shaft 31.

Second Forward Speed

In the second forward speed, by turning ON clutch CD1 and brake BA, the rotation fed from first shaft 10 is reduced by the pair of counter gears Y, transmitted to second sun gear S2, reduced by planetary gear trains 11 and 12, and outputted. The second forward speed characteristic is marked "2$^{nd}$" in FIG. 35. Meanwhile, as shown in FIG. 36, the gear ratio is given by the equation $(\rho1+\rho1\rho2+\rho2)\alpha Y/\rho2(1+\rho1)$, which is preferably 2.13 in this embodiment.

Third Forward Speed

In the third forward speed, by turning ON clutch CA1 and clutch CD1, the rotation fed from first shaft 10 is reduced by the pair of counter gears X and transmitted to first sun gear S1 (structural element A), while concurrently, the same rotation is reduced by the pair of counter gears Y and transmitted to second sun gear S2. The rotation is then reduced by planetary gear trains 11 and 12, and then outputted. The third forward speed characteristic is marked "3$^{rd}$" in FIG. 35. Meanwhile, as shown in FIG. 36, the gear ratio is given by the equation $(\rho1+\rho1\rho2+\rho2)\alpha X\alpha Y/\{(1+\rho1)\rho2\alpha X+\rho1\alpha Y\}$, which is preferably 1.44 in this embodiment.

Fourth Forward Speed

In the fourth forward speed, planetary gear trains 11 and 12 are made to rotate as an integral unit by turning ON clutch CB1 and clutch CD1. The fourth forward speed characteristic is marked "4$^{th}$" in FIG. 35. Meanwhile, as shown in FIG. 36, the gear ratio $\alpha Y$ is preferably 1.1 in this embodiment.

Fifth Forward Speed

In the fifth forward speed, by turning ON clutch CA1 and clutch CB1, the rotation fed from first shaft 10 is reduced by the pair of counter gears X and transmitted to first sun gear S1, while concurrently, the same rotation is reduced by the pair of counter gears Y and transmitted to first carrier Q1 and second ring gear R2. The rotation is then reduced by planetary gear trains 11 and 12, and then outputted. The fifth speed characteristic is marked "$5^{th}$" in FIG. 35. Meanwhile, as shown in FIG. 36, the gear ratio is given by the equation $\alpha X\alpha Y/\{(1+\rho 1)\alpha X-\rho 1\alpha Y\}$, which is preferably 0.84 in this embodiment.

Sixth Forward Speed

In the sixth forward speed, by turning ON clutch CB1 and brake BA, the rotation fed from first shaft 10 is reduced by the pair of counter gears Y, transmitted to first carrier Q1 and second ring gear R2, reduced by planetary gear trains 11 and 12, and outputted. The sixth forward speed characteristic is marked "$6^{th}$" in FIG. 35. Meanwhile, as shown in FIG. 36, the gear ratio is given by the equation $\alpha Y/(1+\rho 1)$, which is 0.67 in this embodiment.

Reverse

In reverse, by turning ON clutch CA1 and brake BB, the rotation fed from first shaft 10 is reduced by the pair of counter gears X, transmitted to first sun gear S1, reduced by planetary gear trains 11 and 12, and outputted. The reverse speed characteristic is marked "Rev" in FIG. 35. Meanwhile, as shown in FIG. 36, the gear ratio is given by the equation $\alpha X/\rho 1$, which is preferably 3.23 in this embodiment.

Ninth Embodiment Using Configuration III$_3$

Figure 37:
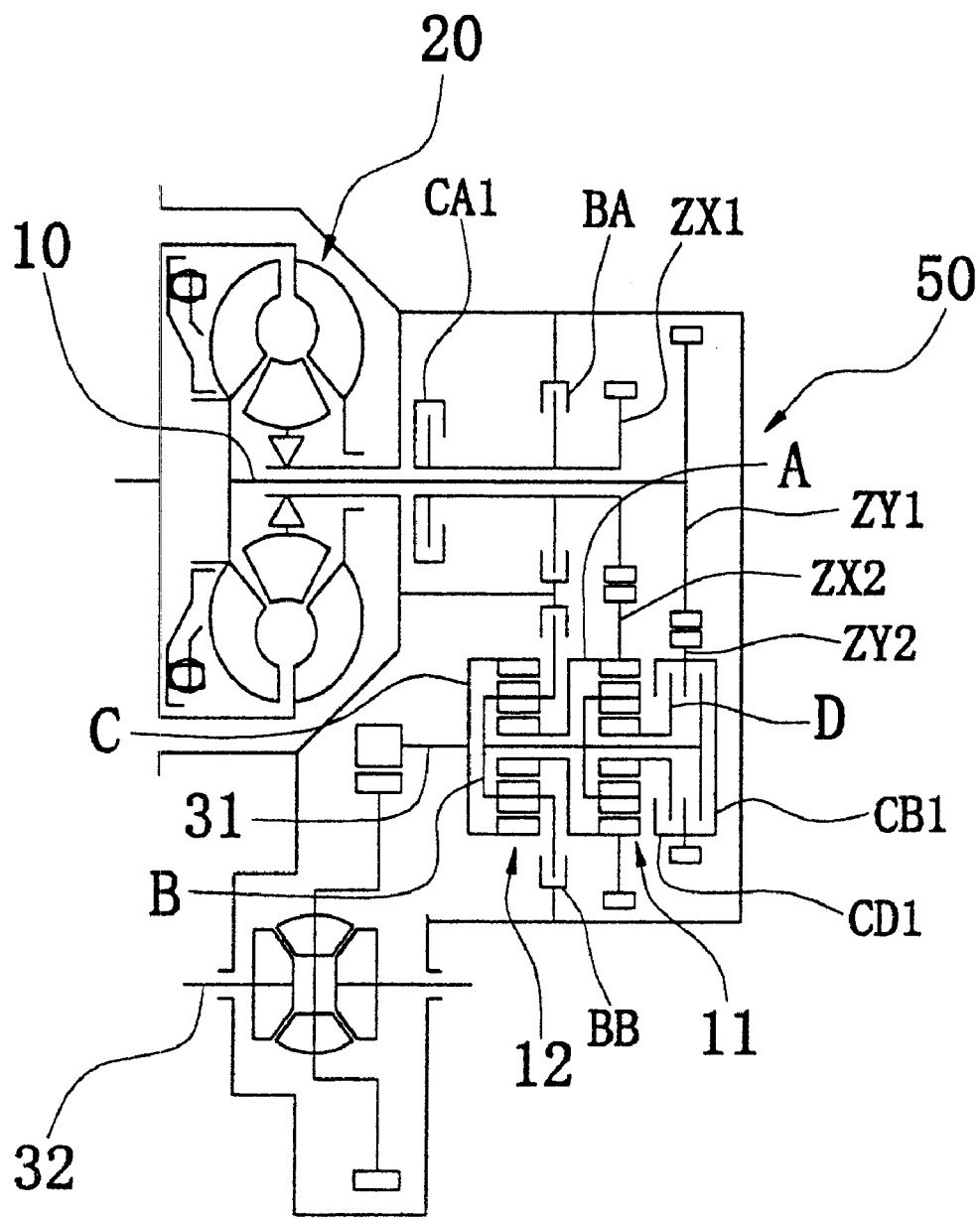
FIG. 37 is a schematic diagram of an automatic transmission apparatus utilizing Configuration $III_3$ of FIG. 29C in accordance with a ninth embodiment of the present invention.

A schematic view of the automatic transmission apparatus is shown in FIG. 37 in accordance with a ninth embodiment of the present invention. This automatic transmission apparatus uses the transmission configuration III$_3$ shown in FIG. 29C and has basically the same construction and operation as the seventh embodiment. The only differences are in parts related to the transmission, which are constructed as shown in FIG. 29C. In this embodiment, the gear ratios of the pairs of counter gears and planetary gear trains are set as follows: $\alpha X=2.0$; $\alpha Y=1.1$; $\rho 1=0.45$; and $\rho 2=0.65$.

Next, the gear ratio of each speed level is explained. However, detailed explanations regarding the ON/OFF control of the coupling elements and the speed diagram for each of the speed levels is omitted here because these items are exactly the same as explained previously regarding FIG. 30.

First Forward Speed

Figure 38:
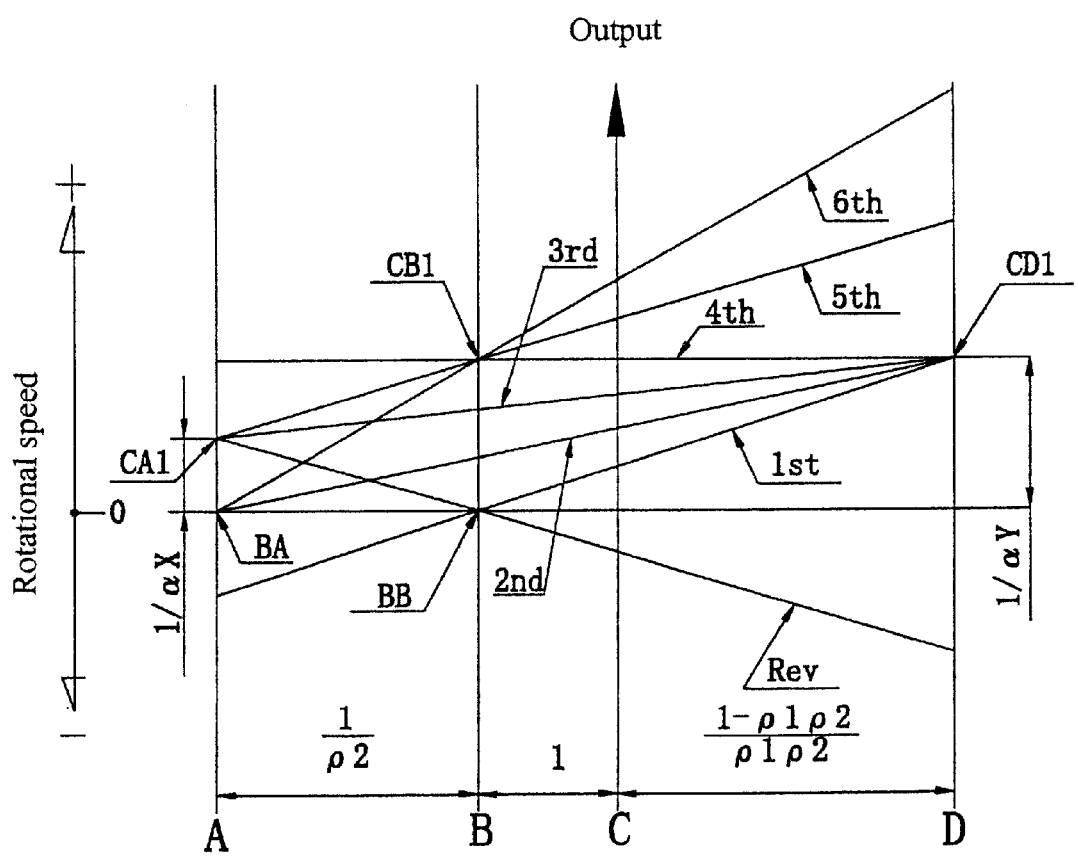
FIG. 38 is a graph showing operational characteristics of the coupling elements and a speed diagram for each speed level of the ninth embodiment shown in FIG. 37.

In the first forward speed, by turning on clutch CD1 and brake BB, the rotation fed from first shaft 10 is reduced by the pair of counter gears Y, transmitted to first sun gear S1 (structural element D), reduced by planetary gear trains 11 and 12, and outputted from second ring gear R2 (structural element C). The output part remains the same for the other speed levels discussed below. The first forward speed characteristic is marked "$1^{st}$" in FIG. 38 (which is basically the same as FIG. 30). Meanwhile, as shown in FIG. 39, the gear ratio is given by the equation $\alpha Y/\rho 1\rho 2$, which is preferably 3.76 in this embodiment. Again, the gear ratio mentioned here is the gear ratio at the output portion of second shaft 31.

Second Forward Speed

In the second forward speed, by turning ON clutch CD1 and brake BA, the rotation fed from first shaft 10 is reduced by the pair of counter gears Y, transmitted to first sun gear S1, reduced by planetary gear trains 11 and 12, and then outputted. The second forward speed characteristic is marked "$2^{nd}$" in FIG. 38. Meanwhile, as shown in FIG. 39, the gear ratio is given by the equation $(1+\rho 1)\alpha Y/\rho 1(1+\rho 2)$, which is preferably 2.15 in this embodiment.

Third Forward Speed

In the third forward speed, by turning ON clutch CA1 and clutch CD1, the rotation fed from first shaft 10 is reduced by the pair of counter gears X, transmitted to first ring gear R1 and second sun gear S2 (structural element A), while concurrently, the same rotation is reduced by the pair of counter gears Y and transmitted to first sun gear S1. The rotation is then reduced by planetary gear trains 11 and 12, and then outputted. The third forward speed characteristic is marked "$3^{rd}$" in FIG. 38. Meanwhile, as shown in FIG. 39, the gear ratio is given by the equation $(1+\rho 1)\alpha X\alpha Y/\{\rho 1(1+\rho 2)\alpha X+(1-\rho 1\rho 2)\alpha Y\}$, which is 1.41 in this embodiment.

Fourth Forward Speed

In the fourth forward speed, planetary gear trains 11 and 12 are made to rotate as an integral unit by turning ON clutch CB1 and clutch CD1. The fourth forward speed characteristic is marked "$4^{th}$" in FIG. 38. Meanwhile, as shown in FIG. 39, the gear ratio $\alpha Y$ is preferably 1.1 in this embodiment.

Fifth Forward Speed

In the fifth forward speed, by turning ON clutch CA1 and clutch CB1, the rotation fed from first shaft 10 is reduced by the pair of counter gears X and transmitted to first ring gear R1 and second sun gear S2, while concurrently, the same rotation is reduced by the pair of counter gears Y and transmitted to first and second carriers Q1 and Q2 (structural element B). The rotation is then reduced by planetary gear trains 11 and 12, and then outputted. The fifth forward speed characteristic is marked "$5^{th}$" in FIG. 38. Meanwhile, as shown in FIG. 39, the gear ratio is given by the equation $\alpha X\alpha Y/\{(\alpha X-\alpha Y)\rho 2+\alpha X\}$, which is preferably 0.85 in this embodiment.

Sixth Forward Speed

In the sixth forward speed, by turning ON clutch CB1 and brake BA, the rotation fed from first shaft 10 is reduced by the pair of counter gears Y, transmitted to first and second carriers Q1, Q2, reduced by planetary gear trains 11 and 12, and outputted. The sixth forward speed characteristic is marked "$6^{th}$" in FIG. 38. Meanwhile, as shown in FIG. 39, the gear ratio is given by the equation $\alpha Y/(1+\rho 2)$, which is preferably 0.67 in this embodiment.

Reverse

In reverse, by turning ON clutch CA1 and brake BB, the rotation fed from first shaft 10 is reduced by the pair of counter gears X, transmitted to first ring gear R1 and second sun gear S2, reduced by planetary gear trains 11 and 12, and then outputted. The reverse speed characteristic is marked "Rev" in FIG. 38. Meanwhile, as shown in FIG. 39, the gear ratio is given by the equation $(\alpha X/\rho 2$, which is preferably 3.08 in this embodiment.

Tenth Embodiment Using Configurations III$_4$

Figure 40:
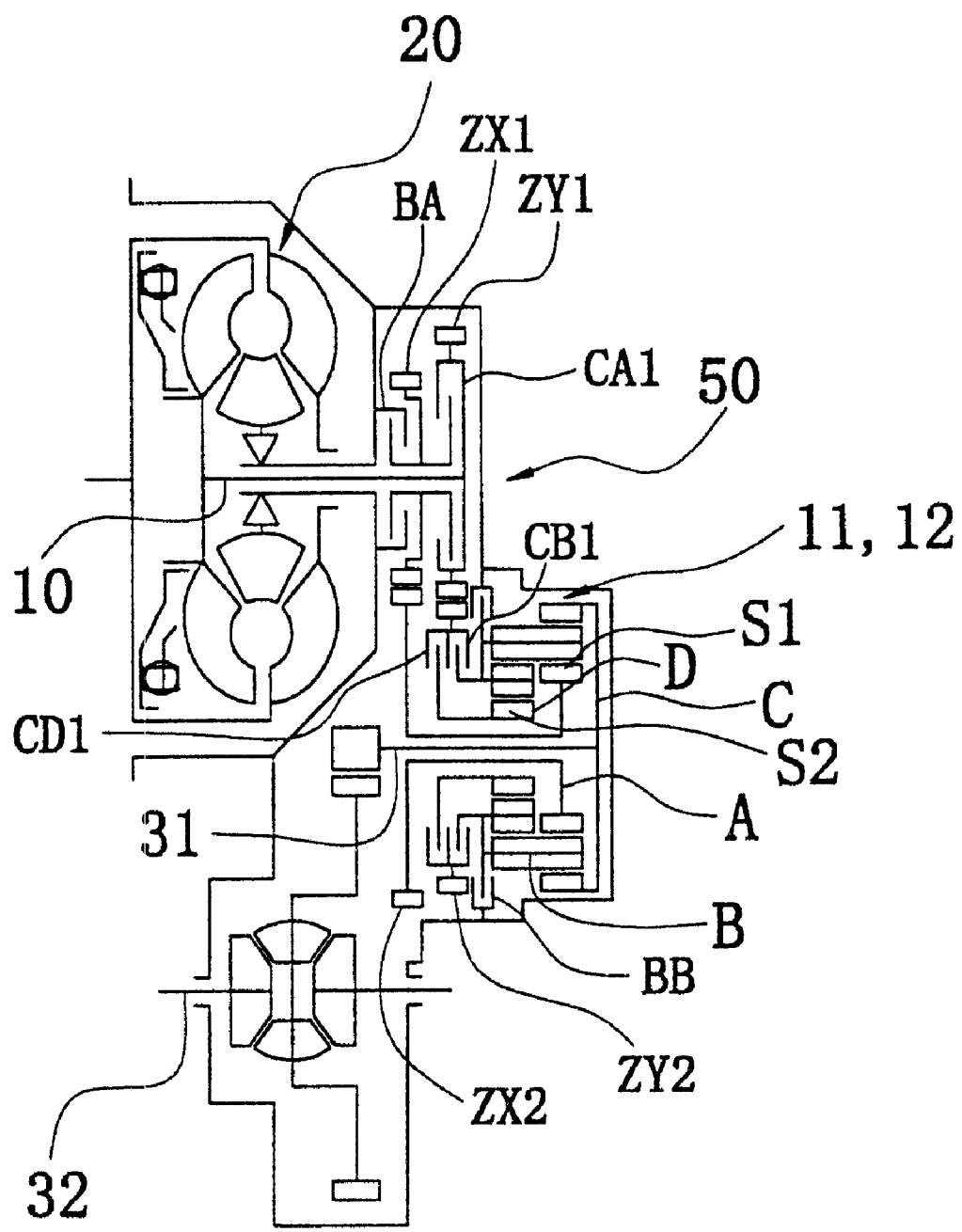
FIG. 40 is a schematic diagram of an automatic transmission apparatus utilizing Configuration $III_4$ of FIG. 29D in accordance with the tenth embodiment of the present invention.

A schematic view of the automatic transmission apparatus is shown in FIG. 40 in accordance with a tenth embodiment of the present invention. This automatic transmission apparatus uses the transmission configuration III$_4$ shown in FIG.

29D and has basically the same construction and operation as the seventh embodiment. The only differences are in parts related to the transmission, which are constructed as shown in FIG. 29D. In this embodiment, the gear ratios of the pairs of counter gears and planetary gear trains are set as follows: $\alpha X=2.0$; $\alpha Y=1.1$; $\rho 1=0.55$; and $\rho 2=0.3$.

Next, the gear ratio of each speed level is explained. However, detailed explanations regarding the ON/OFF control of the coupling elements and the speed diagram for each of the speed levels is omitted here because these items are exactly the same as explained previously regarding FIG. 30.

First Forward Speed

Figure 41:
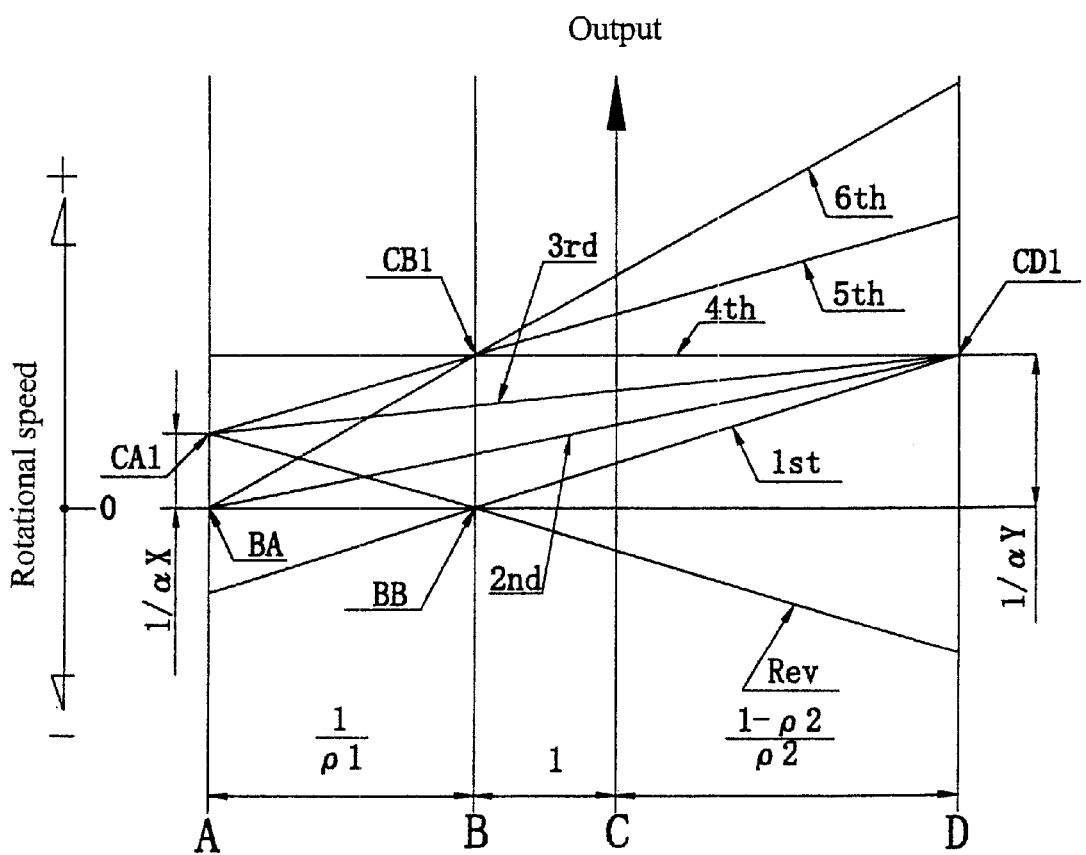
FIG. 41 is a graph showing operational characteristics of the coupling elements and a speed diagram for each speed level of the tenth embodiment shown in FIG. 40.

In the first forward speed, by turning on clutch CD1 and brake BB, the rotation fed from first shaft 10 is reduced by the pair of counter gears Y, transmitted to second sun gear S2 (structural element D), reduced by planetary gear trains 11 and 12, and outputted from common ring gear Rc (structural element C). The output part remains the same for the other speed levels discussed below. The first forward speed characteristic is marked "$1^{st}$" in FIG. 41 (which is basically the same as FIG. 30). Meanwhile, as shown in FIG. 42, the gear ratio is given by the equation $\alpha Y/\rho 2$, which is preferably 3.67 in this embodiment. Again, the gear ratio mentioned here is the gear ratio at the output portion of second shaft 31.

Second Forward Speed

In the second forward speed, by turning ON clutch CD1 and brake BA, the rotation fed from first shaft 10 is reduced by the pair of counter gears Y, transmitted to second sun gear S2, reduced by planetary gear trains 11 and 12, and then outputted. The second forward speed characteristic is marked "$2^{nd}$" in FIG. 41. Meanwhile, as shown in FIG. 42, the gear ratio is given by the equation $(\rho 1+\rho 2)\alpha Y/(1+\rho 1)\rho 2$, which is preferably 2.01 in this embodiment.

Third Forward Speed

In the third forward speed, by turning ON clutch CA1 and clutch CD1, the rotation fed from first shaft 10 is reduced by the pair of counter gears X, transmitted to first sun gear S1 (structural element A), while concurrently, the same rotation is reduced by the pair of counter gears Y and transmitted to second sun gear S2. The rotation is then reduced by planetary gear trains 11 and 12, and then outputted. The third forward speed characteristic is marked "$3^{rd}$" in FIG. 41. Meanwhile, as shown in FIG. 42, the gear ratio is given by the equation $(\rho 1+\rho 2)\alpha X\alpha Y/\{(1+\rho 1)\rho 2\alpha X+(1-\rho 2)\rho 1\alpha Y\}$, which is preferably 1.38 in this embodiment.

Fourth Forward Speed

In the fourth forward speed, planetary gear trains 11 and 12 are made to rotate as an integral unit by turning ON clutch CB1 and clutch CD1. The fourth forward speed characteristic is marked "$4^{th}$" in FIG. 41. Meanwhile, as shown in FIG. 42, the gear ratio $\alpha Y$ is preferably 1.1 in this embodiment.

Fifth Forward Speed

In the fifth forward speed, by turning ON clutch CA1 and clutch CB1, the rotation fed from first shaft 10 is reduced by the pair of counter gears X and transmitted to first sun gear S1, while concurrently, the same rotation is reduced by the pair of counter gears Y and transmitted to common carrier Qc (structural element B). The rotation is then reduced by planetary gear trains 11 and 12, and then outputted. The fifth forward speed characteristic is marked "$5^{th}$" in FIG. 41. Meanwhile, as shown in FIG. 42, the gear ratio is given by the equation $\alpha X\alpha Y/\{\rho 1(\alpha X-\alpha Y)+\alpha X\}$, which is preferably 0.88 in this embodiment.

Sixth Forward Speed

In the sixth forward speed, by turning ON clutch CB1 and brake BA, the rotation fed from first shaft 10 is reduced by the pair of counter gears Y, transmitted to common carrier Qc, reduced by planetary gear trains 11 and 12, and then outputted. The sixth forward speed characteristic is marked "$6^{th}$" in FIG. 41. Meanwhile, as shown in FIG. 42, the gear ratio is given by the equation $\alpha Y/(1+\rho 1)$, which is preferably 0.71 in this embodiment.

Reverse

In reverse, by turning ON clutch CA1 and brake BB, the rotation fed from first shaft 10 is reduced by the pair of counter gears X, transmitted to first sun gear S1, reduced by planetary gear trains 11 and 12, and then outputted. The reverse speed characteristic is marked "Rev" in FIG. 41. Meanwhile, as shown in FIG. 42, the gear ratio is given by the equation $\alpha X/\rho 1$, which is preferably 3.64 in this embodiment.

Eleventh Embodiment Using Configuration III$_5$

Figure 43:
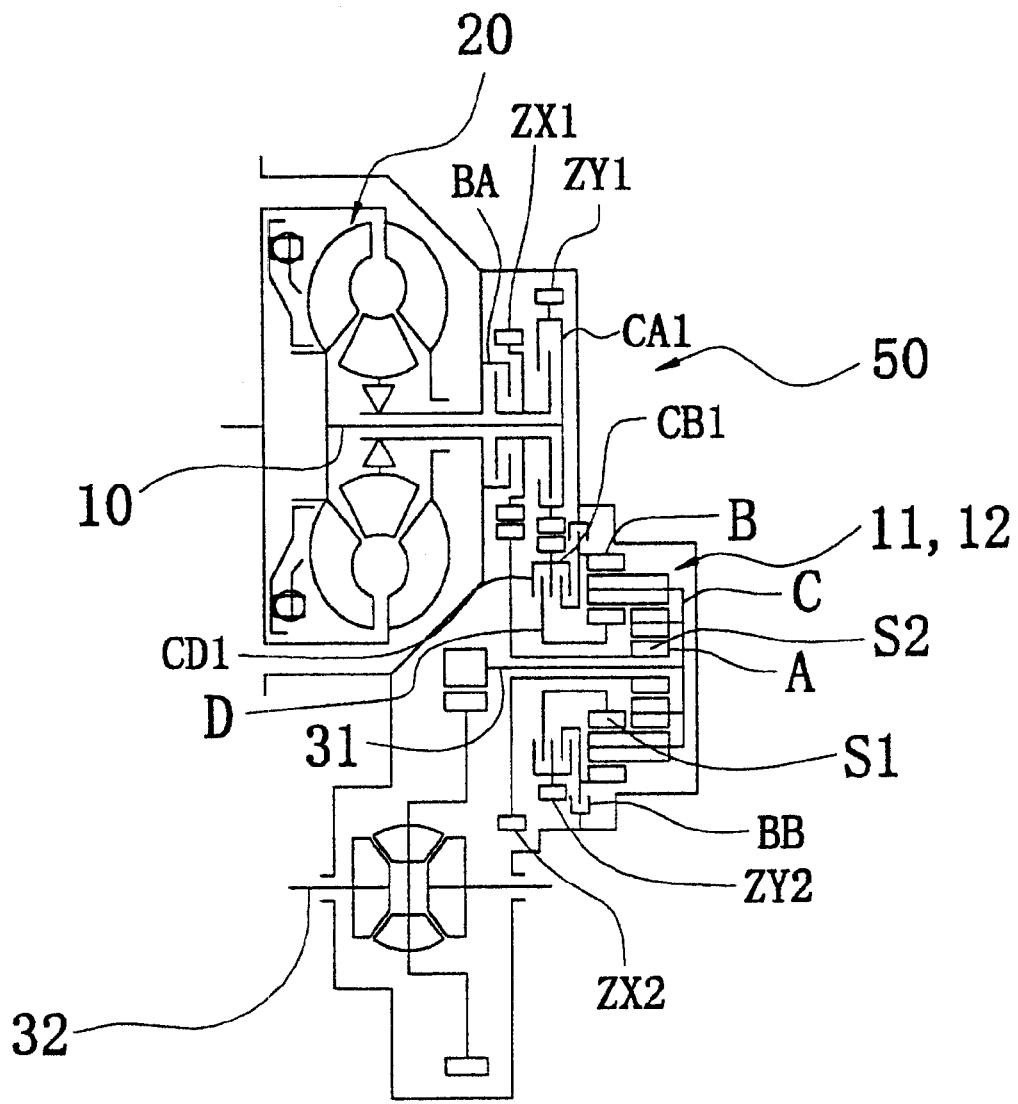
FIG. 43 is a schematic diagram of an automatic transmission apparatus utilizing Configuration $III_5$ of FIG. 29E in accordance with the eleventh embodiment of the present invention.

A schematic view of the automatic transmission apparatus is shown in FIG. 43 in accordance with an eleventh embodiment of the present invention. This automatic transmission apparatus uses the transmission configuration III$_5$ shown in FIG. 29E and has basically the same construction and operation as the seventh embodiment. The only differences are in parts related to the transmission, which are constructed as shown in FIG. 29E. In this embodiment, the gear ratios of the pair of counter gears and planetary gear trains are set as follows: $\alpha X=2.0$; $\alpha Y=1.2$; $\rho 1=0.45$; and $\rho 2=0.35$.

Next, the gear ratio of each speed level is explained. However, detailed explanations regarding the ON/OFF control of the coupling elements and the speed diagram for each of the speed levels is omitted here because these items are exactly the same as explained previously regarding FIG. 30.

First Forward Speed

Figure 44:
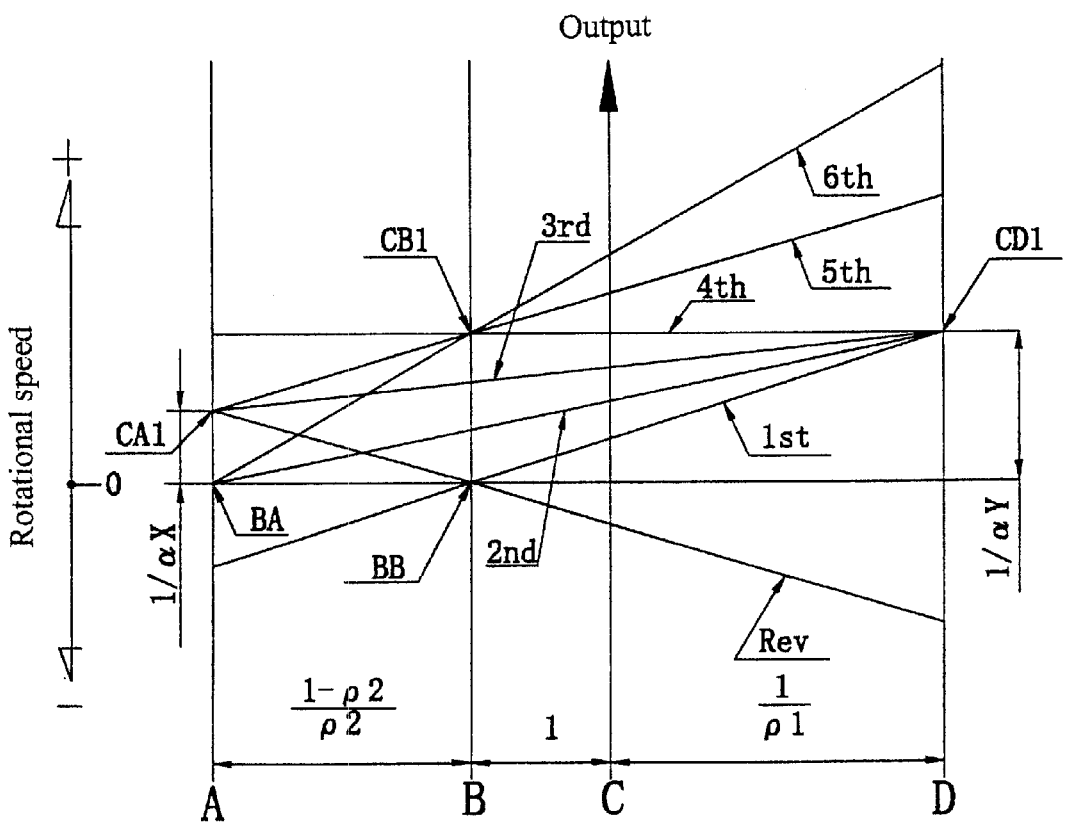
FIG. 44 is a graph showing operational characteristics of the coupling elements and a speed diagram for each speed level of the eleventh embodiment shown in FIG. 43.

In the first forward speed, by turning on clutch CD1 and brake BB, the rotation fed from first shaft 10 is reduced by the pair of counter gears Y, transmitted to first sun gear S1 (structural element D), reduced by planetary gear trains 11 and 12, and then outputted from common carrier Qc (structural element C). The output part remains the same for the other speed levels discussed below. The first forward speed characteristic is marked "$1^{st}$" in FIG. 44 (which is basically the same as FIG. 30). Meanwhile, as shown in FIG. 45, the gear ratio is given by the equation $(1+\rho 1)\alpha Y/\rho 1$, which is preferably 3.87 in this embodiment. Again, the gear ratio mentioned here is the gear ratio at the output portion of second shaft 31.

Second Forward Speed

In the second forward speed, by turning ON clutch CD1 and brake BA, the rotation fed from first shaft 10 is reduced by the pair of counter gears Y, transmitted to first sun gear S1, reduced by planetary gear trains 11 and 12, and then outputted. The second forward speed characteristic is marked "$2^{nd}$" in FIG. 44. Meanwhile, as shown in FIG. 45, the gear ratio is given by the equation $(\rho1+\rho2)\alpha Y/\rho1$, which is preferably 2.13 in this embodiment.

Third Forward Speed

In the third forward speed, by turning ON clutch CA1 and clutch CD1, the rotation fed from first shaft 10 is reduced by the pair of counter gears X, transmitted to second sun gear S2 (structural element A), while concurrently, the same rotation is reduced by the pair of counter gears Y and transmitted to second sun gear S2. The rotation is then reduced by planetary gear trains 11 and 12, and then outputted. The third forward speed characteristic is marked "$3^{rd}$" in FIG. 44. Meanwhile, as shown in FIG. 45, the gear ratio is given by the equation $(\rho1+\rho2)\alpha X\alpha Y/(\rho1\alpha X+\rho2\alpha Y)$, which is preferably 1.45 in this embodiment.

Fourth Forward Speed

In the fourth forward speed, planetary gear trains 11 and 12 are made to rotate as an integral unit by turning ON clutch CB1 and clutch CD1. The fourth forward speed characteristic is marked "$4^{th}$" in FIG. 44. Meanwhile, as shown in FIG. 45, the gear ratio is given by the equation $\alpha Y$, which is preferably 1.2 in this embodiment.

Fifth Forward Speed

In the fifth forward speed, by turning ON clutch CA1 and clutch CB1, the rotation fed from first shaft 10 is reduced by the pair of counter gears X and transmitted to second sun gear S2, while concurrently, the same rotation is reduced by the pair of counter gears Y and transmitted to common ring gear Rc (structural element B). The rotation is then reduced by planetary gear trains 11 and 12, and then outputted. The fifth forward speed characteristic is marked "$5^{th}$" in FIG. 44. Meanwhile, as shown in FIG. 45, the gear ratio is given by the equation $(1-\rho2)\alpha X\alpha Y/(\alpha X-\rho2\alpha Y)$, which is preferably 0.99 in this embodiment.

Sixth Forward Speed

In the sixth forward speed, by turning ON clutch CB1 and brake BA, the rotation fed from first shaft 10 is reduced by the pair of counter gears Y, transmitted to common ring gear Rc, reduced by planetary gear trains 11 and 12, and then outputted. The sixth forward speed characteristic is marked "$6^{th}$" in FIG. 44. Meanwhile, as shown in FIG. 45, the gear ratio is given by the equation $(1-\rho2)\alpha Y$, which is preferably 0.78 in this embodiment.

Reverse

In reverse, by turning ON clutch CA1 and brake BB, the rotation fed from first shaft 10 is reduced by the pair of counter gears X, transmitted to second sun gear S2, reduced by planetary gear trains 11 and 12, and then outputted. The reverse speed characteristic is marked "Rev" in FIG. 44. Meanwhile, as shown in FIG. 45, the gear ratio is given by the equation $(1-\rho2)\alpha X/\rho2$, which is preferably 3.71 in this embodiment.

Variations on the Seventh through Eleventh Embodiments

Figure 46:
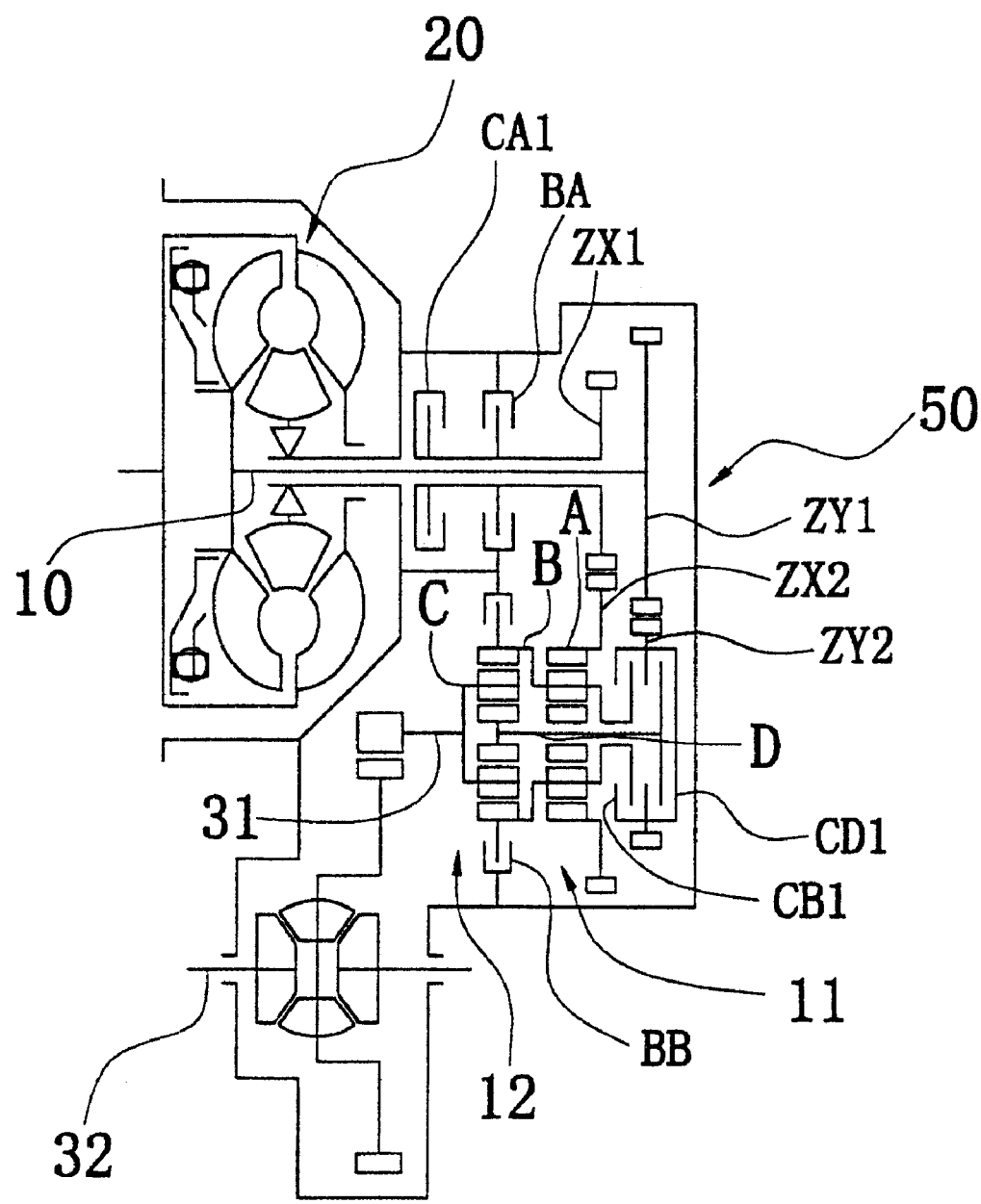
FIG. 46 is a schematic diagram of a variation of the automatic transmission apparatuses on the seventh through eleventh embodiments of the present invention.
Figure 47A:
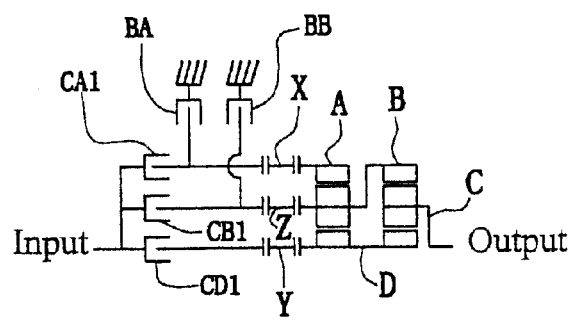
FIG. 47A is a schematic diagram of a transmission to be used in an automatic transmission apparatus of the present invention in accordance with Configuration $IV_1$.
Figure 47B:
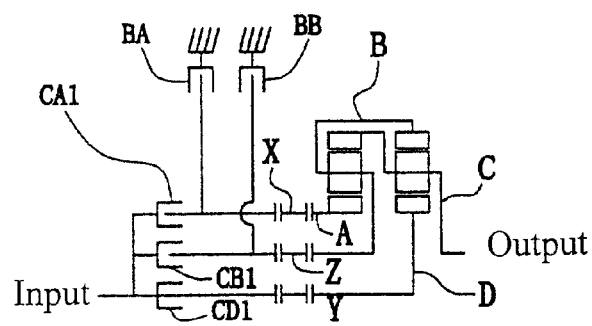
FIG. 47B is a schematic diagram of a transmission to be used in an automatic transmission apparatus of the present invention in accordance with Configuration $IV_2$.
Figure 47C:
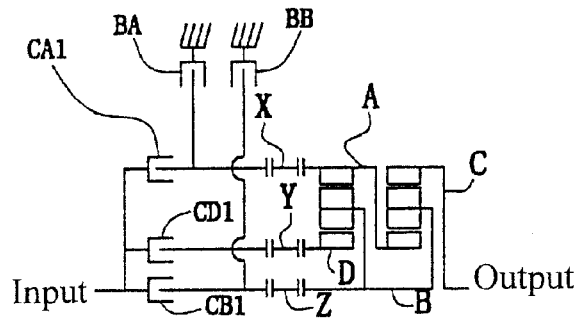
FIG. 47C is a schematic diagram of a transmission to be used in an automatic transmission apparatus of the present invention in accordance with Configuration $IV_3$.
Figure 47D:
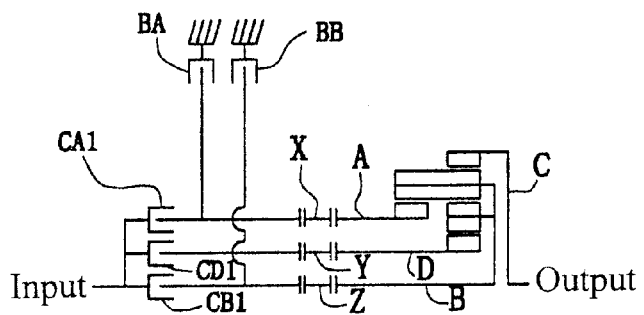
FIG. 47D is a schematic diagram of a transmission to be used in an automatic transmission apparatus of the present invention in accordance with Configuration $IV_4$.
Figure 47E:
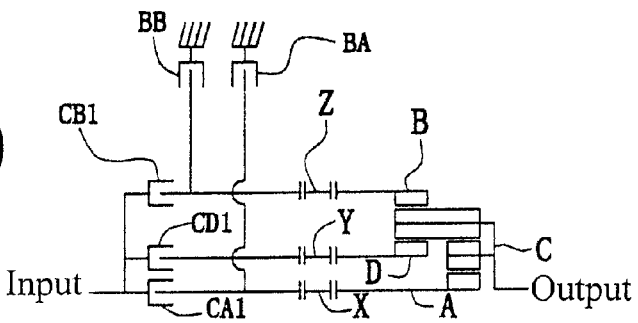
FIG. 47E is a schematic diagram of a transmission to be used in an automatic transmission apparatus of the present invention in accordance with Configuration $IV_5$.

The pairs of counter gears X and Y that couple the first shaft 10 with the second shaft 31 can be located on either the engine side or the opposite side of the planetary gear trains. For example, the pairs of counter gears X and Y are disposed on the engine side of the planetary gear trains 11 and 12 in the seventh embodiment but, as shown in FIG. 46, it is also possible to dispose the pairs of counter gears X and Y on the other side (i.e., not the engine side) of the planetary gear trains 11 and 12. The positioning of the pairs of counter gears X and Y can be varied in each of the embodiments.

Transmission Configurations $IV_1$–$IV_5$

Referring to FIGS. 47A–47E, five more configurations $IV_1$–$IV_5$ for automatic transmission apparatuses are illustrated in accordance with additional embodiments of the present invention. Each of the transmission configurations $IV_1$–$IV_5$ of FIGS. 47A–47E includes a plurality of pairs of counter gears, a plurality of clutches, a plurality of brakes, and a plurality of planetary gear trains. In the figures, planetary gear trains 11 and 12 are provided on the second shaft 31, which is disposed so as to be parallel with the input or first shaft 10. The structural elements of planetary gear trains 11 and 12 that serve to transmit power are indicated as structural elements A, B, C and D. Clutch CA1 is provided between structural element A and first shaft 10, clutch CB1 is provided between structural element B and first shaft 10, and clutch CD1 is provided between structural element D and first shaft 10. Clutches CA1, CB1 and CD1 are provided on the first shaft side. First shaft 10 is coupled with structural element A (which is on the second shaft side) via clutch CA1 and the pair of counter gears X, with structural element B (which is on the second shaft side) via clutch CB1 and the pair of counter gears Z, and with structural element D (which is on the second shaft side) via clutch CD1 and the pair of counter gears Y. Brakes BA and BB are provided to brake the rotation of structural elements A and B.

The following aspects of the transmission configurations $IV_1$–$IV_5$ shown in FIG. 47A to FIG. 47E differ from those of the previously discussed Configurations $III_1$–$III_5$:

(i) Clutch CB1 is disposed on the first shaft side, and the same clutch CB1 is coupled with structural element B of planetary gear trains 11 and 12 via the pair of counter gears Z.

(ii) Clutch CD1 is disposed on the first shaft side, and the same clutch CD1 is coupled to structural element D of planetary gear trains 11 and 12 via the pair of counter gears Y.

Meanwhile, the constituent features of the planetary gear trains 11 and 12 and other components remain the same. For this reason, detailed explanations of each transmission configuration shown in the FIGS. 47A–47E is omitted.

Speed Diagram of Configurations $IV_1$–$IV_5$

Figure 48:
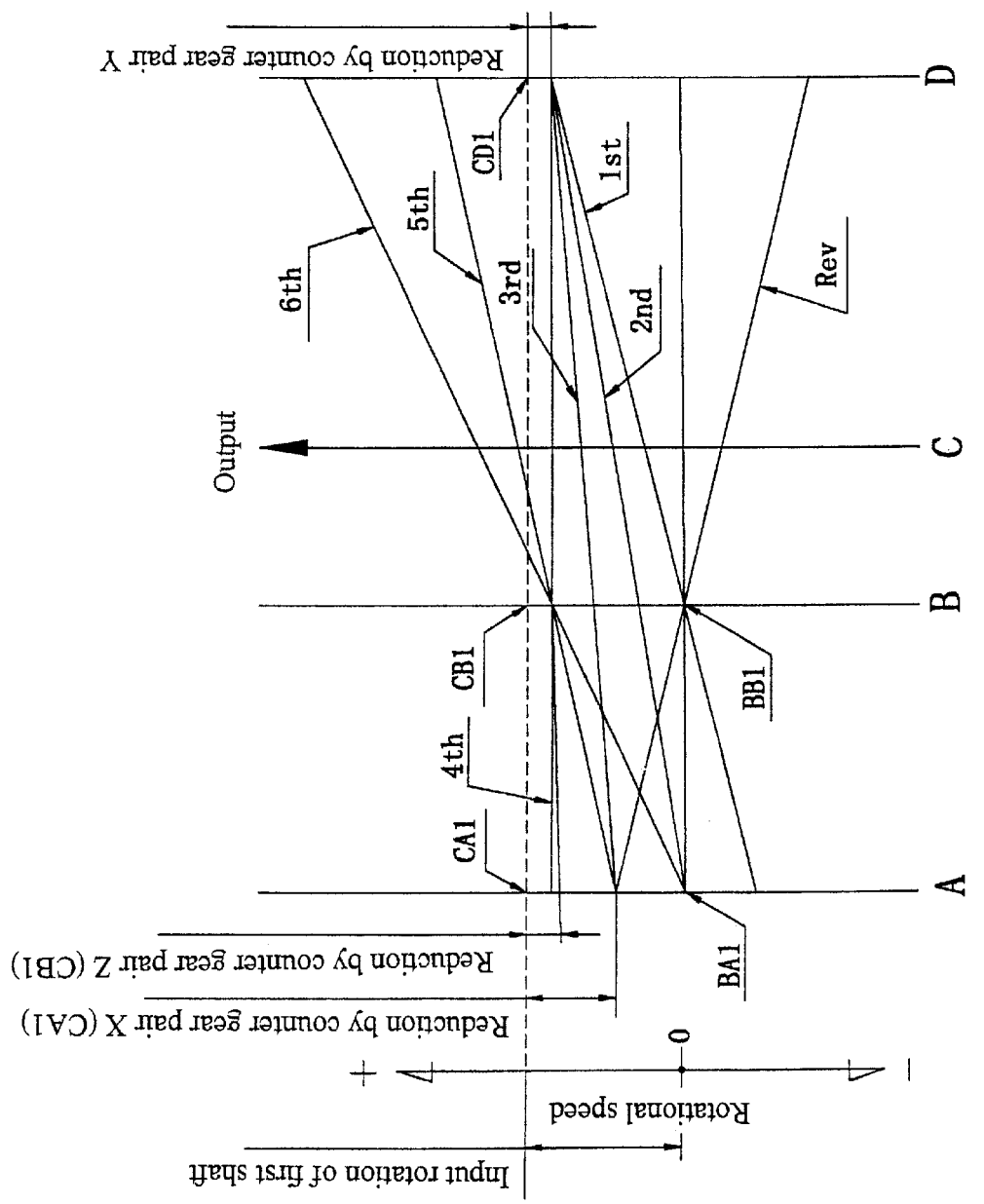
FIG. 48 is a graph showing the operational characteristics of the coupling elements and a speed diagram for each speed level of the transmissions of Configurations $IV_1$–$IV_5$.

The speed diagram for the configurations $IV_1$–$IV_5$ shown in FIGS. 47A–47E are all similar. Regarding these configurations $IV_1$–$IV_5$, FIG. 48 shows the control details of the coupling elements and the speed diagram for each speed level. In the speed diagram, as before, the vertical axis indicates the rotational speed and the horizontal axis indicates the positions of structural elements A, B, C and D. The "A", "B", "C" and "D" indicated on the horizontal axis correspond to the structural elements A, B, C and D shown in FIGS. 47A–47E.

As previously mentioned, the locations of clutch CB1 and clutch CD1 in the configurations $IV_1$–$IV_5$ shown in FIGS. 47A–47E are different from those shown in FIGS. 29A–29E, but the ON/OFF control of the coupling elements is the same. The speed configurations are also the same, except that when clutches CB1 and CD1 are turned ON, the rotational speeds of structural element B and structural element D differ in accordance with the reduction ratios of the pair of counter gears Z and the pair of counter gears Y.

Operational Effects of Configurations $IV_1$–$IV_5$

Since this configuration is provided with three pairs of counter gears, it is possible to feed a different rotational speed to structural element B than is fed to structural element D. As a result, the degree of freedom for setting the gear ratio is increased.

As in the case of Configurations $I_1$–$I_5$, the structure is complex but the bearings and gears of the pair of counter gears can be made with smaller torque and rotation capacities. Also, the gear efficiency of the planetary gear trains can be improved and the relative rotation between the frictional members of the clutches and brakes can be decreased. Consequently, the power loss of the transmission apparatus as a whole can be reduced.

Variations on Configurations $IV_1$–$IV_5$

Although in FIG. 47 the three clutches are disposed on first shaft 10, it is also acceptable for these clutches to be disposed on the second shaft 31 or dispersed on both of the two shafts 10 and 31.

Twelfth Embodiment Using Configuration $IV_1$

Figure 49:
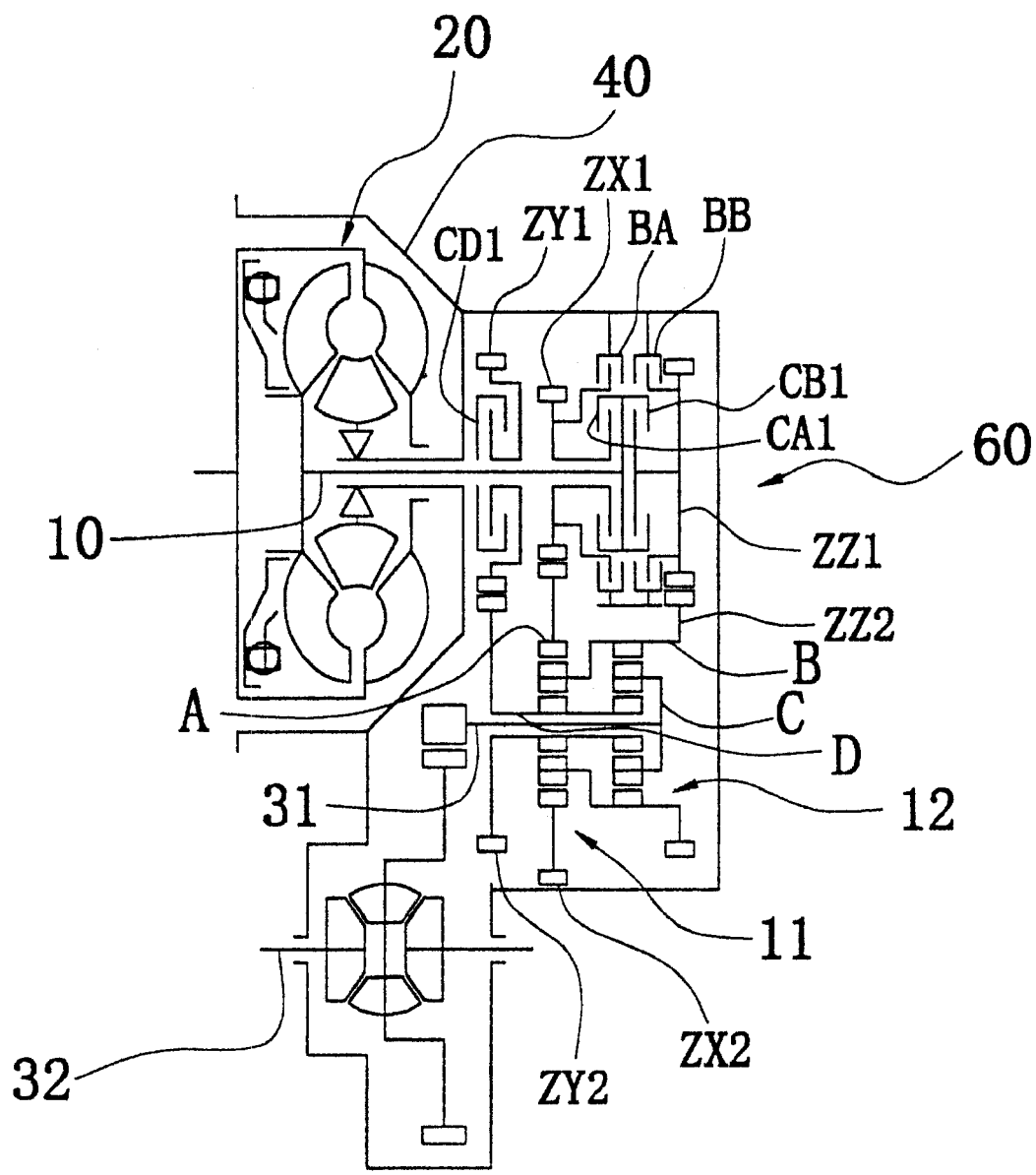
FIG. 49 is a schematic view of an automatic transmission apparatus utilizing Configuration $IV_1$ of FIG. 47A in accordance with a twelfth embodiment of the present invention.

A schematic view of the automatic transmission apparatus is shown in FIG. 49 in accordance with a twelfth embodiment of the present invention. This automatic transmission apparatus uses the transmission configuration $IV_1$ shown in FIG. 47A and comprises a torque converter 20 that serves as a hydraulic coupling to which power is inputted from the engine, and a transmission 60 that is provided on the output side of torque converter 20. Torque converter 20 and transmission 60 are enclosed in housing 40.

The primary features of torque converter 20 and the primary features of transmission 60 on the output side of second shaft 31 are the same as in the previously described embodiments. Only the features of the pairs of counter gears X, Y and Z and clutches CA1, CB1, CD1 of transmission 60 are different.

More specifically, in this embodiment, clutches CA1, CB1 and CD1 are disposed on first shaft 10. One gear ZX1 of the pair of counter gears X is disposed at the output side of clutch CA1, one gear ZZ1 of the pair of counter gears Z is disposed at the output side of clutch CB1, and one gear ZY1 of the pair of counter gears Y is disposed at the output side of clutch CD1. Each of these gears is supported so that it can rotate freely relative to first shaft 10. The other gears ZX2, ZY2 and ZZ2 mesh with the first gears of the pairs of counter gears X, Y and Z, respectively, and are rotatably disposed on second shaft 31.

In this embodiment, the reduction ratios $\alpha X$, $\alpha Y$ and $\alpha Z$ of the three pairs of counter gears X, Y and Z are given by the following equations: $\alpha X = ZX2/ZX1$; $\alpha Y = ZY2/ZY1$; and $\alpha Z = ZZ2/ZZ1$, where ZX1, ZX2, ZY1, ZY2, ZZ1, and ZZ2 are the tooth counts of gears ZX1, ZX2, ZY1, ZY2, ZZ1, and ZZ2, respectively.

Meanwhile, as before, the gear reduction ratios $\rho 1$ and $\rho 2$ of planetary gear trains 11 and 12 are given by the equation $\rho 1 = ZS1/ZR1$ and $\rho 2 = ZS2/ZR2$. In this embodiment, the aforementioned gear ratios are set as follows: $\alpha X = 2.0$; $\alpha Y = 1.2$; $\alpha Z = 1.05$; $\rho 1 = 0.4$; and $\rho 2 = 0.45$.

Next, the gear ratio of each speed level is explained. However, detailed explanations regarding the ON/OFF control of the coupling elements and the speed diagram for each of the speed levels is omitted here because these items are exactly the same as explained previously regarding FIG. 30.

First Forward Speed

By turning on clutch CD1 and brake BB, the rotation fed from first shaft 10 is reduced by the pair of counter gears Y, transmitted to first and second sun gears S1, S2 (structural element D), reduced by planetary gear trains 11 and 12, and outputted from second carrier Q2 (structural element C). The first forward speed characteristic is marked "$1^{st}$" in FIG. 50. Meanwhile, as shown in FIG. 51, the gear ratio is given by the equation $(1+\rho 2)\alpha Y/\rho 2$, which is preferably 3.87 in this embodiment.

Second Forward Speed

Figure 50:
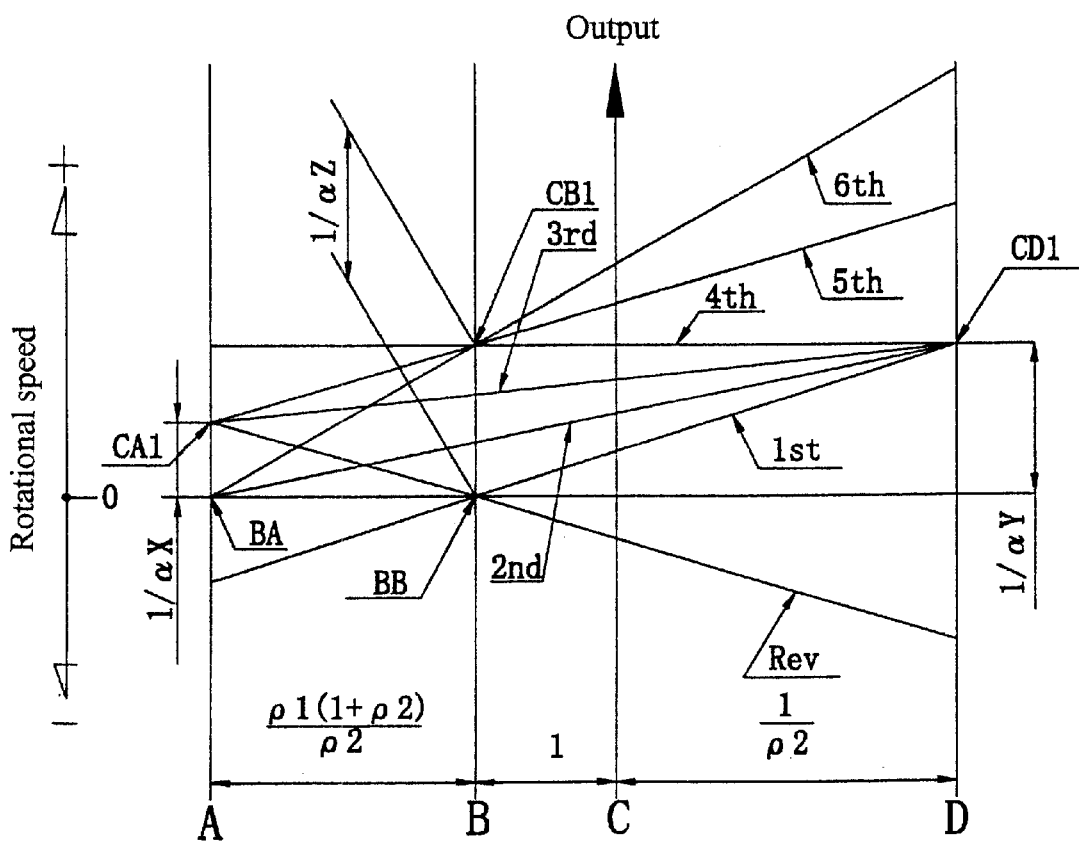
FIG. 50 is a graph showing operational characteristics of the coupling elements and a speed diagram for each speed level of the twelfth embodiment shown in FIG. 45.

By turning ON clutch CD1 and brake BA, the speed characteristic marked "$2^{nd}$" shown in FIG. 50 is obtained. Meanwhile, as shown in FIG. 51, the gear ratio is given by the equation $(1+\rho 1)(1+\rho 2)\alpha Y/(\rho 1+\rho 1\rho 2+\rho 2)$, which is preferably 2.37 in this embodiment.

Third Forward Speed

By turning ON clutch CD1 and clutch CA1, the speed characteristic marked "$3^{rd}$" in FIG. 50 is obtained. Meanwhile, as shown in FIG. 51, the gear ratio is given by the equation $(1+\rho 1)(1+\rho 2)\alpha X\alpha Y/\{(\rho 1+\rho 1\rho 2+\rho 2)\alpha X+\alpha Y)\}$, which is preferably 1.49 in this embodiment.

Fourth Forward Speed

By turning ON clutch CB1 and clutch CD1, the rotation fed from first shaft 10 is reduced by the pair of counter gears Z and inputted to first carrier Q1 and second ring gear R2 coupled thereto (structural element B), while concurrently, the same rotation is inputted to first and second sun gears S1 and S2 via the pair of counter gears Y. These inputs are reduced by planetary gear trains 11 and 12, and then outputted from second carrier Q2. The fourth forward speed characteristic is marked "$4^{th}$" in FIG. 50. Meanwhile, as shown in FIG. 51, the gear ratio is given by the equation $(1+\rho 2)\alpha Y\alpha Z/(\rho 2\alpha Z+\alpha Y)$, which is preferably 1.05 in this embodiment.

Fifth Forward Speed

By turning ON clutch CA1 and clutch CB1, the rotation fed from first shaft 10 is reduced by the pair of counter gears X and transmitted to first ring gear R1 (structural element A), while concurrently, the same rotation is reduced by the pair of counter gears Z and transmitted to first carrier Q1 and second ring gear R2. The rotation is then reduced by planetary gear trains 11 and 12, and then outputted from second carrier Q2. The fifth forward speed characteristic is marked "$5^{th}$" in FIG. 50. Meanwhile, as shown in FIG. 51, the gear ratio is given by the equation $\rho 1(1+\rho 2)\alpha X\alpha Z/\{(\rho 1+\rho 1\rho 2+\rho 2)\alpha X-\rho 2\alpha Z\}$, which is preferably 0.77 in this embodiment.

Sixth Forward Speed

By turning ON clutch CB1 and brake BA, the rotation fed from first shaft 10 is reduced by the pair of counter gears Z, transmitted to first carrier Q1 and second ring gear R2, reduced by planetary gear trains 11 and 12, and then outputted from second carrier Q2. The sixth forward speed characteristic is marked "$6^{th}$" in FIG. 50. Meanwhile, as shown in FIG. 51, the gear ratio is given by the equation $\rho 1(1+\rho 2)\alpha Z/(\rho 1+\rho 1\rho 2+\rho 2)$, which is preferably 0.59 in this embodiment.

First Reverse Speed

By turning ON clutch CA1 and brake BB, the first reverse speed characteristic marked "Rev" in FIG. 50 is obtained.

Meanwhile, as shown in FIG. 51, the gear ratio is given by the equation $\rho1(1+\rho2)\alpha X/\rho2$, which is preferably 2.58 in this embodiment.

Other Embodiments

Each of the four basic configurations $IV_2$–$IV_5$ shown in FIGS. 47B–47E can be worked as an automatic transmission apparatus for front wheel drive in a similar manner to that demonstrated in the twelfth embodiment. However, explanations of the embodiments corresponding to the configurations $IV_2$–$IV_5$ of FIGS. 47B–47E is omitted since those embodiments are basically the same as the eighth through eleventh embodiments already discussed.

As discussed hereinbefore, the present invention makes it possible for an automatic transmission apparatus having five forward speeds and two reverse speeds or six forward speeds and one reverse speed to be realized with a simple structure and small differences between gear ratios.

The terms of degree such as "substantially", "about" and "approximately" as used herein mean a reasonable amount of deviation of the modified term such that the end result is not significantly changed. These terms should be construed as including a deviation of at least ±5% of the modified term if this deviation would not negate the meaning of the word it modifies.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing description of the embodiments according to the present invention are provided for illustration only, and not for the purpose of limiting the invention as defined by the appended claims and their equivalents.

What is claimed is:

1. An automatic transmission apparatus comprising:
    a first shaft arranged on an engine side to receive input power;
    a second shaft arranged substantially parallel with said first shaft;
    first and second planetary gear trains disposed on said second shaft, at least one of said first and second planetary gear trains having a first structural element to input power, at least one said first and second planetary gear trains having a second structural element to input power, at least one of said first and second planetary gear trains having a third structural element to output power, and at least one of said first and second planetary gear trains having a fourth structural element disposed in a power transmission path;
    first and second pairs of counter gears coupling said first shaft with said first and second structural elements of said planetary gear trains, each of said first and second pairs of counter gears having a different gear ratio; and
    a plurality of coupling elements including first, second, and third clutches and first and second brakes, seven speed levels being obtained by selectively coupling two of said plurality of coupling elements to control the power transmission path,
    the power being input to said first structural element of said planetary gear trains via either said first clutch and said first pair of counter gears or said second clutch and said second pair of counter gears,
    the power being input to said second structural element of said planetary gear trains via said third clutch and said second pair of counter gears,
    said third structural element of said planetary gear trains being adapted to be connected to an output shaft, and
    said first brake being provided to brake rotations of said second structural element.

2. An automatic transmission apparatus as recited in claim 1, wherein
    said second brake is arranged to brake rotations of said fourth structural element.

3. An automatic transmission apparatus as recited in claim 1, wherein
    said first planetary gear train has a first ring gear, a first planet gear that meshes with said first ring gear, a first carrier that supports said first planet gear, and a first sun gear that meshes with said first planet gear;
    said second planetary gear train has a second ring gear coupled with said first carrier, a second planet gear that meshes with said second ring gear, a second carrier that supports said second planet gear, and a second sun gear that meshes with said second planet gear and is coupled with said first sun gear;
    said first structural element is formed by said first ring gear;
    said second structural element is formed by said first carrier and said second ring gear;
    said third structural element is formed by said second carrier; and
    said fourth structural element is formed by said first and second sun gears.

4. An automatic transmission apparatus as recited in claim 1, further comprising
    a hydraulic coupling part having an impeller, a turbine and a stator, said hydraulic coupling part being arranged on an input side of said first planetary gear train.

5. An automatic transmission apparatus as recited in claim 1, wherein
    said first planetary gear train has a first ring gear, a first planet gear that meshes with said first ring gear, a first carrier that supports said first planet gear, and a first sun gear that meshes with said first planet gear;
    said second planetary gear train has a second ring gear coupled with said first carrier, a second planet gear that meshes with said second ring gear, a second carrier that supports said second planet gear and is coupled with said first ring gear, and a second sun gear that meshes with said second planet gear;
    said first structural element is formed by said first ring gear;
    said second structural element is formed by said first carrier and said second ring gear;
    said third structural element is formed by said first ring gear and said second carrier; and
    said fourth structural element is formed by said second sun gear.

6. An automatic transmission apparatus as recited in claim 1, wherein
    said first planetary gear train has a first ring gear, a first planet gear that meshes with said first ring gear, a first carrier that supports said first planet gear, and a first sun gear that meshes with said first planet gear;
    said second planetary gear train has a second ring gear, a second planet gear that meshes with said second ring gear, a second carrier that supports said second planet gear and is coupled with said first carrier, and a second sun gear that meshes with said second planet gear and is coupled with said first ring gear;

said first structural element is formed by said first ring gear and said second sun gear;

said second structural element is formed by said first and second carriers;

said third structural element is formed by said second ring gear; and said fourth structural element is formed by said first sun gear.

7. An automatic transmission apparatus as recited in claim 1, wherein said first and second planetary gear trains have a common ring gear, a common planet gear that meshes with said common ring gear, a first sun gear that meshes with said common planet gear, a small planet gear that meshes with said common planet gear, a common carrier that supports said common planet gear and said small planet gear, and a second sun gear that meshes with said small planet gear;

said first structural element is formed by said first sun gear;

said second structural element is formed by said common carriers;

said third structural element is formed by said common ring gear; and said fourth structural element is formed by said second sun gear.

8. An automatic transmission apparatus as recited in claim 1, wherein said first and second planetary gear trains have a common ring gear, a common planet gear that meshes with said common ring gear, a first sun gear that meshes with said common planet gear, a small planet gear that meshes with said common planet gear, a common carrier that supports said common planet gear and said small planet gear, and a second sun gear that meshes with said small planet gear;

said first structural element is formed by said second sun gear;

said second structural element is formed by said common ring gear;

said third structural element is formed by said common carrier; and said fourth structural element is formed by said first sun gear.

* * * * *